United States Patent [19]
Washisu

[11] Patent Number: 5,973,319
[45] Date of Patent: Oct. 26, 1999

[54] POSITION DETECTING APPARATUS FOR USE WITH IMAGE BLUR CORRECTING DEVICE HAVING MOVABLE MEMBER

[75] Inventor: Koichi Washisu, Tokyo, Japan

[73] Assignee: Canon Kabushiki Kaisha, Tokyo, Japan

[21] Appl. No.: 08/835,720

[22] Filed: Apr. 10, 1997

[30] Foreign Application Priority Data

| Apr. 11, 1996 | [JP] | Japan | 8-113011 |
| Mar. 17, 1997 | [JP] | Japan | 9-082439 |
| Mar. 17, 1997 | [JP] | Japan | 9-082440 |

[51] Int. Cl.⁶ .............. G03B 5/00; G03B 13/36
[52] U.S. Cl. .............. 250/231.13; 348/208; 396/55
[58] Field of Search ............ 250/231.13–231.18; 359/557; 396/55; 348/208

[56] References Cited

U.S. PATENT DOCUMENTS

| 5,126,561 | 6/1992 | Nakazawa et al. | 250/231.13 |
| 5,243,462 | 9/1993 | Kobayashi et al. | 359/557 |
| 5,596,366 | 1/1997 | Takashima et al. | 348/208 |
| 5,619,735 | 4/1997 | Kai | 396/55 |
| 5,689,369 | 11/1997 | Noguchi | 359/557 |
| 5,815,742 | 9/1998 | Hamada et al. | 396/55 |

*Primary Examiner*—Stephone Allen
*Attorney, Agent, or Firm*—Fitzpatrick, Cella, Harper & Scinto

[57] ABSTRACT

A position detecting apparatus applied to an image blur correction device having a movable member has a light emitting device, a reflecting member for reflecting light from the light emitting device, which has portions with different reflectivities and in where a position upon which the light from the light emitting device impinges changes according to movement of the movable member, and a light receiving device for receiving light reflected by the reflecting member and for outputting a signal representing a position of the position-detected object in accordance with the light received, thereby realizing the position detecting apparatus in the simplified and cost-reduced configuration. Further, the above position detecting apparatus is used for position detection of a movable member for preventing an image blur in an image blur correction apparatus or a movable optical member in an optical apparatus, thereby simplifying the configuration and decreasing the cost for the image blur correction apparatus or the optical apparatus.

40 Claims, 73 Drawing Sheets

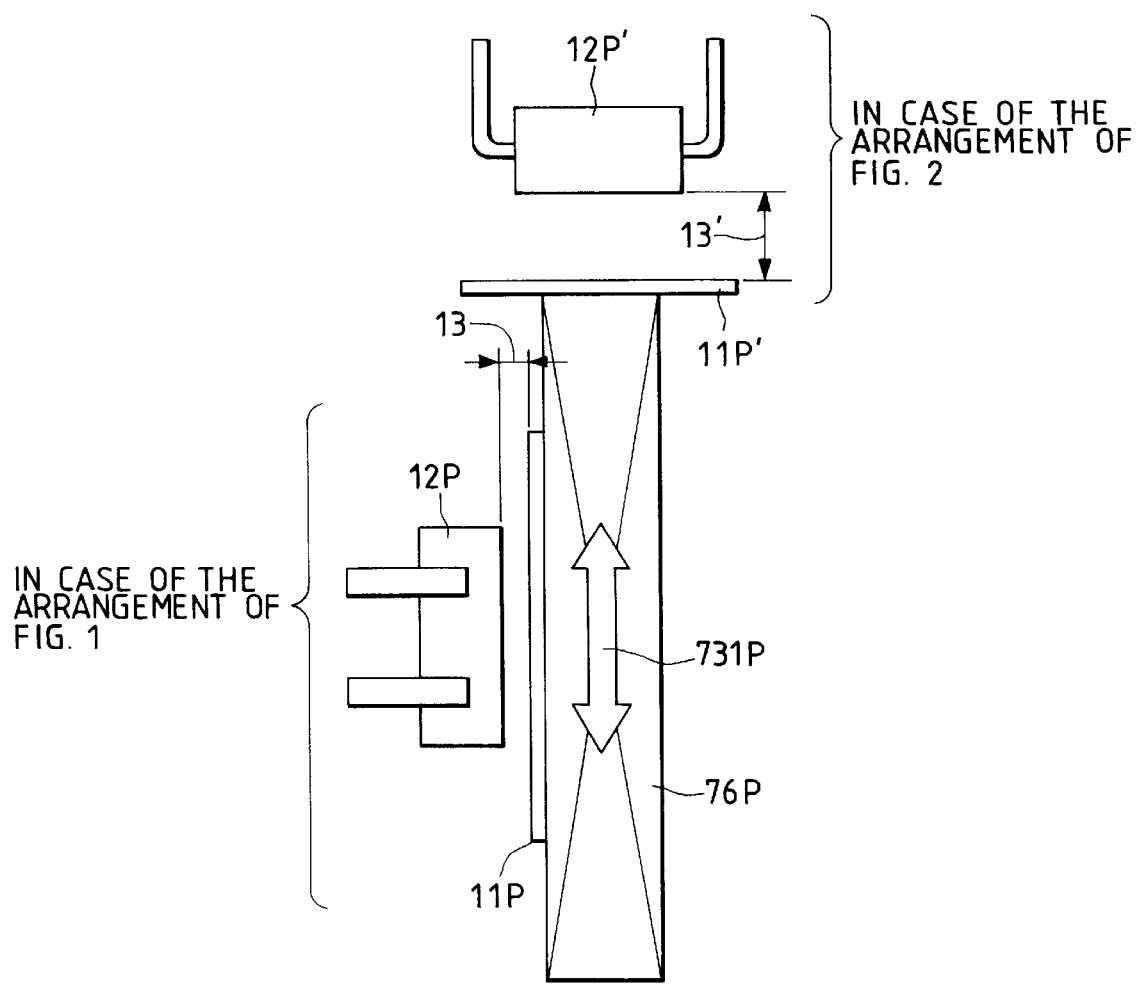

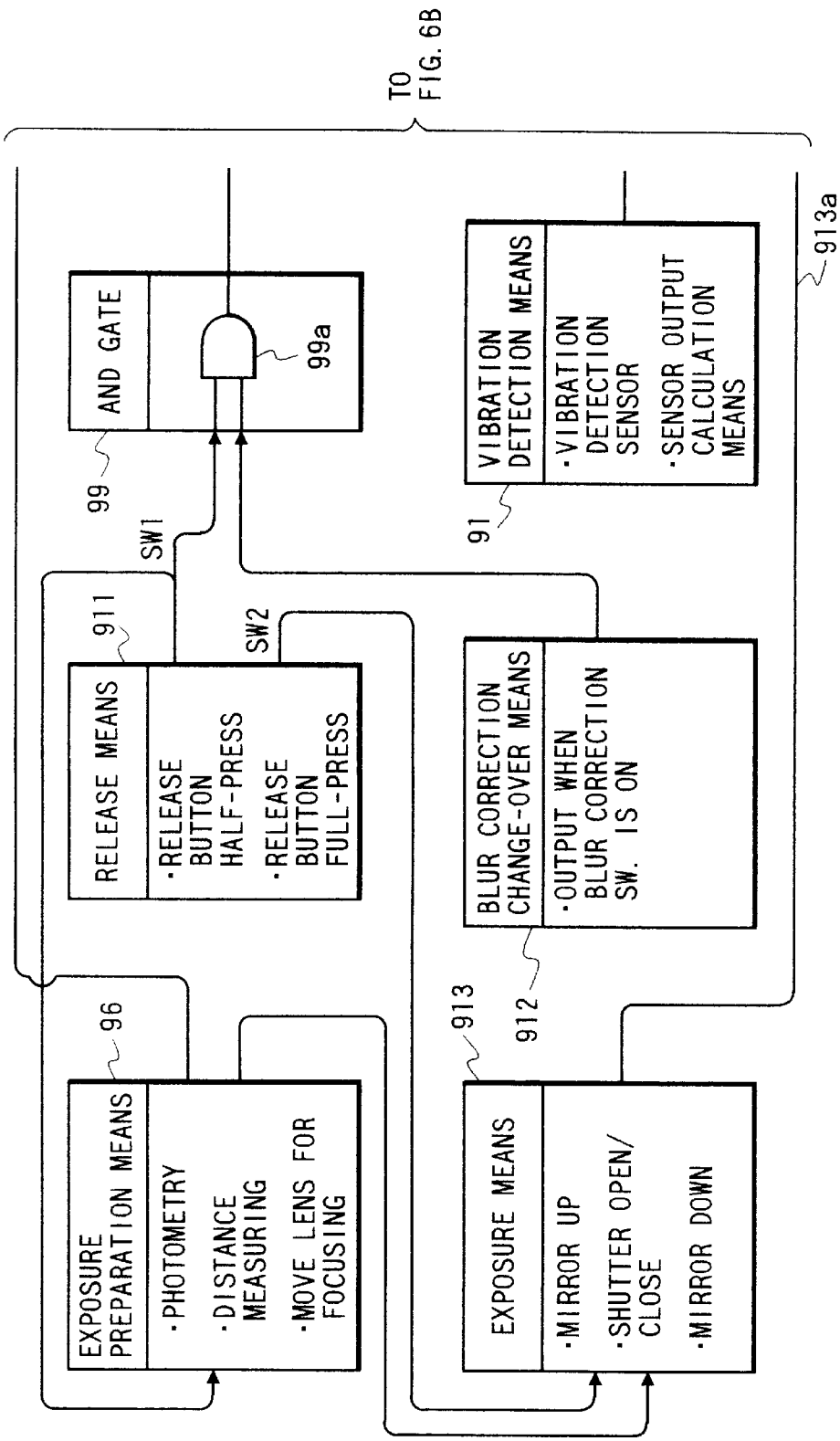

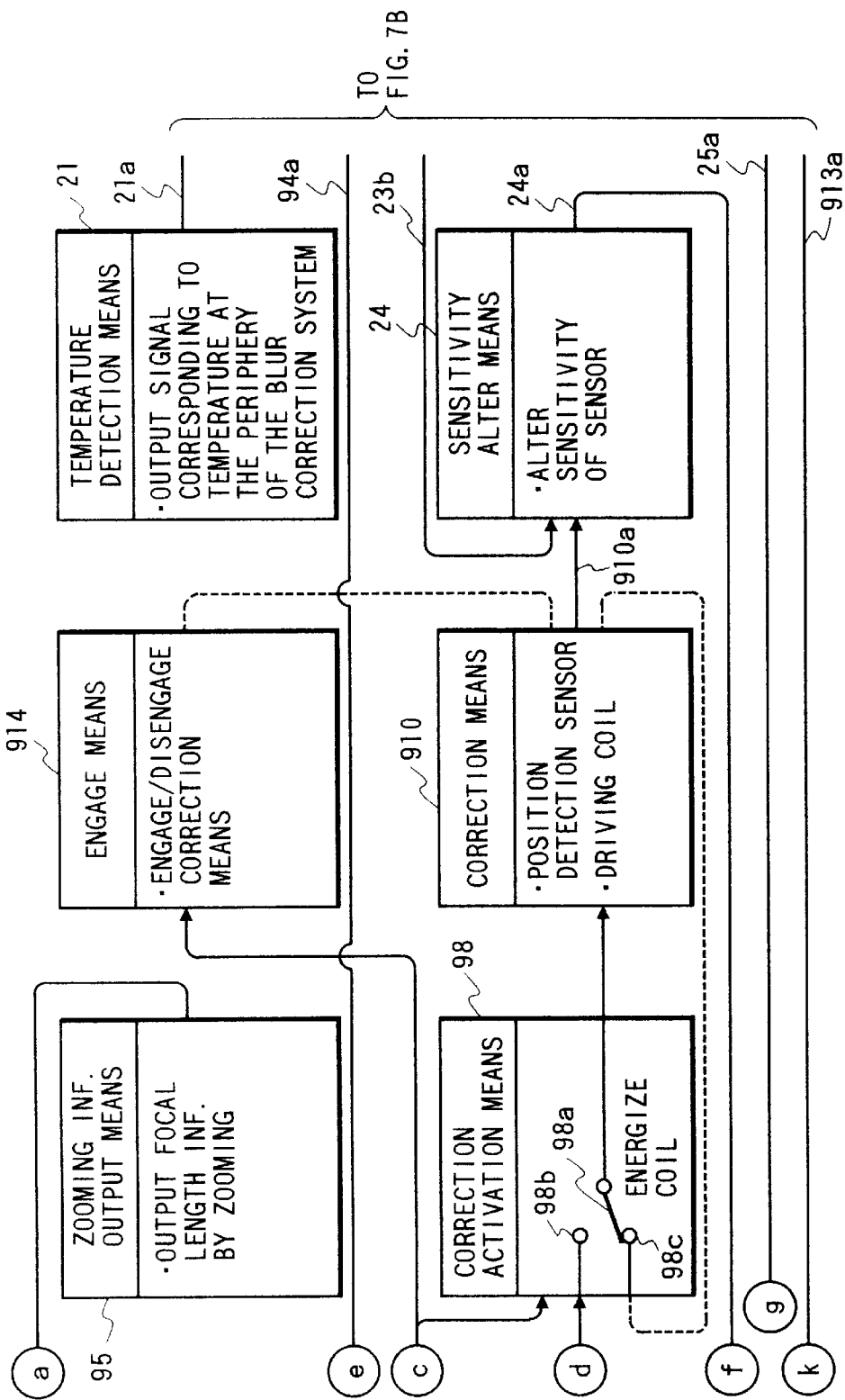

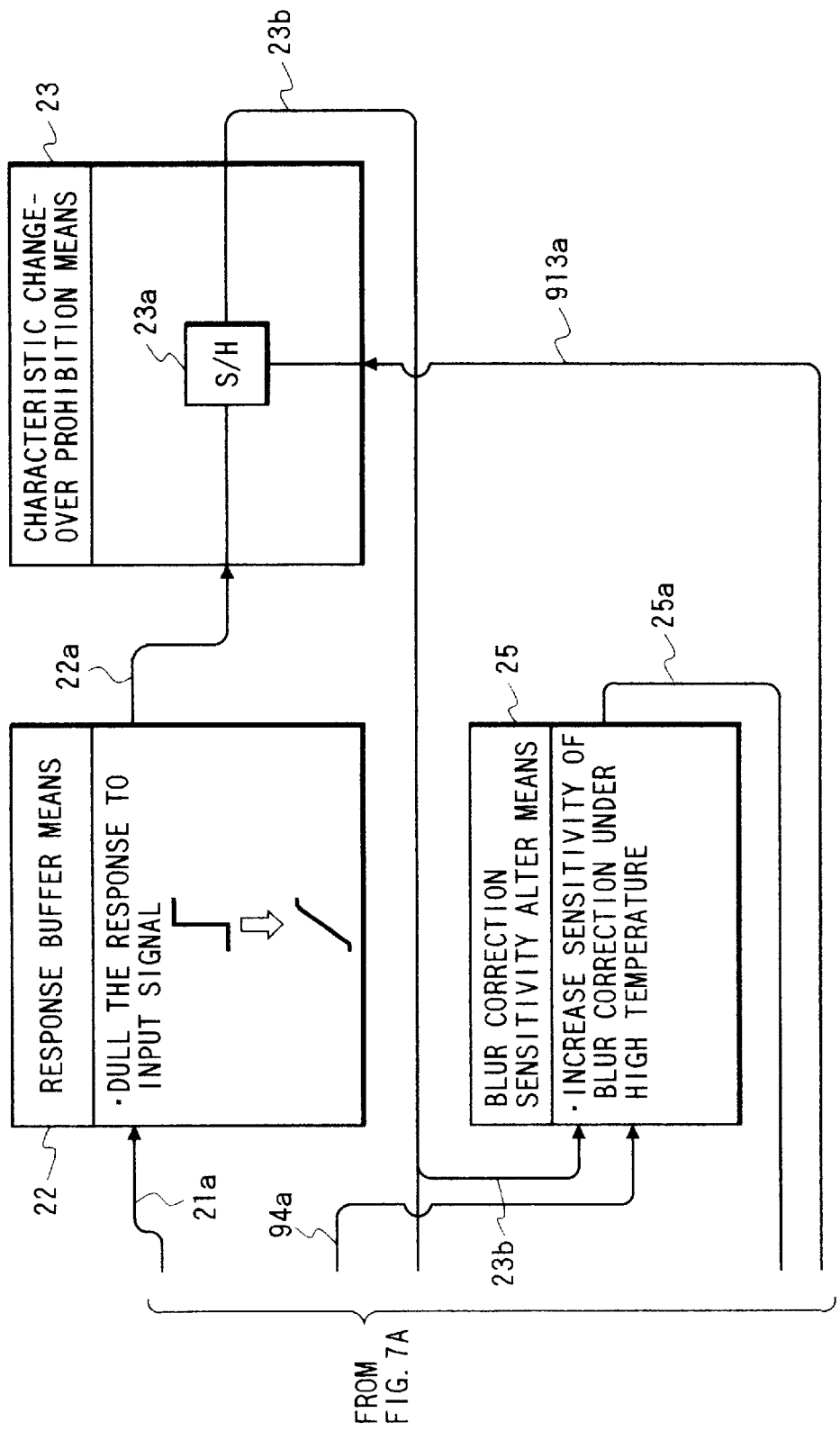

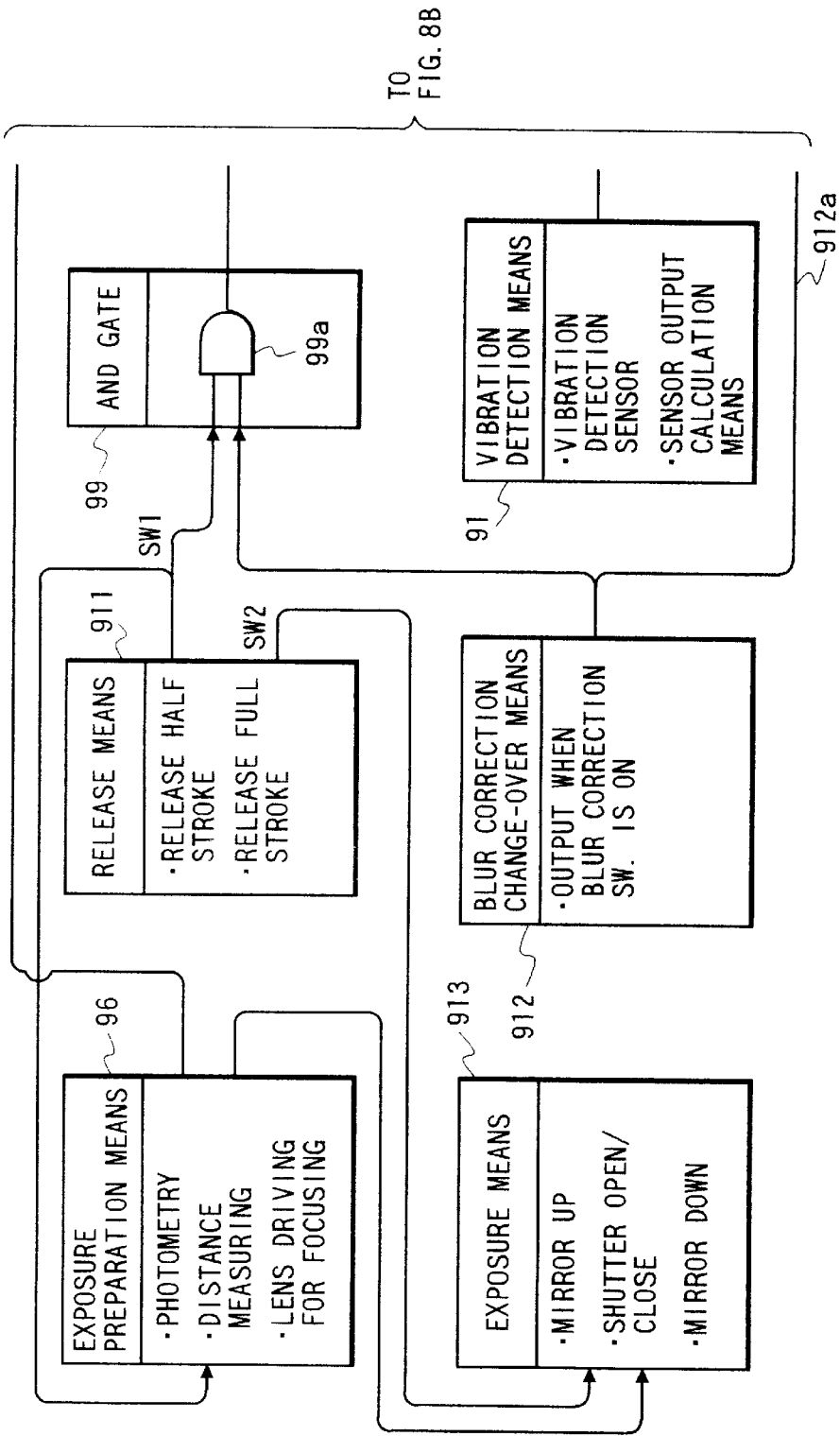

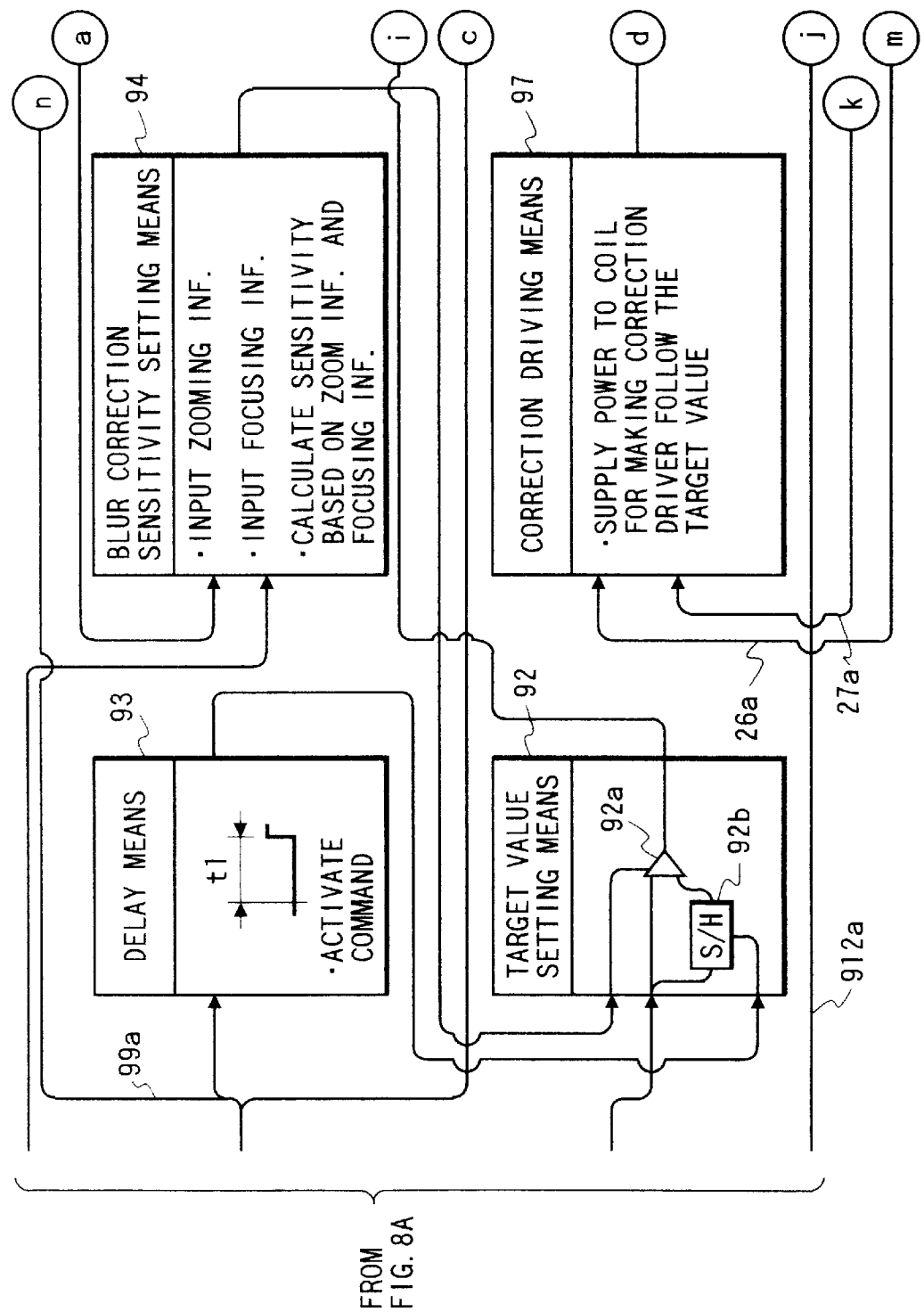

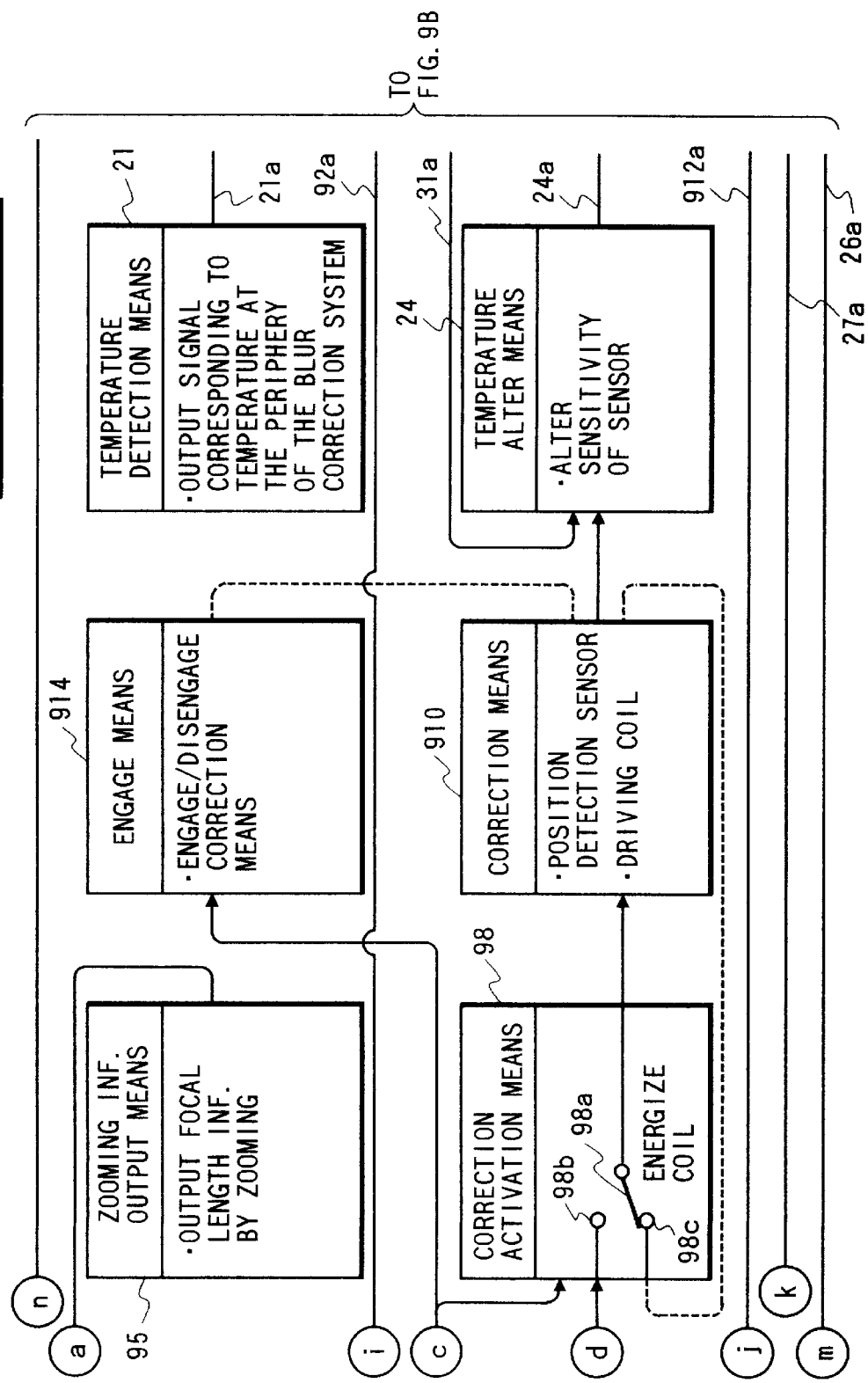

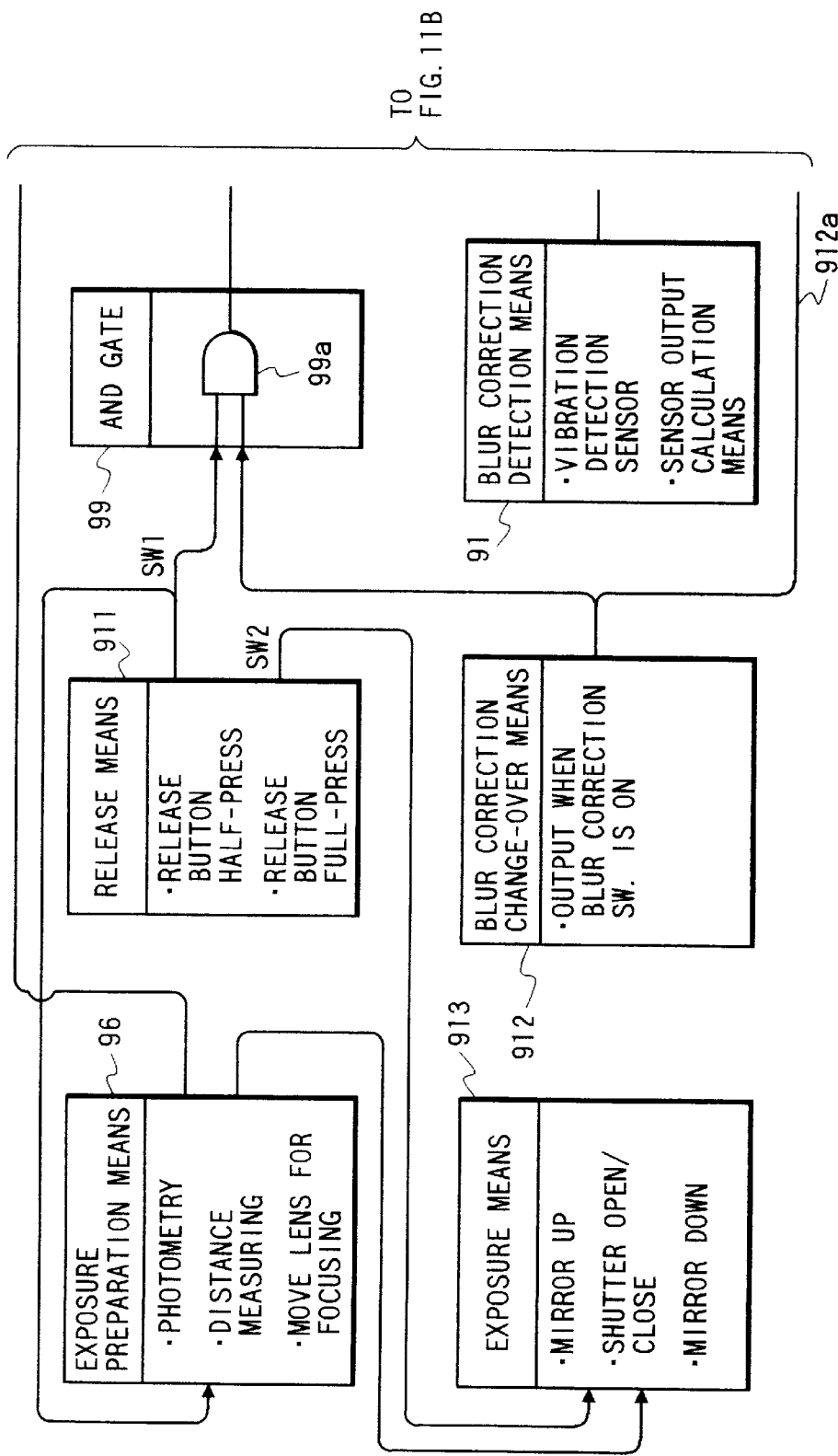

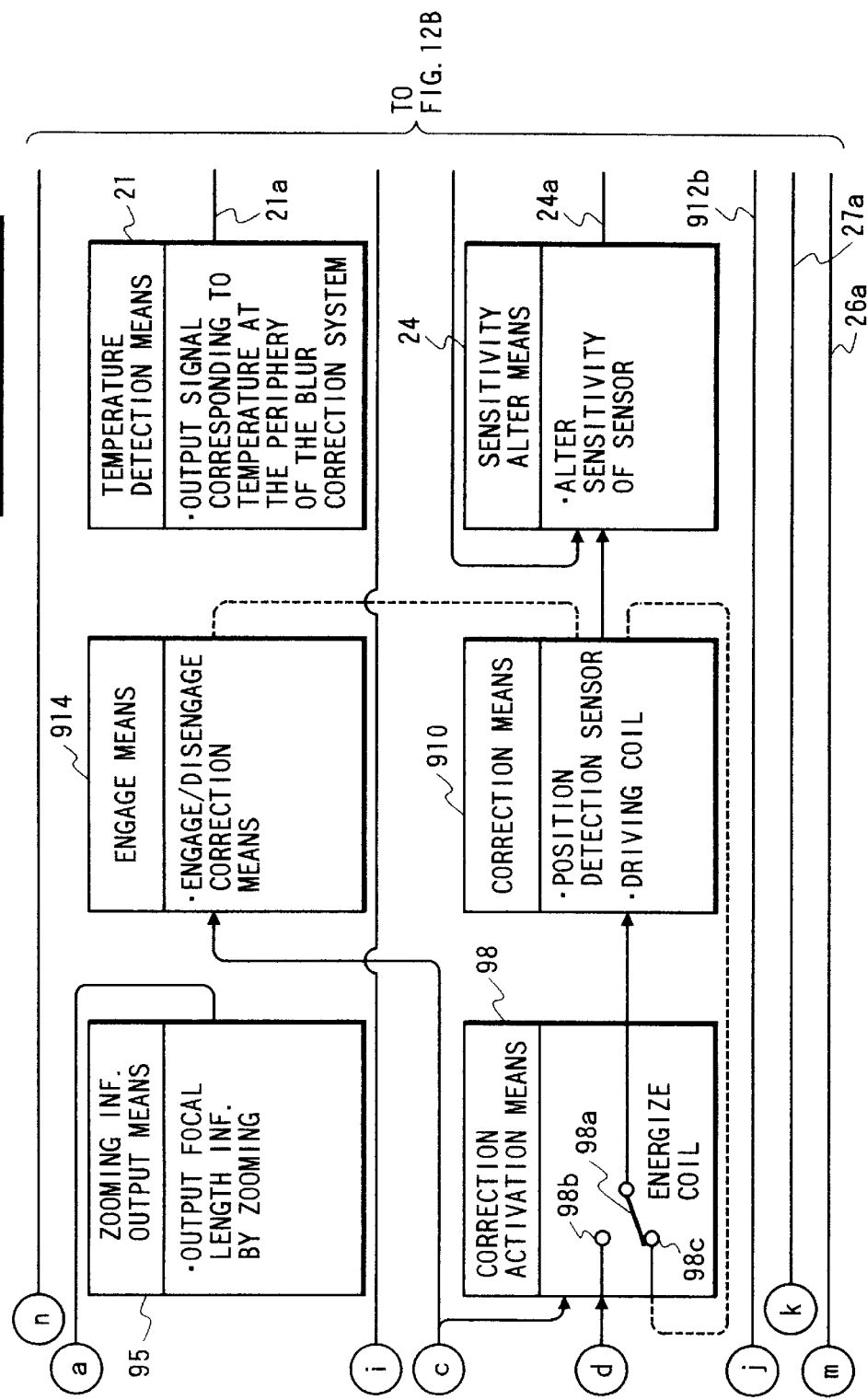

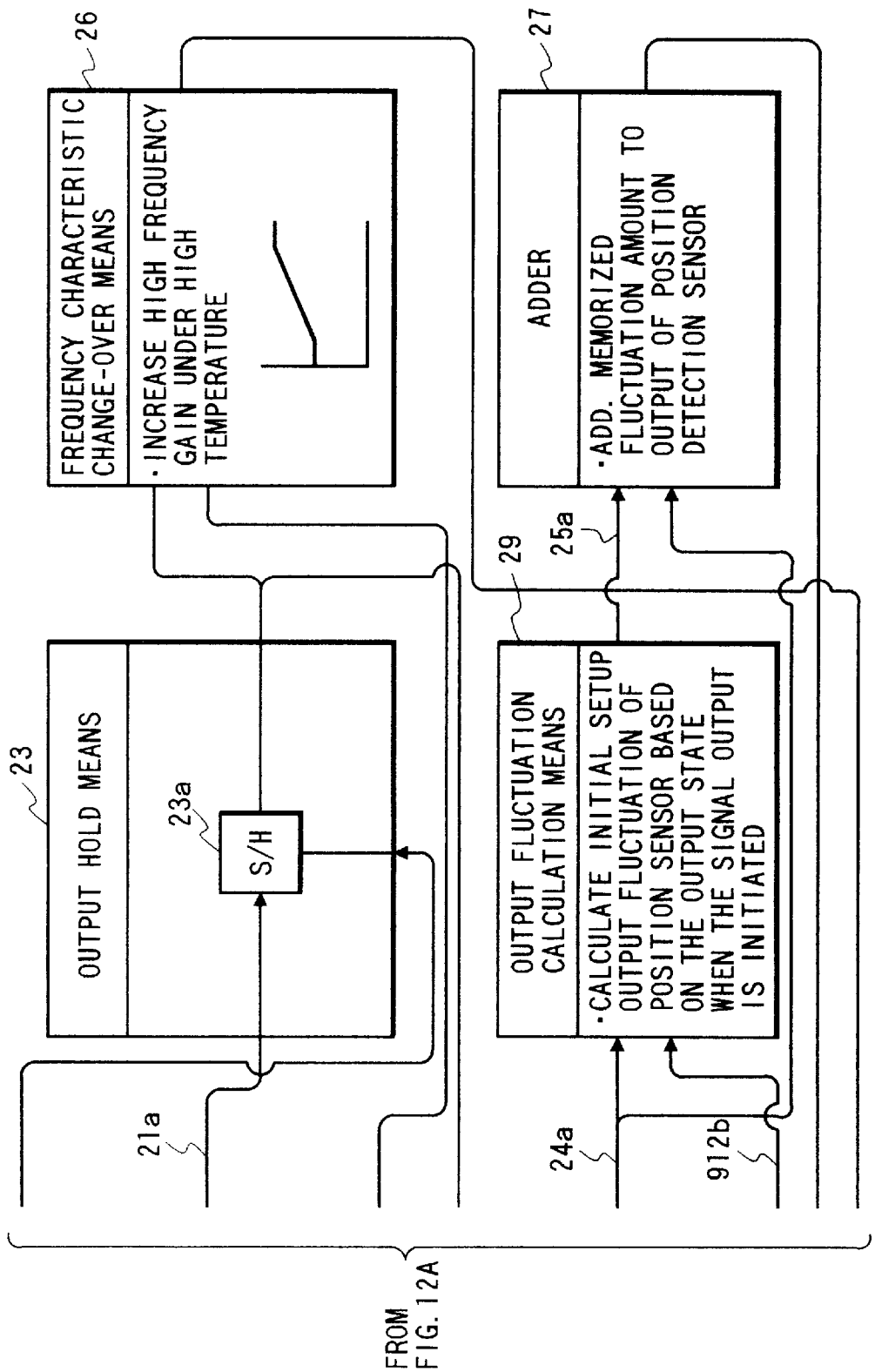

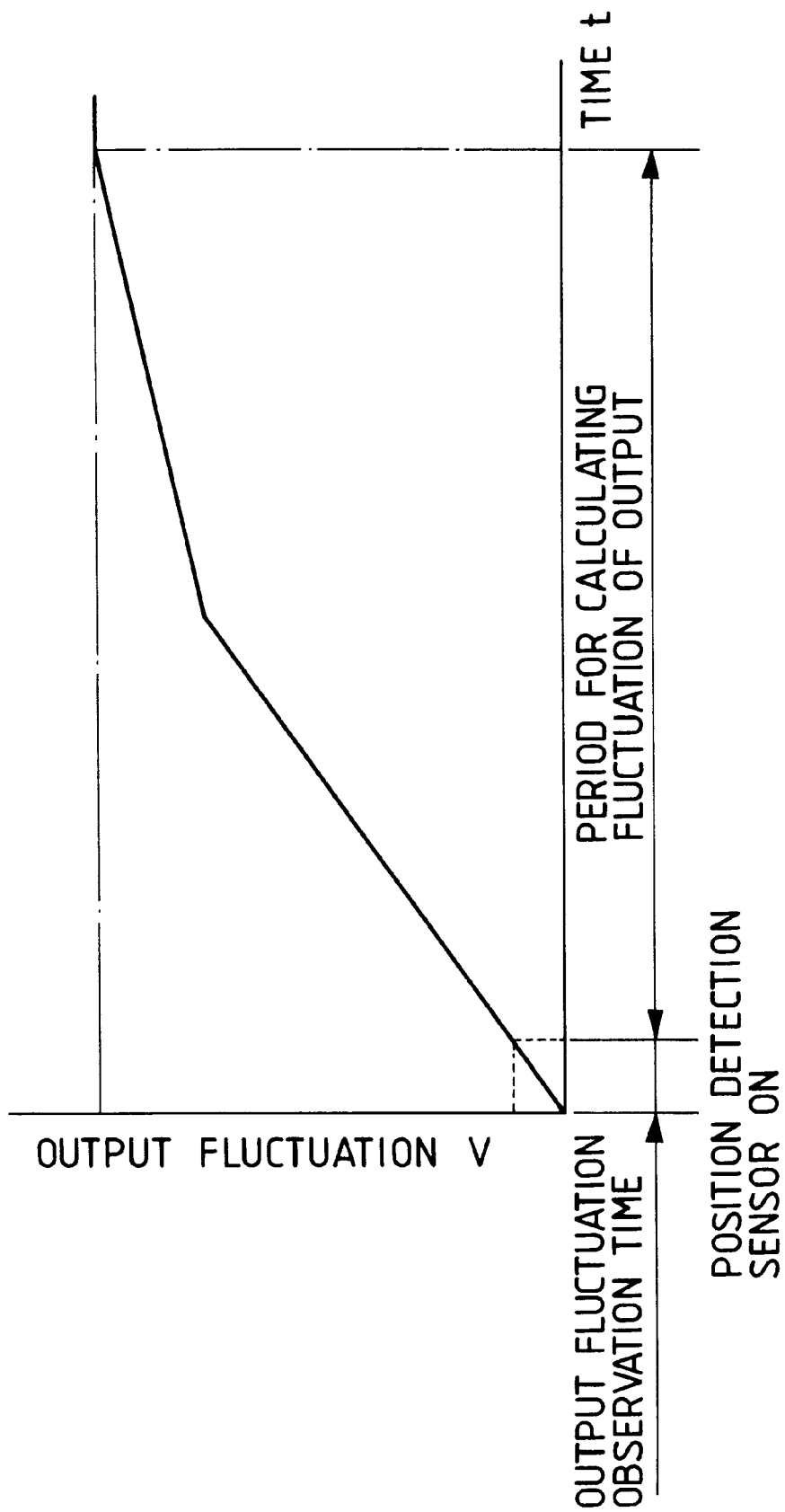

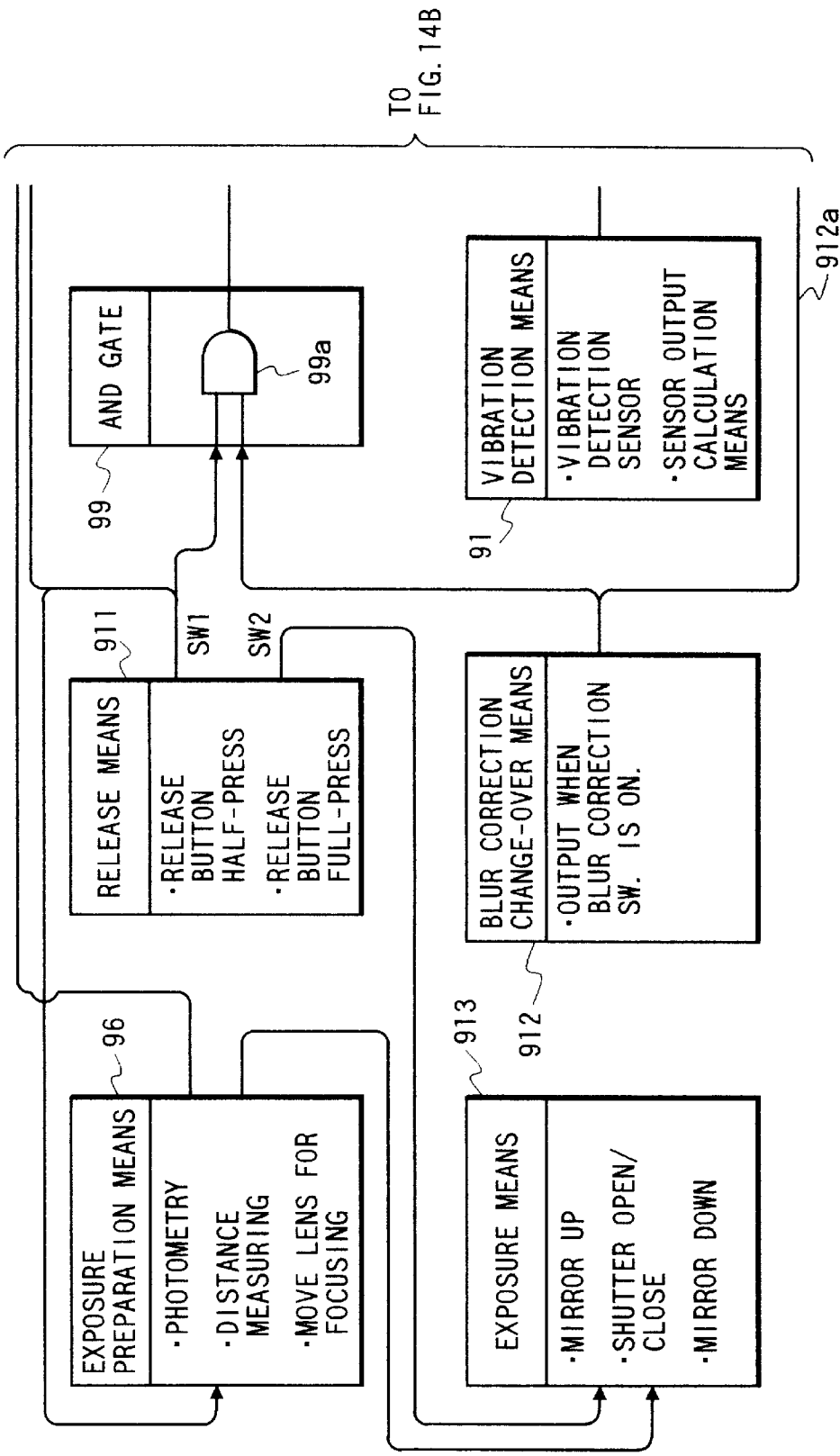

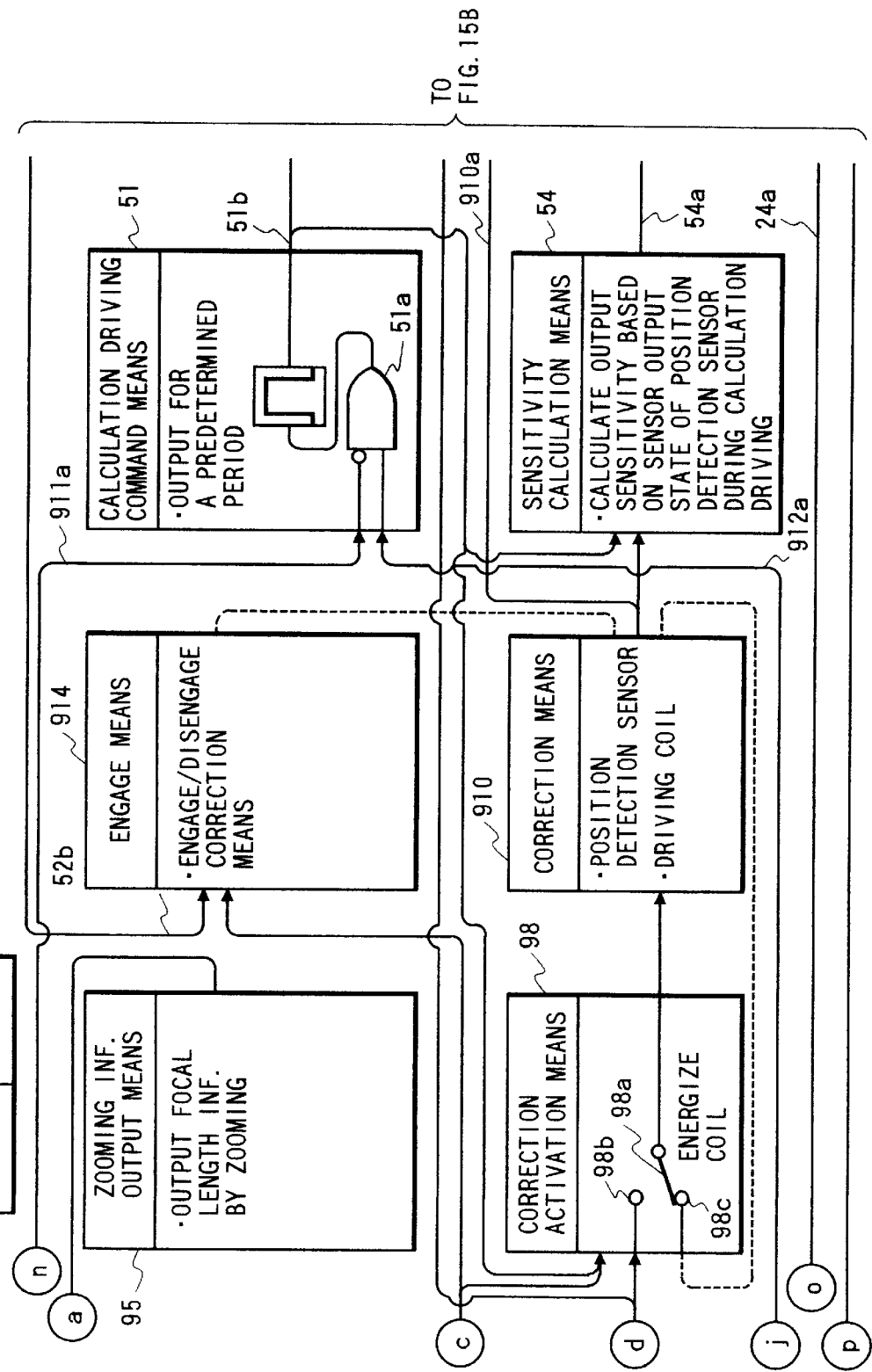

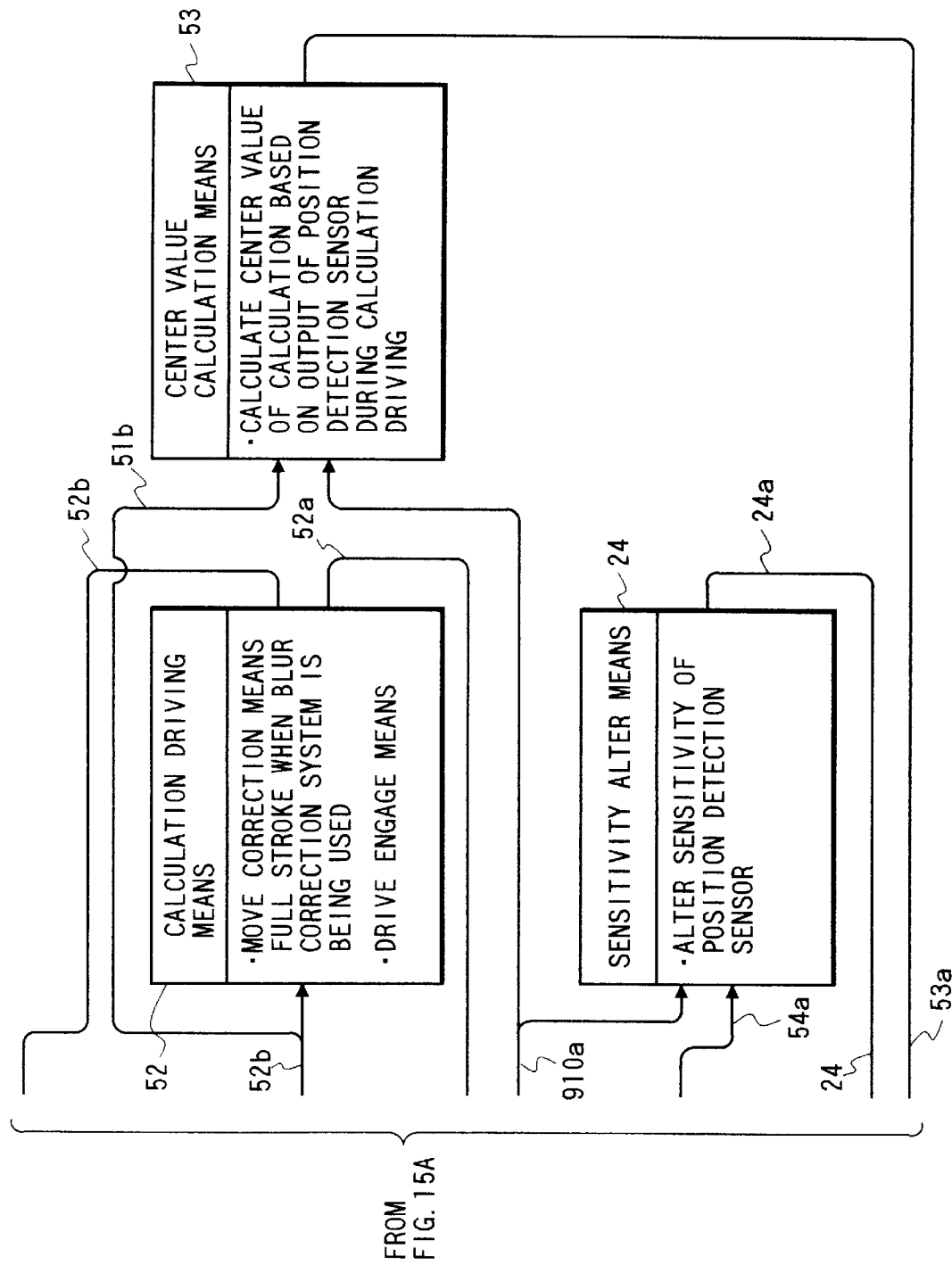

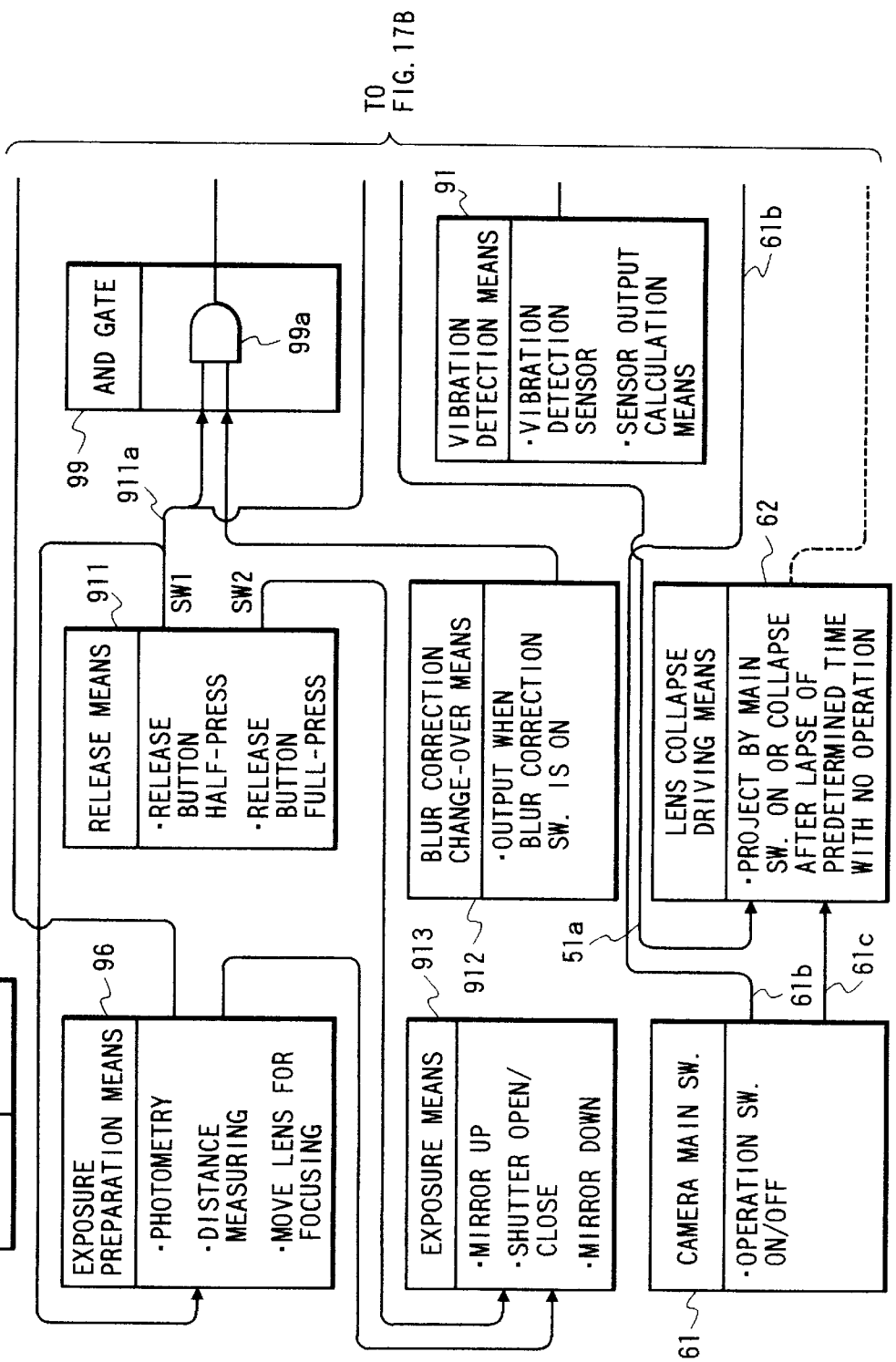

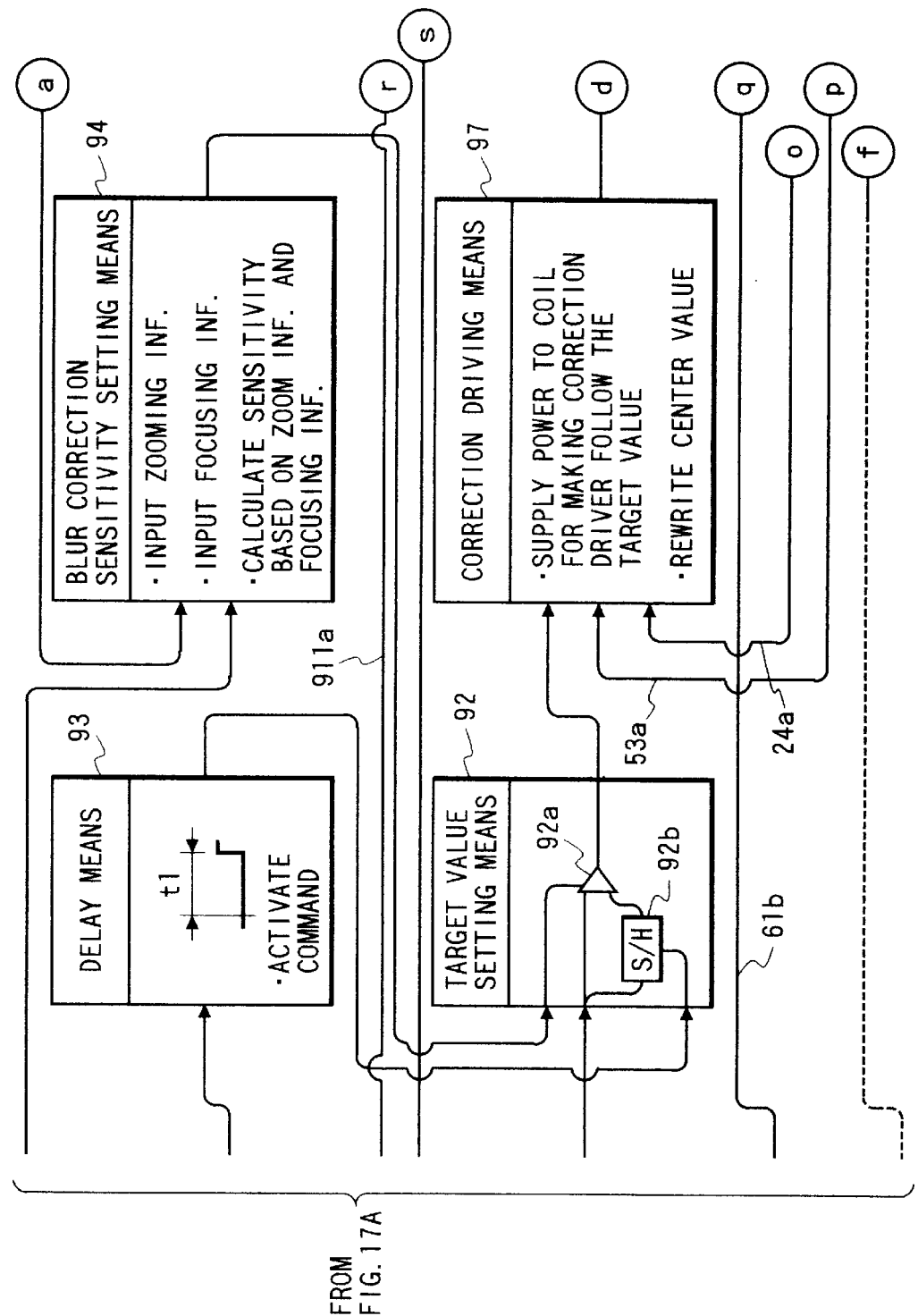

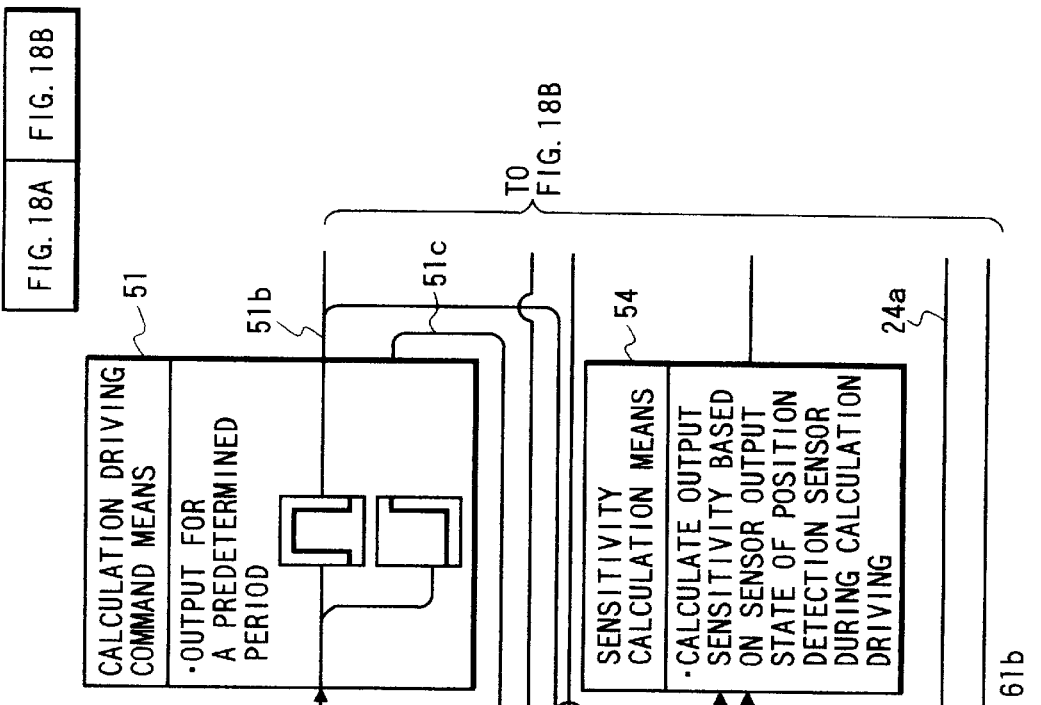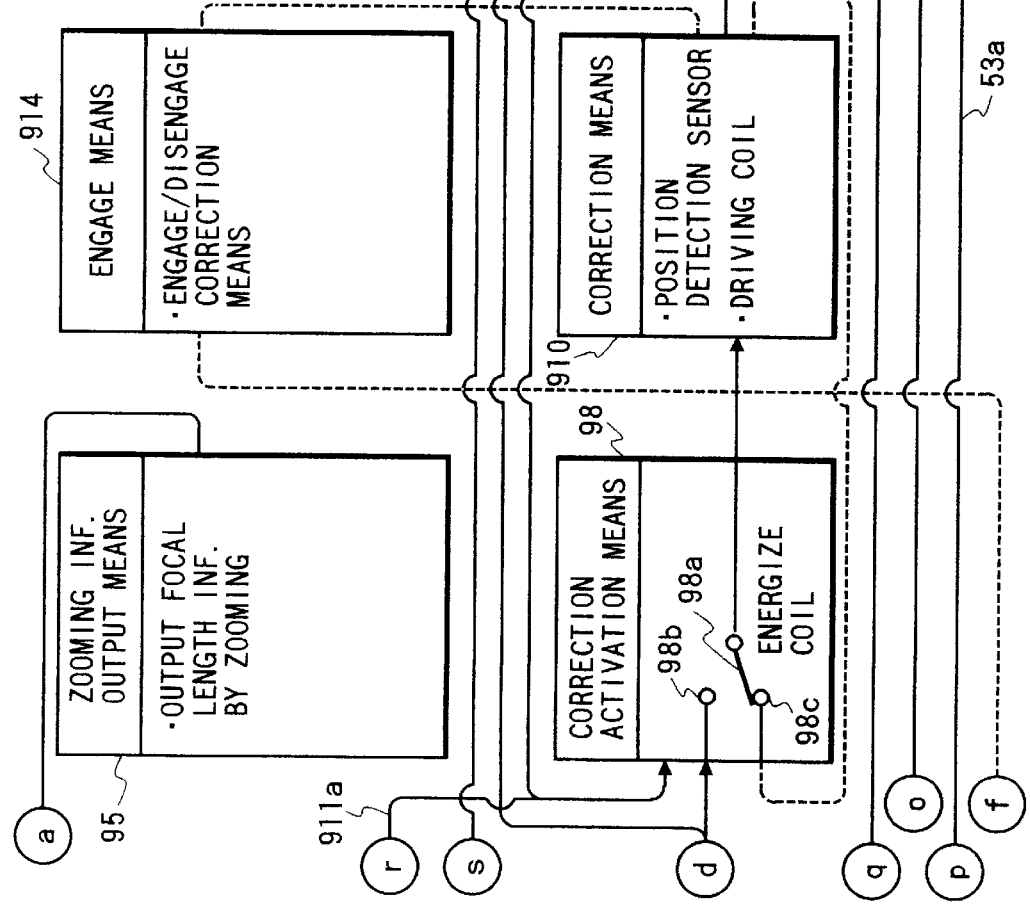

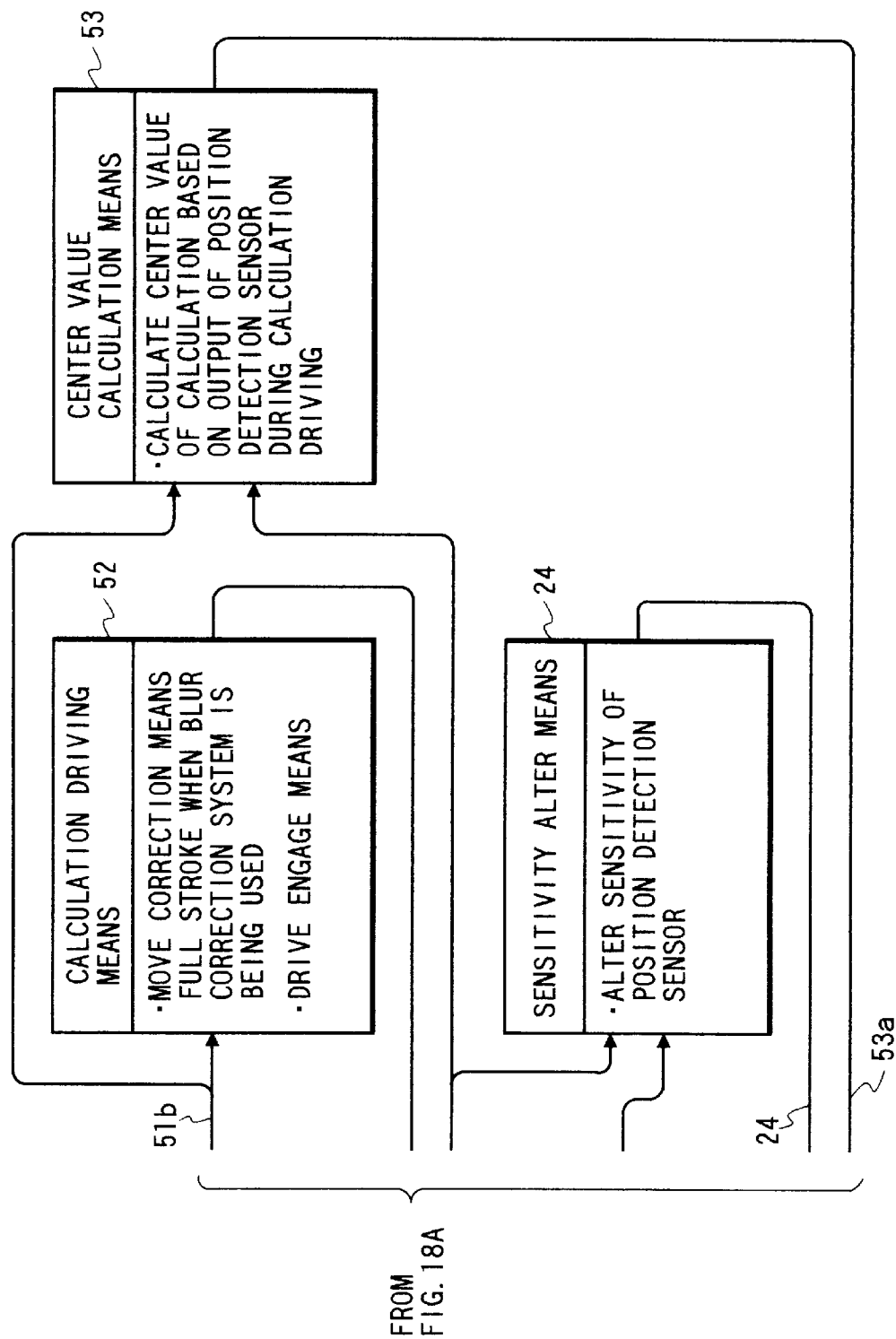

FIG. 32
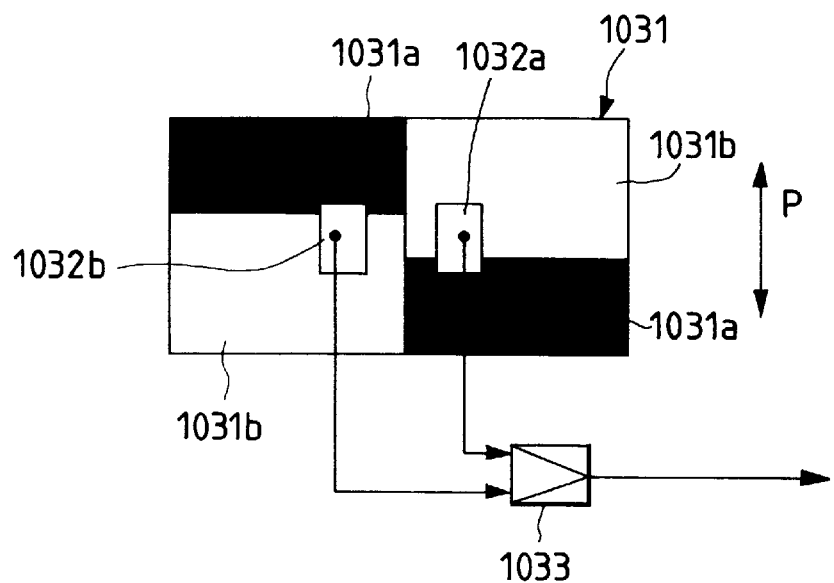
FIG. 33A
FIG. 33B
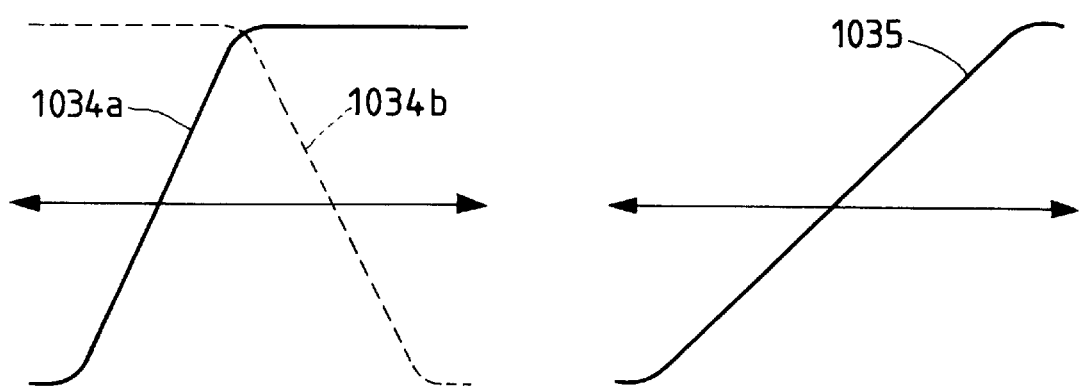

(VIEW FROM ARROW 10079c IN FIG. 60A)

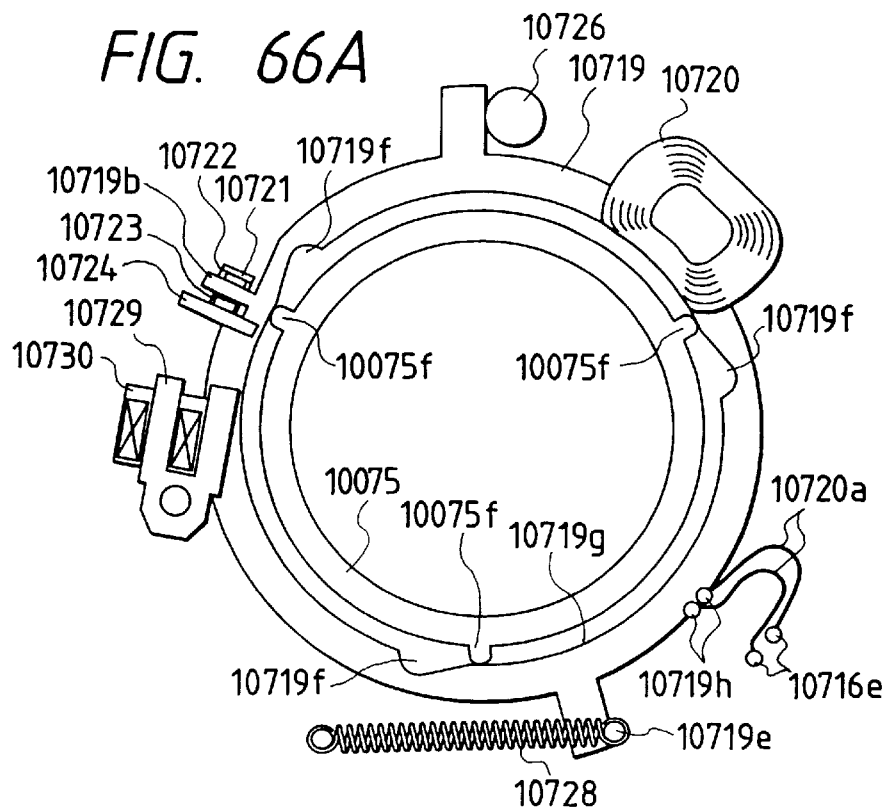
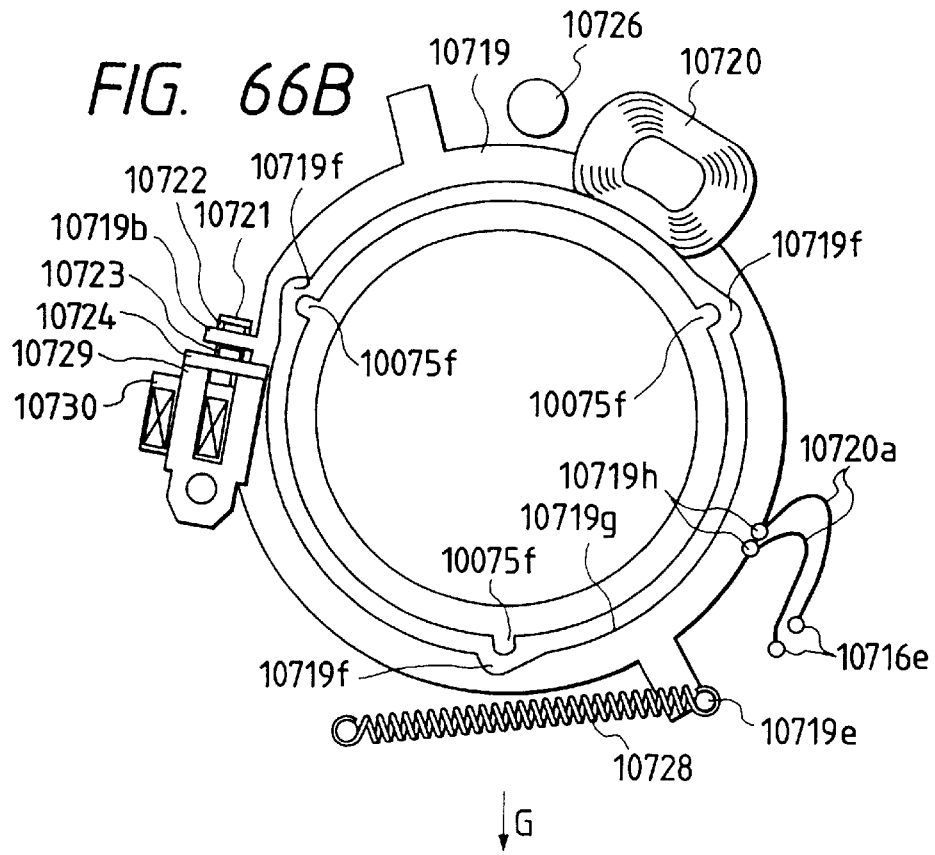

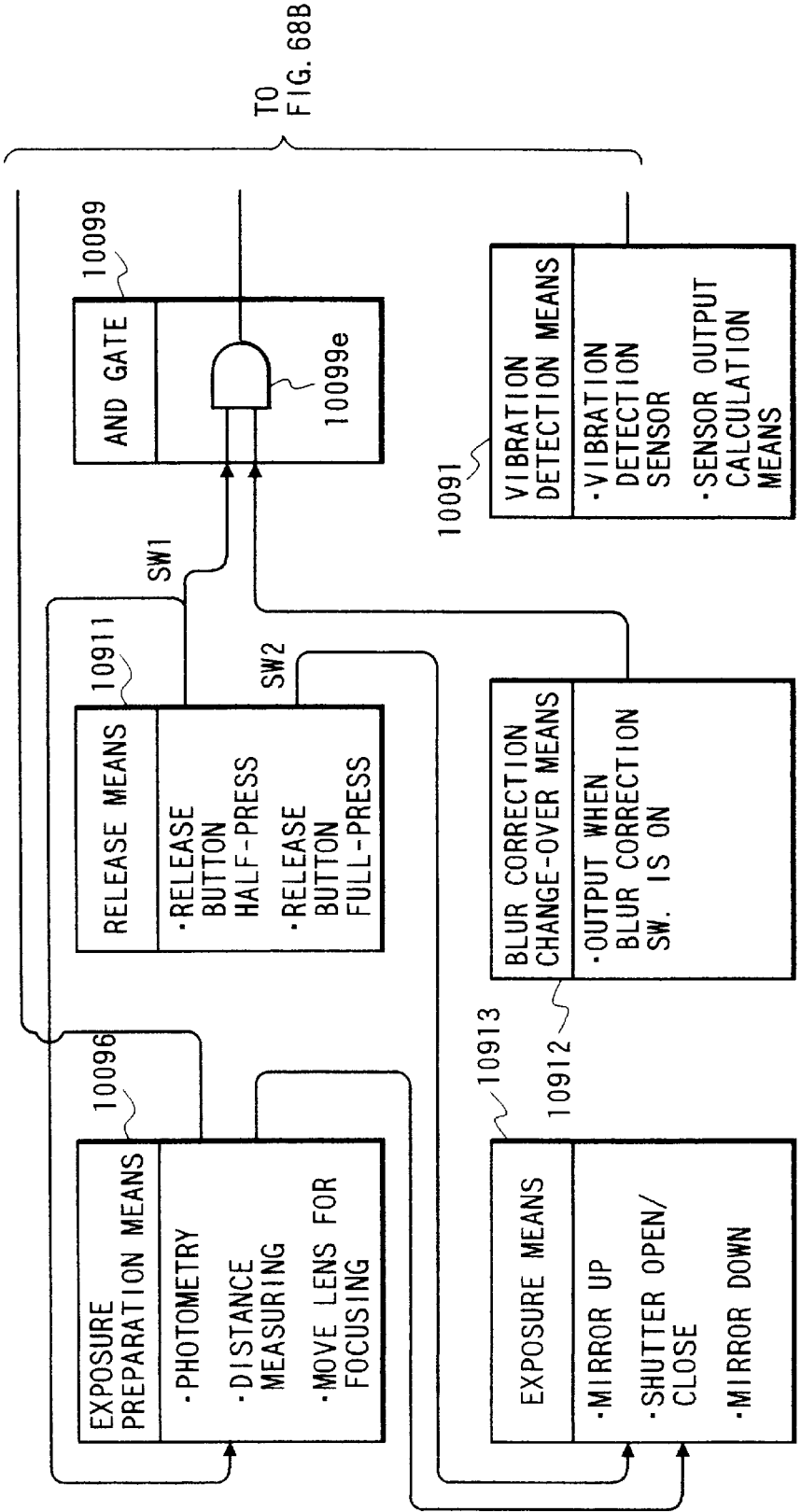

POSITION DETECTING APPARATUS FOR USE WITH IMAGE BLUR CORRECTING DEVICE HAVING MOVABLE MEMBER

BACKGROUND OF THE INVENTION

1. Field of the Invention

The present invention relates to a moving status detecting apparatus for detecting the moving status of a movable member or the like arranged to operate for image blur correction.

2. Related Background Art

In present cameras, all important operations for photography including determination of exposure, focusing, and so on are automated, and thus the possibility of mistake photography is very little even in the case of people unfamiliar with manipulation of a camera.

Further, systems for preventing hand shakes from affecting the camera have been also investigated these years and there is thus little factor to induce mistake photography of photographer.

Now described briefly is a system for preventing a camera shake due to hand shakes.

The hand shakes exerted on the camera upon photography are normally the vibration of frequencies ranging from 1 Hz to 12 Hz, and a fundamental idea for enabling to take blurpree photographs even with occurrence of such hand shakes at the time of shutter release is to detect vibration of camera due to the above hand shakes and to displace a correction lens according to a detected value thereof. Accordingly, in order to achieve the capability of taking blurfree photographs even with occurrence of vibration of camera, it is necessary first to detect the vibration of camera accurately and second to correct a change of the optical axis due to the hand shake.

This detection of vibration (camera vibration) can be carried out, theoretically speaking, by providing the camera with vibration detecting means for detecting angular acceleration, angular velocity, angular displacement, or the like and camera deviation detecting means for electrically or mechanically integrating an output signal from the sensor to output a signal of angular displacement. Then an image blur can be suppressed by driving a correction optical device for moving the photographic optic axis radially based on information of this detection.

Here, a blur correction system using the vibration detecting means will be outlined referring to FIG. 57.

The example of FIG. 57 is a drawing of a system for suppressing image blurs resulting from pitch or vertical deviation 10081*p* and yaw or horizontal deviation 10081*y* of camera in the directions of arrows 10081 illustrated therein.

In the same drawing, reference numeral 10082 designates a lens barrel, and each of 10083*p* and 10083*y* vibration detecting means for detecting pitching of camera or yawing of camera, respectively, a vibration detection direction of which is represented by 10084*p*, 10084*y*, respectively. Numeral 10085 denotes a correction optical device (wherein 10086*p*, 10086*y* are coils each for giving thrust to the correction optical device 10085 and wherein 10089*p*, 10089*y* are position detecting elements each for detecting the position of the correction device 10085), and the correction optical device 10085 is provided with a position control loop and is driven using outputs from the vibration detecting means 10083*p*, 10083*y* as target values, thus assuring stability on the image plane 10088.

FIG. 58 is an exploded perspective view to show the structure of the correction optical device (the details of which will be described hereinafter, but which is comprised of correction means and means for supporting and engaging the correction means) suitably applicable for such an object. This structure will be described as also referring to FIG. 59 to FIG. 67.

Back projecting lugs 10071*a* (three lugs one of which is on the blind side) of base plate 10071 (an enlarged view of which is illustrated in FIG. 61) fit the unrepresented lens barrel and well-known rollers of barrel or the like are screwed to corresponding holes 10071*b*, whereby the base plate is fixed to the barrel.

A second yoke 10072 with bright plating, made of a magnetic member, is screwed to holes 10071*c* of base plate 10071 with screws penetrating holes 10072*a*. Further, permanent magnets (shifting magnets) 10073 such as neodymium magnets magnetically adhere to the second yoke 10072. The magnetization direction of each permanent magnet 10073 is the direction of each arrow 10073*a* illustrated in FIG. 58.

Coils 10076*p*, 10076*y* (shifting coils) are snap-fit in and bonded to (i.e., the coils are forced into and bonded to) a support frame 10075 (an enlarged view of which is illustrated in FIG. 62) to which a correction lens 10074 is fixed by C-ring or the like (FIG. 62 shows the support frame without the coils). Further, light emitting elements 10077*p*, 10077*y* such as IREDs are also bonded to the back of the support frame 10075 and light emitted therefrom travels through slit 10075*ap*, 10075*ay* into an associated position detecting element 10078*p*, 10078*y* such as a PSD described below.

Support balls 10079*a*, 10079*b* with a spherical tip of POM (polyacetal resin) or the like and a charge spring 10710 are inserted in each of holes 10075*b* (at three positions) of the support frame 10075 (also see FIG. 59 and FIG. 60A) and the support ball 10079*a* is thermally caulked to the support frame 10075 to be fixed therein (so that the support ball 10079*b* can slide in the extending direction of hole 10075*b* against spring force of charge spring 10710.

FIG. 59 is a lateral cross-sectional view of the correction optical device after assembled. The support ball 10079*b*, charge spring 10710 charged, and support ball 10079*a* are inserted in this order in the direction of arrow 10079*c* into the hole 10075*b* of support frame 10075 (wherein the support balls 10079*a*, 10079*b* are components of the same configuration) and the peripheral edge 10075*c* of hole 10075*b* is thermally caulked finally to prevent the support ball 10079*a* from slipping out therefrom.

A cross section of hole 10075*b* along the direction perpendicular to FIG. 61 is illustrated in FIG. 60A and a plan view obtained when the cross-sectional view of FIG. 60A is observed along the direction of arrow 10079*c* is illustrated in FIG. 60B. Depths of regions represented by symbols A to D in FIG. 60B are indicated by A to D in FIG. 60A.

Since the rear ends of wings 10079*aa* of the support ball 10079*a* are received and regulated by the range of the surface of depth A, the support ball 10079*a* is fixed to the support frame 10075 by thermal caulking of the peripheral edge 10075*a*.

Since the tip ends of wings 10079*ba* of the support ball 10079*b* are received by the range of surface of depth B, the support ball 10079*b* will never out in the direction of arrow 10079*c* from the hole 10075*b* because of the charged spring force of the charge spring 10710.

Since the support ball 10079*b* is received by the second yoke 10072 as shown in FIG. 59 after completion of assembly of the correction optical device, it will not slip out of the support frame 10075, of course, but the surface B of the slip-out preventing range is provided in consideration of assemblability.

The shape of hole 10075b of support frame 10075 shown in FIG. 59 and FIGS. 60A and 60B can be molded with simple two-divided molds one of which is arranged to slide in the opposite direction to the arrow 10079c without requiring a complex-internal-diameter slide mold in the case of molding the support frame 10075, whereby the dimensional accuracy can be set more precisely by that degree.

Since the support balls 10079a, 10079b are the same components as described, component costs are lowered, an assembling error can be avoided, and it is also advantageous in management of components.

For example, fluorine-based grease is applied to a bearing part 10075d of the above support frame 10075, and L-shaped shaft 10711 (of non-magnetic stainless steel material) is inserted thereinto (see FIG. 58). The other end of the L-shaped shaft 1011 is inserted into a bearing part 10071d (similarly coated with grease) formed in the base plate 10071, and the support frame 10075 is set in the base plate 10071 as putting the support balls 10079b together at the three positions on the second yoke 10072.

Next, positioning holes 10712a (at three positions) of first yoke 10712 shown in FIG. 58 are made to engage with pins 10071f (at three positions) of the base plate 10071 shown in FIG. 61 and the first yoke 10712 is received by receiving surfaces 10071e (at five positions) also shown in FIG. 61 to be magnetically coupled with the base plate 10071 (by the magnetic force of permanent magnets 10073).

This makes the back of first yoke 10712 contact the support balls 10079a and the support frame 10075 is sandwiched between the first yoke 10712 and the second yoke 10072 to be positioned in the directions along the optical axis.

Contact surfaces between the support balls 10079a, 10079b and the first yoke 10712 or the second yoke 10072 are also coated with the fluorine-based grease and the support frame 10075 is free to slide in the plane perpendicular to the optical axis with respect to the base plate 10071.

The above L-shaped shaft 10711 supports the support frame 10075 so that it can slide only in the directions of arrows 10713p, 10713y with respect to the base plate 10071, which regulates relative rotation (rolling) of the support frame 10075 about the optical axis with respect to the base plate 10071.

A large engagement play is given in the optic-axis directions between the L-shaped shaft 10711 and the bearing parts 10071d, 10075d, which prevents double engagement against the regulation in the optic-axis directions effected by the sandwich arrangement of the support balls 10079a, 10079b between the first yoke 10712 and the second yoke 10072.

The surface of the first yoke 10712 is covered by an insulating sheet 10714, and a hard board 10715 having plural ICs (ICs for amplifying outputs from the position detecting elements 10078p, 10078y, ICs for driving the coils 10076p, 10076y, etc.) is screwed thereonto by engaging positioning holes 10715a (at two positions) with pins 10071h (at two positions) of the base plate 10071 shown in FIG. 61 and inserting screws through the holes 10715b and the holes 10712b of the first yoke 10712 into the holes 10071g of the base plate 10071.

Here, the position detecting elements 10078p, 10078y are positioned on the hard board 10715 by a tool and are soldered thereto, and a flexible board 10716 for transmission of signal is also bonded by thermo-compression bonding to the back of hard board 10715 in the range 10715c (see FIG. 58) surrounded by the dashed line.

From the flexible board 10716 a pair of arms 10716bp, 10716by extend in directions on the plane perpendicular to the optical axis to be hooked on hooking parts 10075ep, 10075ey (see FIG. 62) of the support frame 10075, respectively. Terminals of the light emitting elements 10077p, 10077y and terminals of coils 10076p, 10076y are soldered to the arms.

By this, drive of the light emitting elements 10077p, 10077y, such as the IREDs, and the coils 10076p, 10076y is carried out with intervention of the flexible board 10716 from the hard board 10715.

The arms 10716bp, 10716by (see FIG. 58) of the flexible board 10716 have respective bending parts 10716cp, 10716cy, and elasticity of the bending parts decreases loads of the arms 10716bp, 10716by on rotation of the support frame 10075 in the plane perpendicular to the optical axis.

The first yoke 10712 has projecting faces 10712c formed by die cutting, and the projecting faces 10712c penetrate associated holes 10714a of the insulating sheet 10714 to be in direct contact with the hard board 10715. An earth (GND: ground) pattern is formed on this contact surface on the hard board 10715 side. When the hard board 10715 is screwed to the base plate, the first yoke 10712 is earthed to be an antenna, thereby being prevented from giving noise to the hard board 10715.

A mask 10717 shown in FIG. 58 is positioned against pins 10071h of the base plate 10071 and is fixed by a double-adhesive tape on the hard board 10715.

The base plate 10071 has a through hole 10071i (see FIG. 58 and FIG. 61) for permanent magnet, through which the back of the second yoke 10072 is exposed. A permanent magnet 10718 (locking magnet) is set in this through hole 10071i to be magnetically coupled with the second yoke 10072 (see FIG. 59).

A coil 10720 (locking coil) is bonded to a lock ring 10719 (see FIG. 58, FIG. 59, and FIG. 63) and a bearing 10719b (see FIG. 64) is provided on the back of lug 10719a of the lock ring 10719. An armature pin 10721 is put through an armature rubber 10722 (see FIG. 58), the armature pin 10721 is set through the bearing 10719b, thereafter an armature spring 10723 is set around the armature pin 10721, and it is fit into an armature 10724 to be fixed by caulking.

Accordingly, the armature 10724 can slide in the directions of arrows 10725 relative to the lock ring 10719 against the charge force of armature spring 10723.

FIG. 64 is a plan view obtained when the correction optical device after completion of assembly is observed from the back side of FIG. 58. In this figure, the lock ring 10719 is pushed into the base plate 10071 as outer peripheral notches 10719c (at three positions) of the lock ring 10719 are aligned with corresponding internal peripheral projections 10071j (at three positions) of the base plate 10071, and thereafter the lock ring is rotated clockwise to effect well-known bayonet coupling for preventing slip-out, whereby the lock ring 10719 is attached to the base plate 10071.

Therefore, the lock ring 10719 can rotate about the optical axis with respect to the base plate 10071. However, in order to prevent the bayonet coupling from being disengaged when the lock ring 10719 rotates so as to return the notches 10719c into the same phase as the projections 10071j, a lock rubber 10726 (see FIG. 58 and FIG. 64) is pressed into the base plate 10071 to regulate rotation of the lock ring 10719 so that the lock ring 10719 can rotate only by an angle θ (see FIG. 64) of notch part 10719d up to the position where it is regulated by the lock rubber 10726.

A permanent magnet 10718 (locking magnet) is also attached to a locking yoke 10727 (see FIG. 58) of magnetic member, and holes 10727a (at two positions) thereof are engaged with the pins 10071k (see FIG. 64) of the base plate 10071. Then holes 10727b (at two positions) and 10071n (at two positions) are coupled by screwing.

The permanent magnet 10718 on the base plate 10071 side, the permanent magnet 10718 on the locking yoke 10727 side, the second yoke 10072, and the locking yoke 10727 form a well-known closed magnetic circuit.

The locking rubber 10726 is prevented from slipping out when the lock yoke 10727 is screwed. The lock yoke 10727 is not illustrated in FIG. 64 for the sake of above description.

A lock spring 10728 is stretched between hook 10719e of the lock ring 10719 and hook 10071m of the base plate 10071 (see FIG. 64), so as to bias the lock ring 10719 clockwise. An adhesion coil 10730 is inserted into an adhesion yoke 10729 (see FIG. 58 and FIG. 64) to be screwed through a hole 10729a of the base plate 10071.

The terminals of coil 10720 and the terminals of adhesion coil 10730 are, for example, of the twisted pair configuration of four-stranded polyester-coated wires and are soldered to trunk 10716d of the flexible board 10716.

The mechanical part of the correction optical device as described above is roughly composed of three elements, i.e., correction means for moving the optical axis radially, support means for supporting the correction means, and engagement means for engaging the correction means.

The correction means is made up of the lens 10074, support frame 10075, coils 10076p, 10076y, IREDs 10077p, 10077y, position detecting elements 10078p, 10078y, ICs 10731p, 10731y, support balls 10079a, 10079y, charge spring 10710, and support shaft 10711. The support means is made up of the base plate 10071, second yoke 10072, permanent magnets 10073, and first yoke 10712. Further, the engagement means is made up of the permanent magnets 10718, lock ring 10719, coil 10720, armature shaft 10721, armature rubber 10722, armature spring 10723, armature 10724, lock rubber 10726, yoke 10727, lock spring 10728, adhesion yoke 10729, and adhesion coil 10730.

Among the configuration of the correction means, the lens 10074 and support frame 10075 compose a correction optical system, the PSDs 10078p, 10079y, ICs 10731p, 10731y, and IREDs 10077p, 10077y compose position detecting means, and the coils 10076p, 10076y, second yoke 10072, permanent magnets 10073, and first yoke 10712 compose driving means. Namely, the correction means is mainly composed of the constituents of the correction optical system, position detecting means, and driving means for driving the correction optical system.

Then the correction optical device, the vibration detecting means (see FIG. 57), and the like constitute a blur correction system (blur correction device).

The ICs 10731p, 10731y on the hard board 10715 are ICs for amplifying an output from each position detecting element 10078p, 10078y and the internal configuration of each IC is as shown in FIG. 65. (Since the ICs 10731p, 10731y have the same configuration, only 10731p is shown herein.)

In FIG. 65, current-voltage converting amplifiers 10731ap, 10731bp convert photocurrents $10078i_1p$, $10078i_2p$ generated in the position detecting element 10078p (comprised of resistors R1, R2) by the light emitting element 10077p to respective voltages and a differential amplifier 10731cp obtains and amplifies a difference between outputs of respective current-voltage converting amplifiers 10731ap, 10731bp.

The light emitted from the light emitting element 10077p, 10077y is incident, as described previously, through the slit 10075ap, 10075ay onto the position detecting element 10078p, 10078y, but movement of the support frame 10075 in the plane normal to the optic axis will change the position of incidence onto the position detecting element 10078p, 10078y.

The position detecting element 10078p has sensitivity in the directions of arrows 10078ap (see FIG. 58) and the slit 10075ap is so shaped as to broaden a beam in the directions (in the directions 10078ay) perpendicular to the arrows 10078ap and as to narrow the beam in the directions of arrows 10078ap. Therefore, only when the support frame 10075 moves in the direction along the arrow 10713p, the balance between the photocurrents $10078i_1p$, $10078i_2p$ of the position detecting element 10078p changes, and the differential amplifier 10731cp gives an output according to the movement of the support frame 10075 in the direction along the arrow 10713p.

Further, the position detecting element 10078y has detection sensitivity in the directions of arrows 10078ay (see FIG. 58) and the slit 10075ay is shaped to extend in the directions (in the directions 10078ap) perpendicular to the arrows 10078ay. Therefore, only when the support frame 10075 moves in the direction along the arrow 10713y, the position detecting element 10078y changes its output.

A summing amplifier 10731dp obtains the sum of outputs from the current-voltage converting amplifiers 10731ap, 10731bp (the sum of receiving light quantity of the position detecting element 10078p) and a driving amplifier 10731ep receiving this signal drives the light emitting element 10077p in accordance therewith.

Since the above light emitting element 10077p changes its emitting light quantity very unstably depending upon the temperature or the like, the absolute quantity ($10078i_1p$+$10078i_2p$) of the photocurrents $10078i_1p$, $10078i_2p$ of the position detecting element 10078p varies in accordance therewith. This also changes the output from the differential amplifier 10731cp which is ($10078i_1p$-$10078-i_2p$) indicating the position of the support frame 10075.

However, if the light emitting element 10077p is controlled by the aforementioned driving circuit so as to keep the sum of receiving light quantity constant as described above, the output from the differential amplifier 10731cp will not change.

The coils 10076p, 10076y shown in FIG. 58 are located in the closed magnetic circuit made up by the permanent magnets 10073, first yoke 10712, and second yoke 10072. When electric current is made to flow in the coil 10076p, the support frame 10075 is thus driven in the directions of arrows 10713p (the well-known Fleming's left-hand rule). When electric current is made to flow in the coil 10076y, the support frame 10075 is driven in the directions of arrows 10713y.

In general, the configuration is such that the output from the position detecting element 10078p, 10078y is amplified by IC 10731p, 10731y, the coil 10076p, 10076y is driven with the output, and the support frame 10075 is driven thereby to change the output from the position detecting element 10078p, 10078y.

When the driving direction (polarity) of coil 10076p, 10076y is set to the direction to decrease the output of position detecting element 10078*p*, 10078*y* (negative feedback), driving force of the coil 10076*p*, 10076*y* stabilizes the support frame 10075 at a position where the output of position detecting element 10078*p*, 10078*y* becomes almost zero.

This technique of drive with negative feedback of position detection output is called a position control technique, whereby, for example, when a target value (for example, a signal of hand shake angle) is introduced from the outside into the IC 10731*p*, 10731*y*, the support frame 10075 is driven very loyally according to the target value.

In practice, the output from the differential amplifier 10731*cp*, 10731*cy* is sent via the flexible board 10716 to the main board not illustrated to be subjected to analog-digital conversion (A/D conversion) therein and to be taken into a microcomputer.

In the microcomputer the signal is compared with the target value (the signal of hand shake angle) and is amplified as occasion demands, and then the signal is subjected to phase lead compensation by the well-known digital filtering technique (for stabilizing the position control more). After that, the signal is guided again through the flexible board 10716 into the IC 10732 (for driving the coils 10076*p*, 10076*y*). The IC 10732 performs the well-known PWM (Pulse-Width Modulation) of the coils 10076*p*, 10076*y* based on the input signal, thereby driving the support frame 10075.

The support frame 10075 can slide in the directions of arrows 10713*p*, 10713*y* as described previously and the position thereof is stabilized by the position control technique described above. However, in the case of consumer-oriented optical devices such as cameras, always controlling the support frame 10075 is not allowed from the viewpoint for preventing consumption of power supply.

Since in a non-controlled state the support frame 10075 becomes freely movable in the plane perpendicular to the optic axis, a countermeasure is necessary against damage or occurrence of colliding sound at stroke edges thereof in that case.

Three radially projecting protrusions 10075*f* are provided on the back of support frame 10075 as shown in FIG. 62 and FIG. 64 and the tips of the protrusions 10075*f* engage the internal peripheral surface 10719*g* of the lock ring 10719 as shown in FIG. 64. Accordingly, the support frame 10075 is restrained relative to the base plate 10071 in the all directions.

FIGS. 66A and 66B are plan views to show the relationship of operation between the lock ring 10719 and the support frame 10075, which are drawings obtained by extracting only the main part from the plan view of FIG. 64. For facilitating understanding of description, the layout is changed sightly from the actually assembled state. Further, cam portions 10719*f* (at three positions) of FIG. 66A are not provided throughout the entire region in the generatrix direction of the cylinder of lock ring 10719, as shown in FIG. 59 and FIG. 63, so that they are not seen actually along the viewing direction of FIGS. 66A, 66B. However, they are illustrated therein for the sake of explanation.

As shown in FIG. 59, the coil 10720 (10720*a* represents four-stranded leader wires guided along the outer periphery of lock ring 10719 by an unrepresented flexible board or the like and connected to the terminals 10716*e* on the trunk 10716*d* of the flexible board 10716 via the terminals 10719*h*) is in the closed magnetic circuit between the permanent magnets 10718 and generates torque to rotate the lock ring about the optical axis with supply of electric current to the coil 10720.

This drive of coil 10720 is also controlled by a command signal supplied from the unrepresented microcomputer through the flexible board 10716 to the driving IC 10733 on the hard board 10715, and the IC 10733 PWM-drives the coil 10720.

In FIG. 66A, the winding direction of coil 10720 is set so as to generate counterclockwise torque in the lock ring 10719 with energization of coil 10720, so that the lock ring 10719 rotates counterclockwise against the spring force of the lock spring 10728.

The lock ring 10719 is stable before energization of coil 10720 as being kept in contact with the lock rubber 10726 by the force of lock spring 10728.

With rotation of the lock ring 10719, the armature 10724 comes to contact the adhesion yoke 10729 and to contract the armature spring 10723, thereby equalizing the positional relation between the adhesion yoke 10729 and the armature 10724. Thus, the lock ring 10719 stops rotation as shown in FIG. 66B.

FIG. 67 is a timing chart of the drive of lock ring.

When the coil 10720 is energized (PWM-driven as indicated by 10720*b*) at arrow 10719*i* of FIG. 67, the adhesion magnet 10730 is also energized at the same time (10730*a*). Therefore, the armature 10724 comes to contact the adhesion yoke 10729 and then the armature 10724 comes to adhere to the adhesion yoke 10729 at the equalized point of time.

Next, when the energization of coil 10720 is stopped at the point of time indicated by 10720*c* of FIG. 67, the lock ring 10719 becomes ready for clockwise rotation because of the force of lock spring 10728. However, since the armature 10724 adheres to the adhesion yoke 10729 as described above, the rotation is restricted. At this time, the projections 10075*f* of the support frame 10075 are located at positions opposed to the associated cam portions 10719*f* (because the cam portions 10719*f* are rotated up to the positions). Therefore, the support frame 10075 becomes capable of moving by a clearance between the projections 10075*f* and the cam portions 10719*f*.

This allows the support frame 10075 to drop in the direction of gravity G (see FIG. 66B), but no drop occurs because the support frame 10075 is also brought into the controlled state at the point of arrow 10719*i* of FIG. 67.

In the non-controlled state the support frame 10075 is restrained by the internal periphery of the lock ring 10719, but in practice it has a play equivalent to an engagement play between the projection 10075*f* and the internal peripheral wall 10719*g*. Namely, the support frame 10075 drops by this play in the direction of gravity G, so that there is deviation between the center of support frame 10075 and the center of base plate 10071.

Because of it, control is carried out in such a manner that the center of support frame is moved toward the center of base plate 10071 (the optic center) slowly, for example, for one second from the point of arrow 10719*i*.

This is because quick movement to the center would cause a photographer to sense fluctuation of image through the correction lens 10074 and to have unpleasant feeling and because an image can be prevented from being degraded due to the movement of support frame 10075 even with exposure carried out during this period. (For example, the support frame is moved 5 $\mu$m every one eighth second.)

Specifically, the outputs from the position detecting elements 10078*p*, 10078*y* are stored at the point of arrow 10719*i* of FIG. 67, control of the support frame 10075 is started using the output values as target values, and the support frame is moved toward the target values at the optic center preliminarily set, for one second after that (see 10075g in FIG. 67).

After the lock ring 10719 is rotated (unlocked), the support frame 10075 is driven based on the target values from the vibration detecting means (as overlapping with the moving operation of the support frame 10075 to the center position as described above), thus starting blur correction.

When blur correction off is activated at the point of arrow 10719j in order to end the blur correction, the target values from the vibration detecting means stop being supplied to the correction driving means for driving the correction means, thereby stopping the support frame 10075 as controlled at the center position. At this time the power to the adhesion coil 10730 is stopped (10730b). Then the adhesive force of the armature 10724 due to the adhesion yoke 10729 disappears, so that the lock ring 10719 is rotated clockwise by the lock spring 10728, returning to the state of FIG. 66A. Since at this time the lock ring 10719 is restrained from rotating by contact with the lock rubber 10726, the colliding sound of the lock ring 10719 at the end of rotation can be suppressed to a low level.

After that (for example, after a lapse of 20 msec), control to the correction driving means is interrupted to end the timing chart of FIG. 67.

FIG. 68, composed of FIGS. 68A and 68B, and FIG. 69 are block diagrams to show the outline of the blur correction system.

In these diagrams, reference numeral 10091 designates vibration detecting means corresponding to the vibration detecting means 10083p, 10083y of FIG. 67, which is composed of a deviation detecting sensor for detecting angular velocity, such as a vibration gyro, and sensor output calculating means for cutting the DC component of an output from the deviation detecting sensor and for integrating it to obtain angular displacement.

The angular displacement signal from this vibration detecting means 10091 is supplied to target value setting means 10092. This target value setting means 10092 is composed of a variable differential amplifier 10092a and a sample-hold circuit 10092b, as shown in FIGS. 68A and 68B. Since the sample-hold circuit 10092b is always in sample, two input signals into the variable differential amplifier 10092a are always equal and an output thereof is zero. However, when the sample-hold circuit 10092b is changed into a hold state by an output from delay means 10093 described below, the variable differential amplifier 10092a starts continuous output, taking zero at that point.

The amplification factor of the variable differential amplifier 10092a can be varied by output of blur correction sensitivity setting means 10094. The reason of this variable arrangement is as follows. A target value signal of the target value setting means 10092 is a target value (command signal) for correction means 10910 to follow up, and a correction amount of the image plane to a drive amount of the correction means 10910 (i.e., blur correction sensitivity) changes depending upon optical characteristics based on focus change upon zooming, focusing, or the like. Therefore, the variable configuration of amplification is for compensating for the change of blur correction sensitivity.

Therefore, the blur correction sensitivity setting means 10094 receives, as shown in FIGS. 68A and 68B, zooming focal-length information from zoom information output means 10095 and focusing focal-length information based on distance-measurement information of exposure preparation means 10096, and calculates the blur correction sensitivity based on the information or extracts blur correction sensitivity information preliminarily set, based on the information, thereby changing the amplification factor of the variable differential amplifier 10092a in the target value setting means 10092.

The correction drive means 10097 corresponds to the ICs 10731p, 10731y, 10732 mounted on the hard board 10715 of FIG. 58 and the target value from the target value setting means 10092 is supplied as a command signal to the correction drive means 10097.

Correction activation means 10098 is a switch for controlling connection of coils 10086p, 10086y provided in the correction means 10910 with the IC 10732 on the hard board 10715 of FIG. 58. As shown in FIG. 69, both terminals of each coil 10076p, 10076y are normally short-circuited by connecting the switch 10098a with the terminal 10098c. With an input signal from AND means 10099 the switch 10098a is connected to terminal 10098b to change the correction means 10910 into the control state (in which the blur correction is not started yet, but power is supplied to the coils 10076p, 10076y to stabilize the correction means 10910 at the position where the signals from the position detecting elements 10084p, 10084y become almost zero). At the same time as it the output signal of AND means 10099 is also supplied to engaging means 10914, whereby the engaging means 10914 releases engagement of the correction means 10910.

The correction means 10910 supplies the position signals of position detecting elements 10084p, 10084y to the correction drive means 10097 to perform the position control as described above.

When the AND means 10099 receives inputs of two signals, a release half-depression signal SW1 of release means 10911 and an output signal from blur correction changeover means 10912, AND gate 10099a (see FIGS. 68A and 68B), which is a component of the AND means, outputs a signal. Namely, when the photographer turns on a blur correction switch of blur correction changeover means 10912 and when the photographer half depresses the release means 10911, the correction means 10910 is disengaged to go into the control state.

The SW1 signal of release means 10911 is also supplied to the exposure preparation means 10096, as shown in FIGS. 68A and 68B, and the exposure preparation means 10096 performs photometry, distance measurement, and lens focusing drive. Focusing information obtained here is supplied to the blur correction sensitivity setting means 10094.

The delay means 10093 receives an output signal from the AND means 10099 and outputs it, for example, one second after, thereby making the target value setting means 10092 output the target value signal as described above.

Although not illustrated, the vibration detecting means 10091 also starts in synchronism with the SW1 signal of the release means 10911. As described previously, an arithmetic of output from a sensor including a large time constant circuit such as an integrator requires a certain time before the output becomes stabilized.

The delay means 10093 functions to wait for stabilization of output from the vibration detecting means 10091 and thereafter to make the target value signal output to the correction means 10910, thus achieving the configuration to start the blur correction after the output from the vibration detecting means 10091 becomes stabilized.

Exposure means 10913 moves the mirror up with input of a release full-depression SW2 signal from the release means 10911, opens and closes the shutter at a shutter speed obtained based on a photometric value of the exposure preparation means 10096 to effect exposure, and then moves the mirror down, thus ending photography.

When after end of photography the photographer takes the finger away from the release means 10911 to turn the SW1 signal off, the AND means 10099 stops its output, the sample-hold circuit 10092b of the target value setting means 10092 goes into the sampling state, and the output from the variable differential amplifier 10092a becomes zero. Accordingly, the correction means 10910 returns into the control state with stopping correction drive.

Since the output of AND means 10099 becomes off, the engaging means 10914 engages the correction means 10910 and thereafter the switch 10098a of the correction activation means 10098 is connected to the terminal 10098c, thereby making the correction means 10910 non-controlled.

The vibration detecting means 10091 continues its operation, by a non-illustrated timer, for a certain period of time (for example, for five seconds) after stop of manipulation of the release means 10911 and then stops. The reason is as follows. It is frequent for the photographer to perform a subsequent release operation after stop of a previous release operation. The above configuration can prevent the vibration detecting means 10091 from being actuated every time in such cases, thereby decreasing the wait time before stabilization of output thereof. When the vibration detecting means 10091 is already started, the vibration detecting means 10091 sends an already-actuated signal to the delay means 10093, thereby shortening the delay time.

FIG. 70 is a flowchart to show the sequential operation when the above operation is processed by a microcomputer, which will be described briefly.

When the camera is powered, the microcomputer first checks the status of the blur correction switch; if the switch is on then the microcomputer will determine whether the release half-depression signal SW1 is generated (#5101→#5102). When the release half-depression signal SW1 is generated, the microcomputer starts the internal timer (#5103). For enabling the photometry, distance-measuring operation, start of deviation detection, and blur correction control by the correction means 10910, the microcomputer releases engagement of the correction means (#5104).

Next, the microcomputer checks whether the counting content in the above timer reaches a predetermined time t1; if not, it will remain at this step before arrival (#5105). This is the process for waiting for the time to stabilize the output from sensor as described previously. When the predetermined time t1 has elapsed, the microcomputer drives the correction means 10910 based on the target value signal to start the blur correction control (#5106).

Next, the microcomputer checks whether the release full-depression signal SW2 is generated or not (#5107). If not, the microcomputer will determine again whether the release half-depression signal SW1 is generated. If the release half-depression signal is not generated either (NO at #5108) the microcomputer will stop the blur correction control and engage the correction means 10910 at the predetermined position (#5111→#5112).

If the release full-depression signal SW2 is not generated but if the release half-depression signal is generated, the operation of steps #5107→#5108→#5107 . . . will be repeated. When the release full-depression signal SW2 is generated in this state (YES at #5107), the exposure operation is carried out onto the film (#5109). Then the microcomputer checks the status of release half-depression signal SW1 (#5110). When the signal becomes off, the microcomputer stops the blur correction control and engages the correction means 10910 at the predetermined position (#5111→#5112).

After the above operation is finished, the microcomputer then resets the above timer once and again starts it (#5113). Then the microcomputer determines whether the release half-depression signal SW1 is again generated within a predetermined time (i.e., within five seconds herein) (#5114→#5115→#5114 . . . ). If the release half-depression signal SW1 is again generated within five seconds after stop of blur correction (YES at #5115), then the microcomputer will perform the photometry, distance-measuring operation, and release of engagement of the correction means 10910 (#5116). Since the deviation detection is still on, the microcomputer immediately performs the drive control of correction means 10910, based on the target value signal (#5106), then repeating the same operation as described above.

Namely, execution of this processing can avoid such inconvenience that the microcomputer actuates the vibration detecting means 10091 and awaits stabilization of output thereof every time the photographer stops the release operation and then restarts the release operation as described above.

On the other hand, when the release half-depression signal SW1 is not generated within five seconds after stop of blur correction (YES at #5114), the microcomputer stops the deviation detection (or stops the drive of vibration detecting means 10091) (#5117). After that, the microcomputer returns to step #5101 to go into the state of waiting for on of the blur correction switch.

SUMMARY OF THE INVENTION

One aspect of the invention is to provide a position detecting apparatus applied to an image blur correction device having a movable member, which includes:

a light emitting device;

a reflecting member for reflecting light from said light emitting device, said reflecting member having portions with different reflectivities, wherein a position upon which the light from said light emitting device impinges changes according to movement of the movable member; and a light receiving device for receiving light reflected by said reflecting member and for outputting a signal representing a position of the position-detected object in accordance with the light received, thereby realizing the position detecting apparatus in the simplified and cost-reduced configuration.

Another aspect of the invention is to provide an image blur correction apparatus having:

a movable member for moving in order to prevent an image blur;

a detecting device for detecting a position of said movable member, said detecting device including:

a light emitting portion;

a reflecting member for reflecting light from said light emitting portion, said reflecting member having portions with different reflectivities, wherein a position upon which the light from said light emitting device impinges changes according to movement of said movable member; and a light receiving portion for receiving light reflected by said reflecting member and for outputting a signal representing a position of said movable member in accordance with the light received; and a control device for controlling operation of said movable member in accordance with a detection output of said detecting device, thereby realizing the image blur correction apparatus that can simplify the configuration for detecting the position of the movable member and that can achieve the cost reduction.

Another aspect of the invention is to provide an optical apparatus having:

a movable optical member;

a detecting device for detecting a position of said movable optical member, said detecting device including:

a light emitting portion;

a reflecting member for reflecting light from said light emitting portion, said reflecting member having portions with different reflectivities, wherein a position upon which the light from said light emitting device impinges changes according to movement of said movable optical member; and a light receiving portion for receiving light reflected by said reflecting member and for outputting a signal representing a position of said movable optical member in accordance with the light received; and a control device for controlling operation of said movable optical member in accordance with a detection output from said detecting device, thereby realizing the optical apparatus that can simplify the configuration for detecting the position of the movable optical member and that can achieve the cost reduction.

BRIEF DESCRIPTION OF THE DRAWINGS

FIG. 3 is a drawing for explaining advantages and disadvantages in the respective arrangements of the reflecting plates and photoreflectors shown in FIG. 1 and FIG. 2;

FIG. 7, composed of FIGS. 7A and 7B, is a block diagram to show the rest part of the configuration of the camera according to the first embodiment of the present invention;

FIG. 8 composed of FIGS. 8A and 8B, is a block diagram to show a part of the configuration of a camera according to the second embodiment of the present invention;

FIG. 12, composed of FIGS. 12A and 12B, is a block diagram show the rest part of the configuration of the camera according to the third embodiment of the present invention;

FIG. 13 is a drawing to show an output state of the position detecting sensor of FIG. 12 for a certain period after supply of power;

FIG. 15, composed of FIGS. 15A and 15B, is a block diagram to show the rest part of the configuration of the camera according to the fourth embodiment of the present invention;

FIG. 17, composed of FIGS. 17A and 17B, is a block diagram to show a part of the configuration of a camera according to the fifth embodiment of the present invention;

FIG. 18, composed of FIGS. 18A and 18B, is a block diagram to show the rest part of the configuration of the camera according to the fifth embodiment of the present invention;

FIG. 32 is a plan view to show the main configuration of a deviation correction device according to the eighth embodiment of the present invention;

FIG. 33A and FIG. 33B are drawings for explaining output waveforms from the respective position sensors of FIG. 32;

FIG. 66A and FIG. 66B are drawings to show states observed when the lock ring of FIG. 58 is driven;

DETAILED DESCRIPTION OF THE PREFERRED EMBODIMENTS

The present invention will be described in detail based on the embodiments illustrated.

Figure 1:
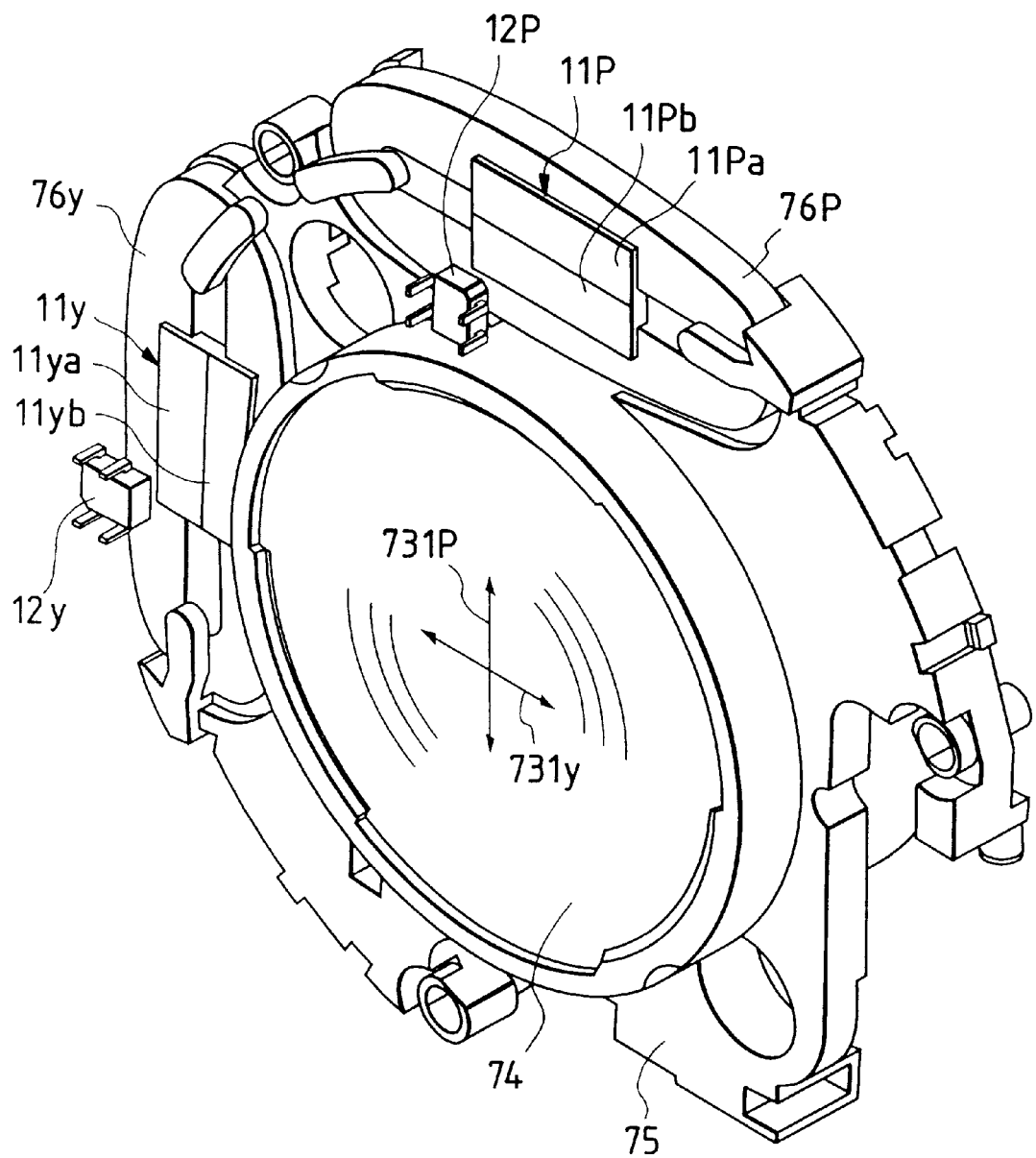
FIG. 1 is a perspective view to show the configuration of correction means according to the first embodiment of the present invention.
Figure 57:
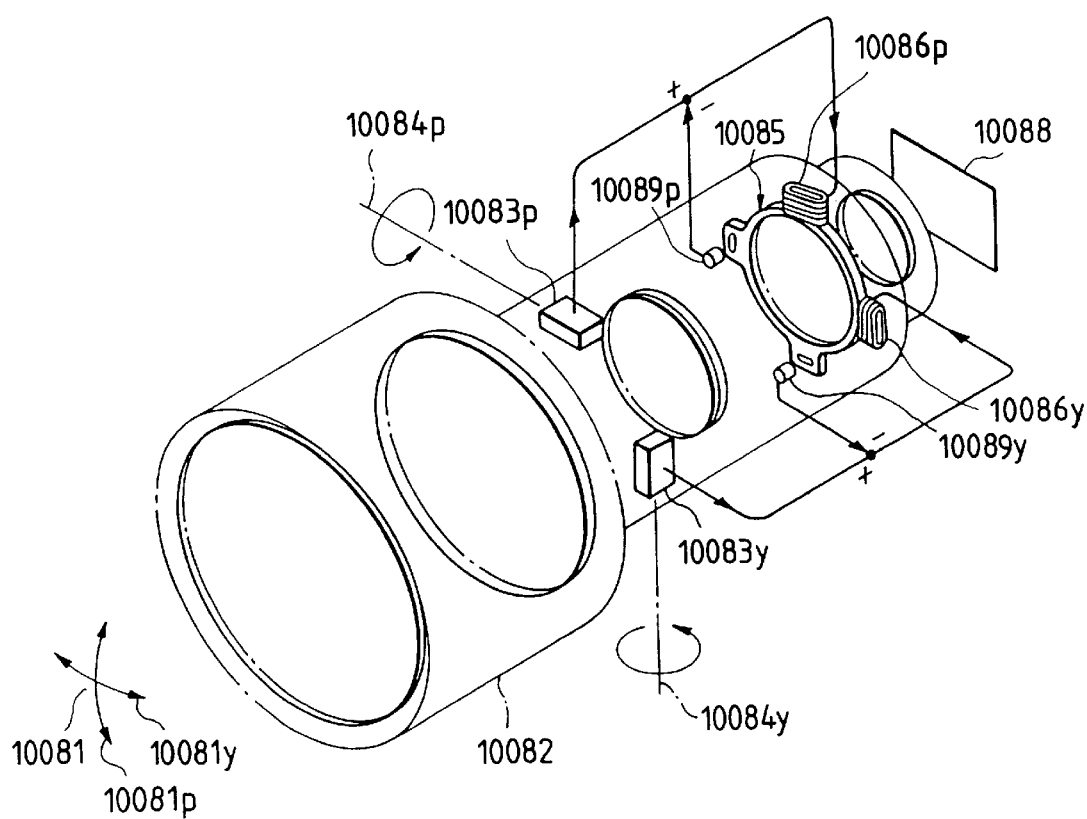
FIG. 57 is a perspective view to show the schematic configuration of the conventional blur correction system.
Figure 58:
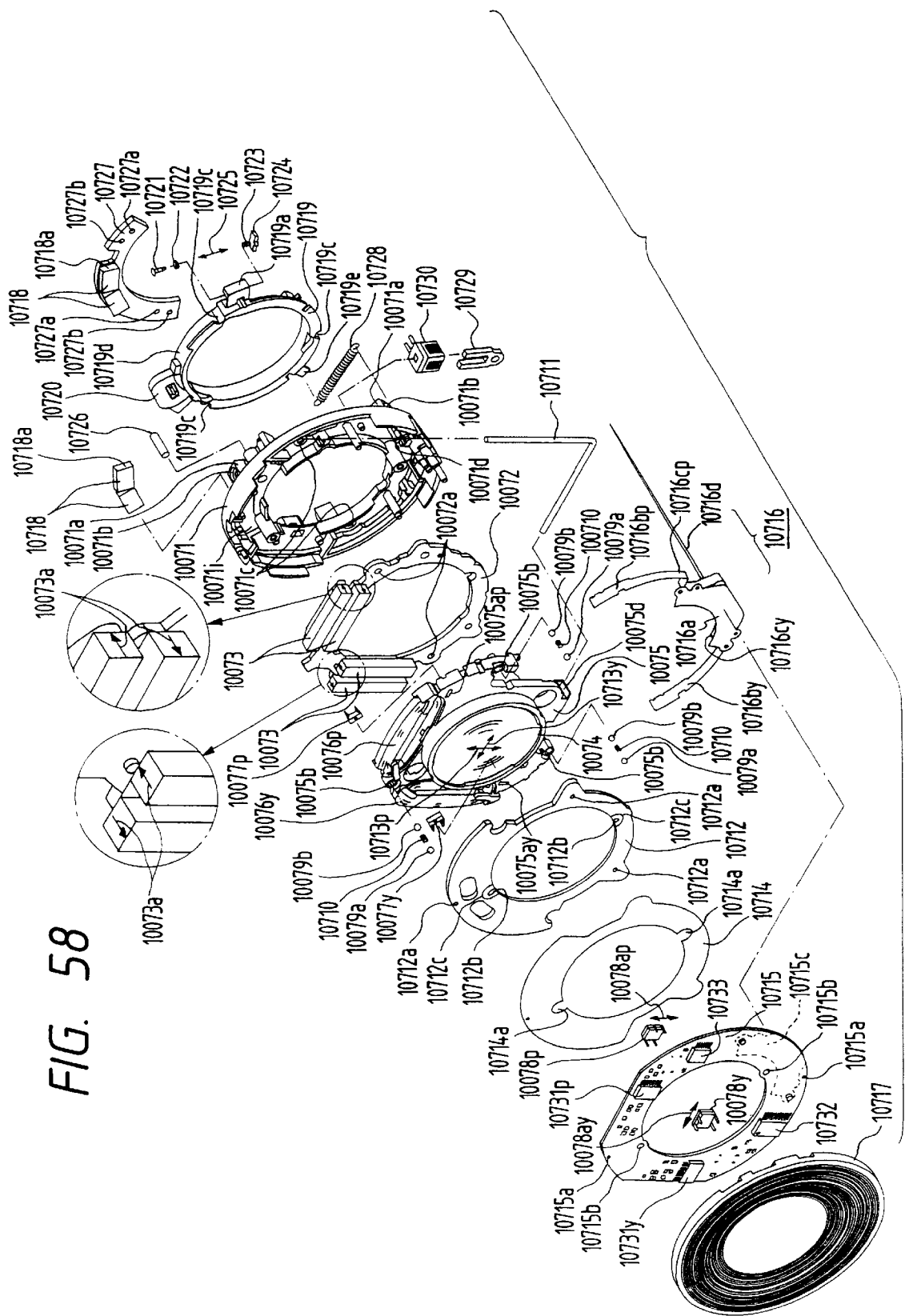
FIG. 58 is an exploded perspective view to show the structure of the correction optical device of FIG. 57.
Figure 59:
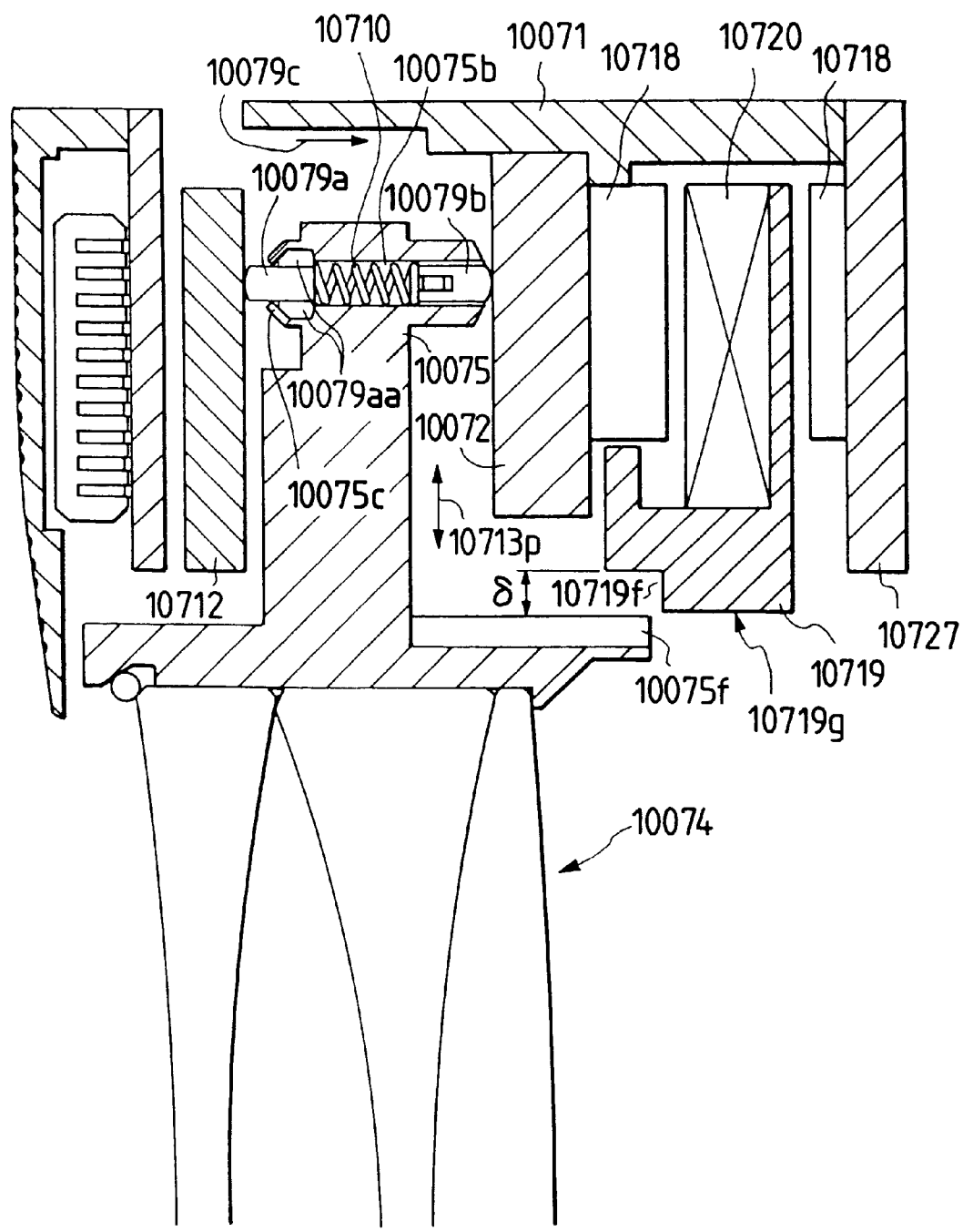
FIG. 59 is a drawing for explaining the shape of the hole in the support frame in which the sandwich means of FIG. 58 is inserted.
Figure 60A:
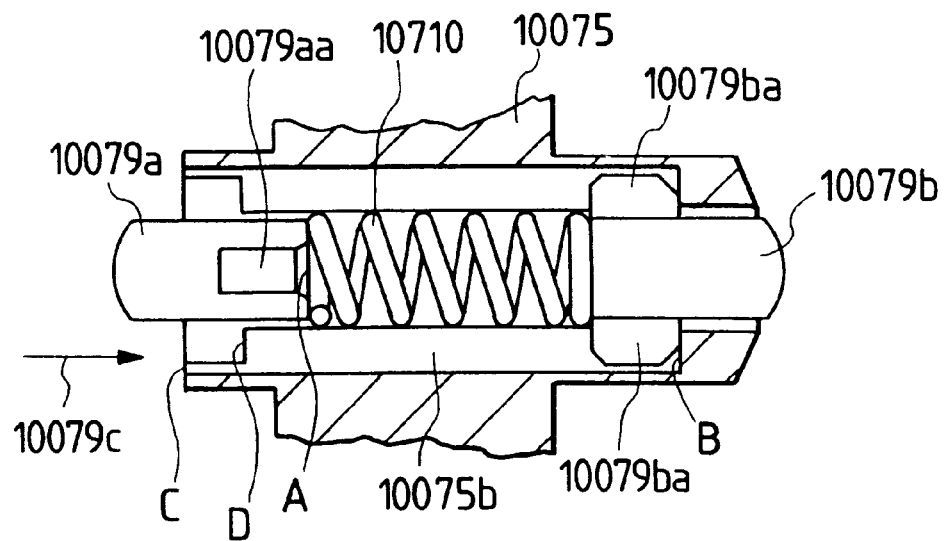
FIG. 60A and FIG. 60B are a cross-sectional view and a side view, respectively, to show the state wherein the support frame is incorporated in the base plate of FIG. 58.
Figure 60B:
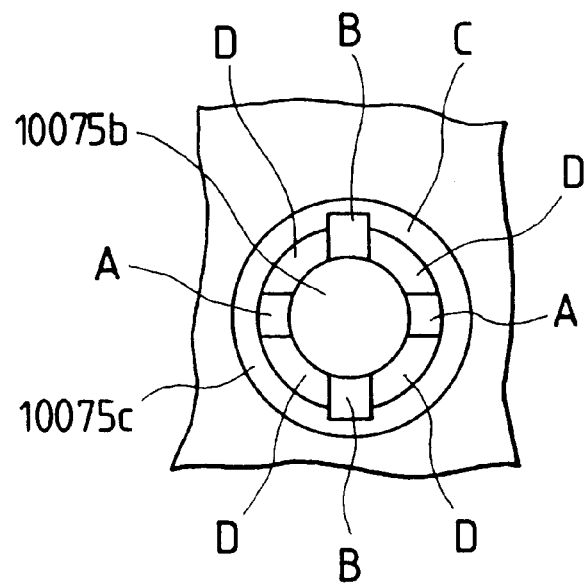
Figure 61:
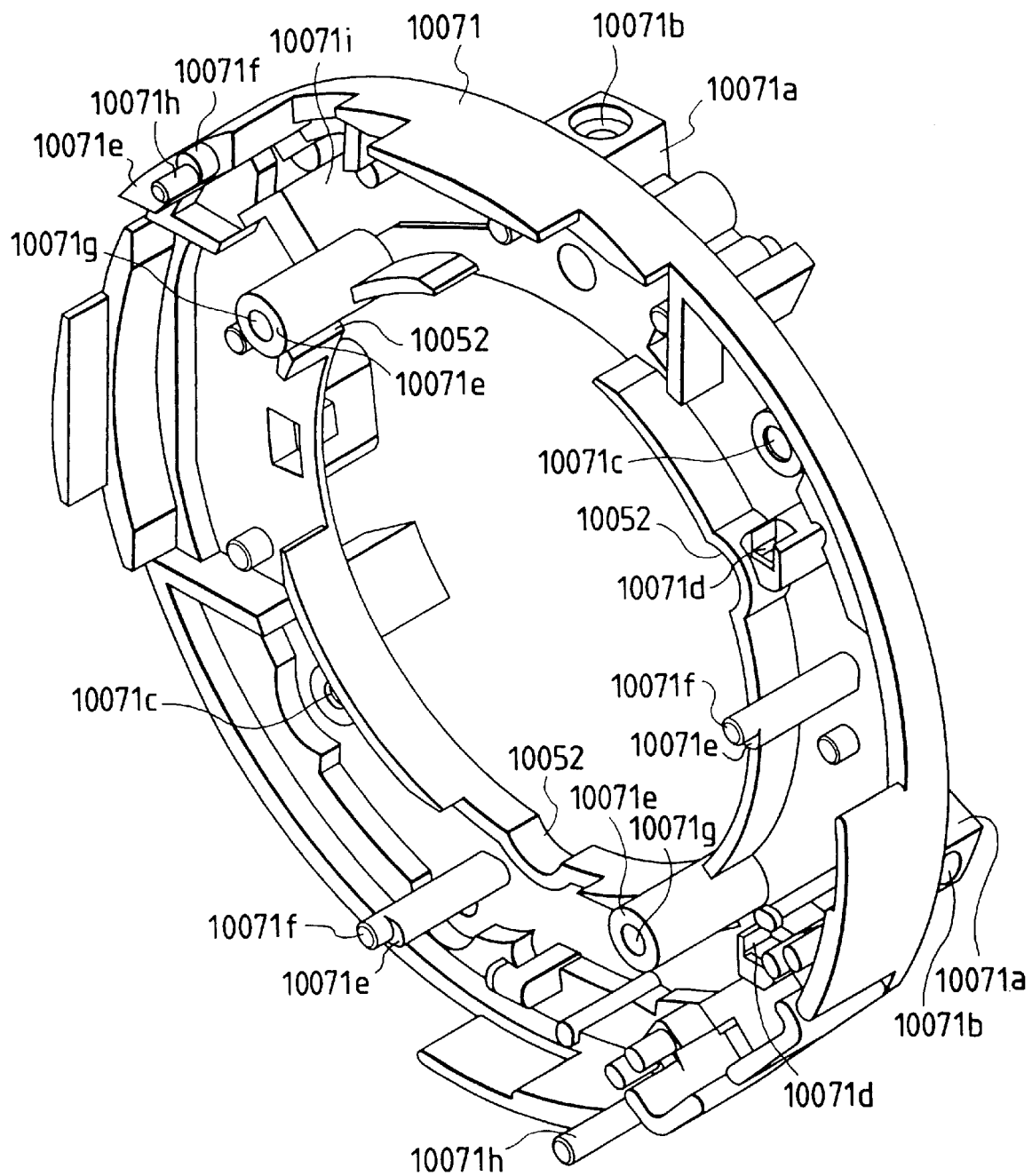
FIG. 61 is a perspective view to show the base plate shown in FIG. 58.
Figure 62:
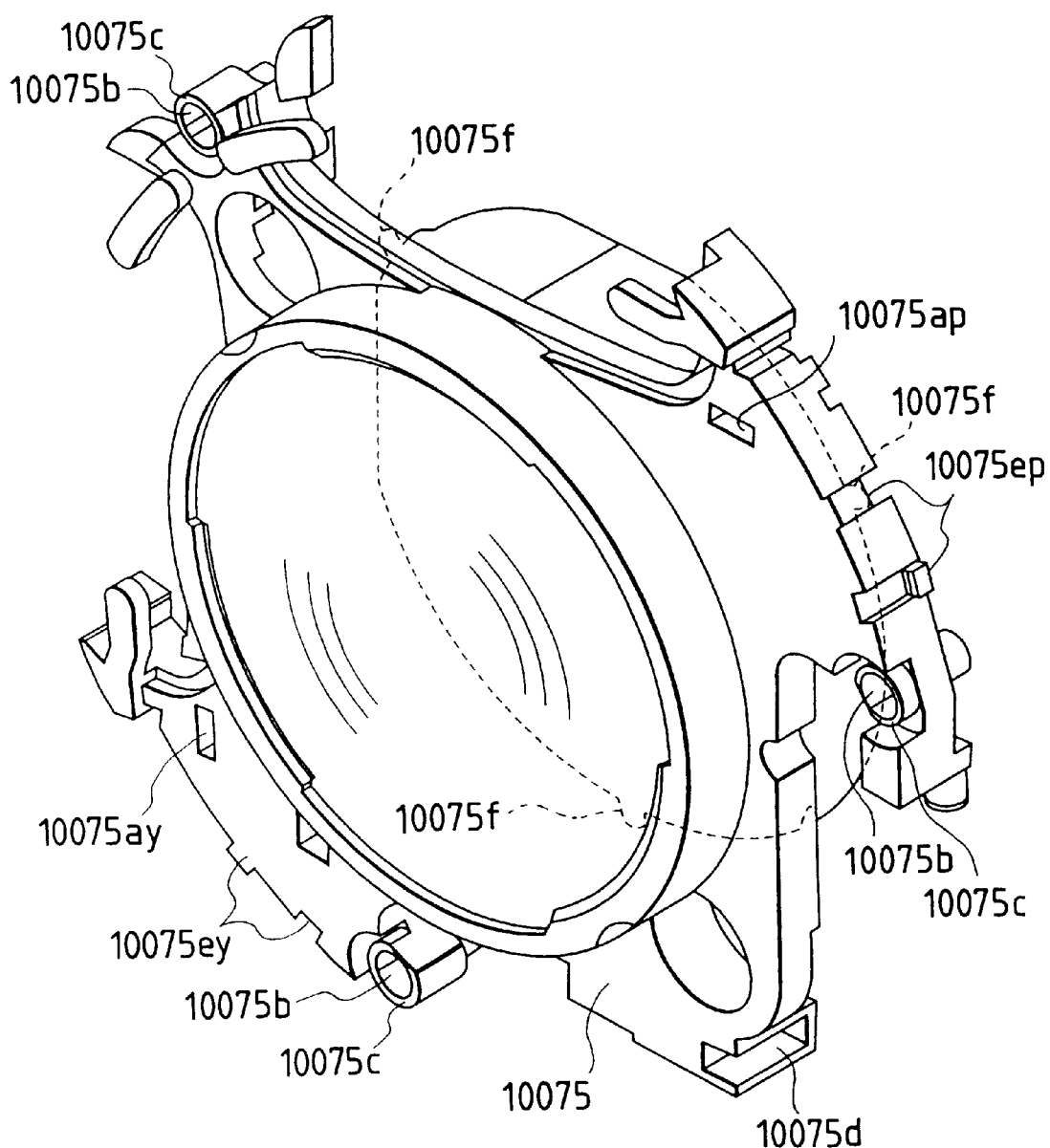
FIG. 62 is a perspective view to show the support frame shown in FIG. 58.
Figure 63:
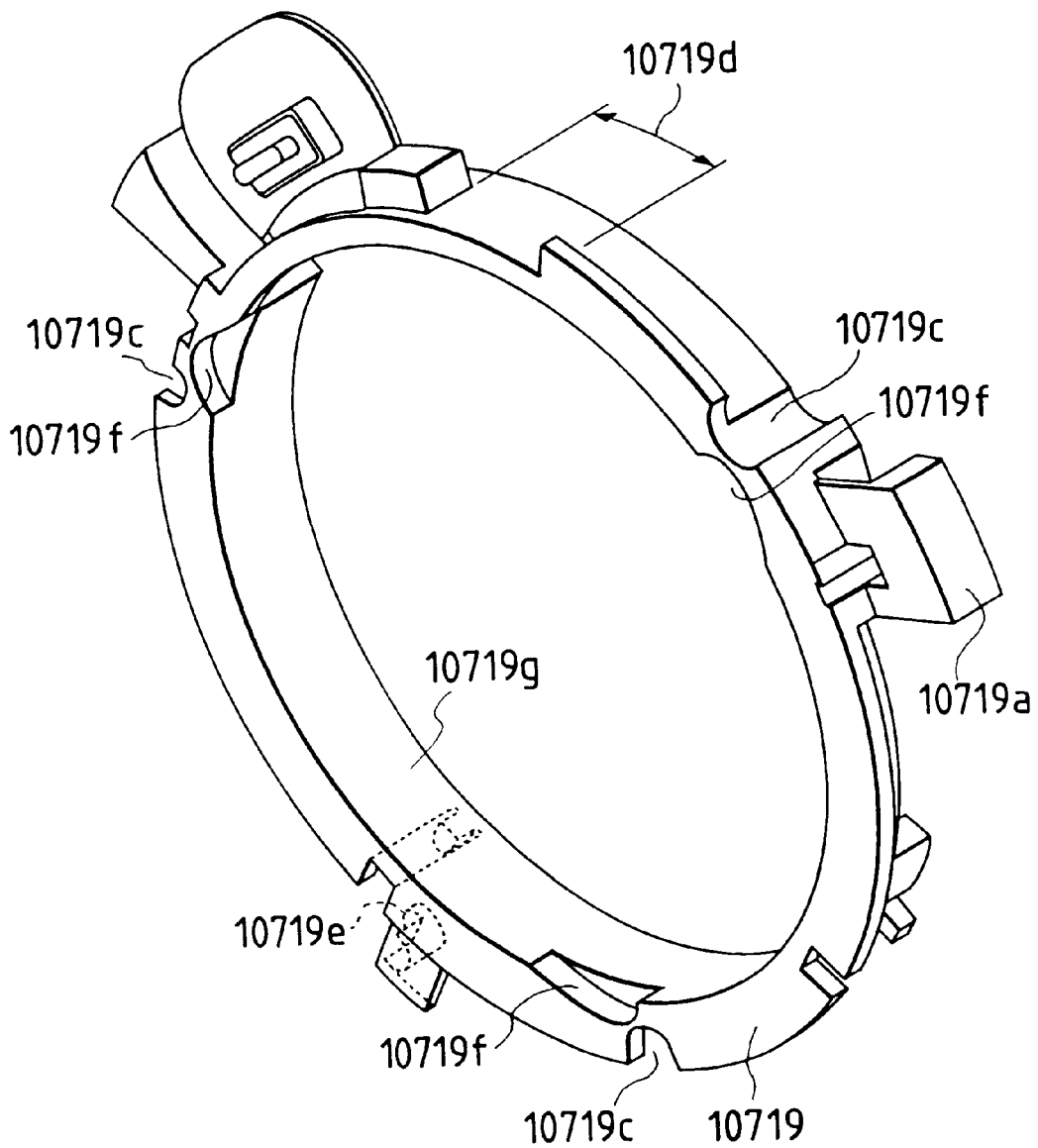
FIG. 63 is a perspective view to show the lock ring shown in FIG. 58.
Figure 64:
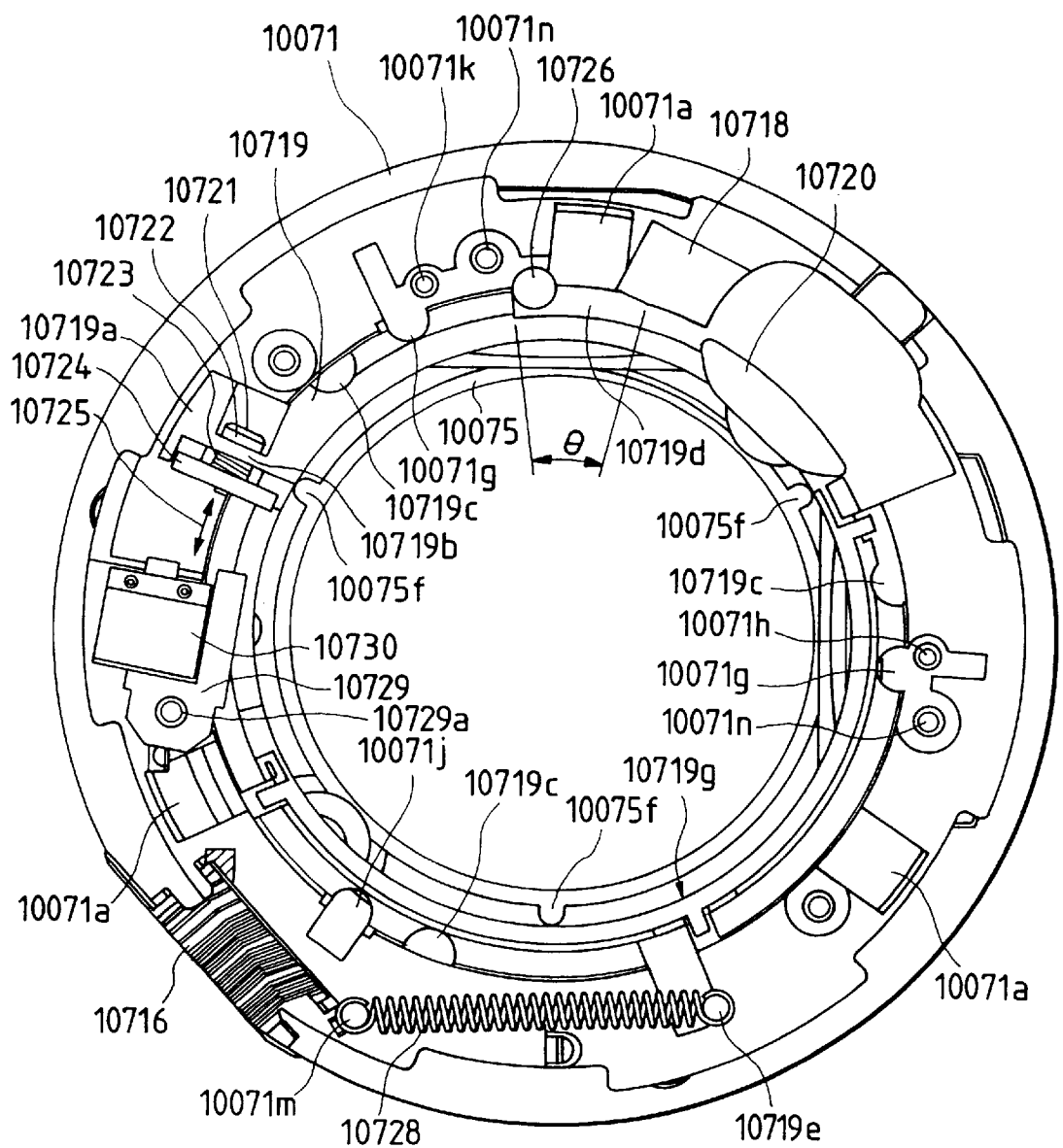
FIG. 64 is a front view to show the support frame etc. of FIG. 58.
Figure 65:
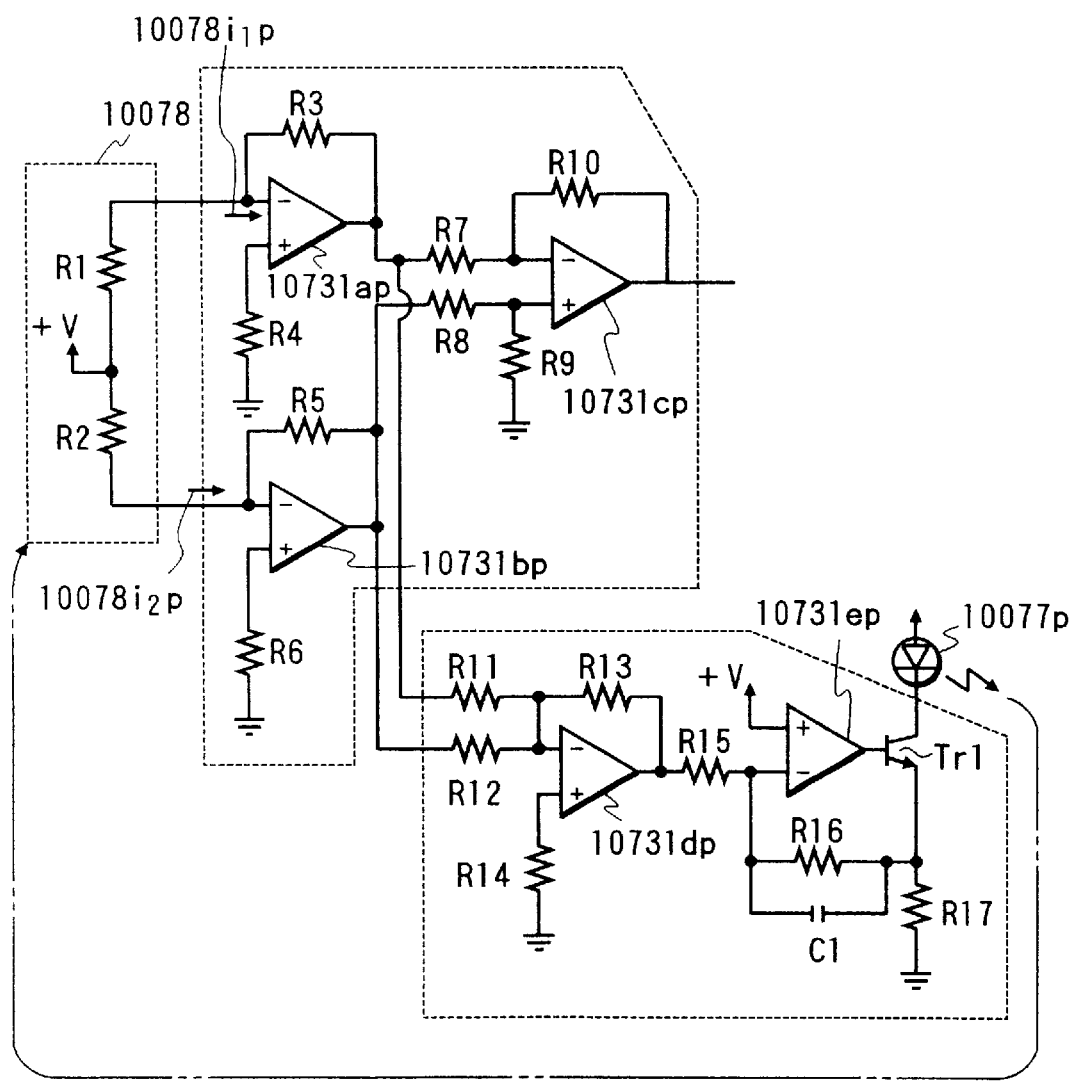
FIG. 65 is a circuit diagram to show the configuration of IC for amplifying the output from the position detecting element of FIG. 58.
Figure 67:
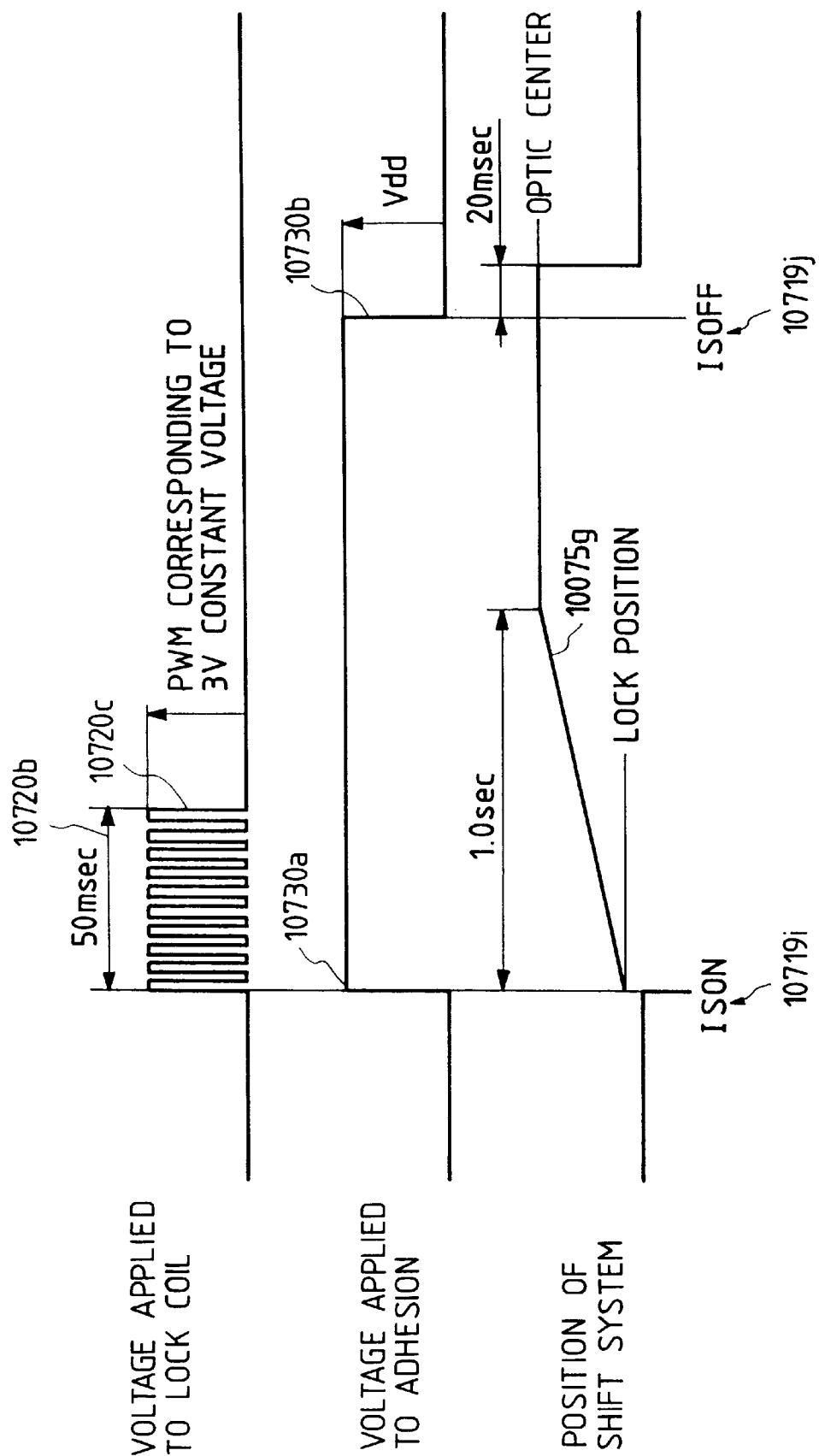
FIG. 67 is a drawing to show signal waveforms upon drive of th lock ring of FIGS. 66A and 66B.

FIG. 1 is a perspective view of the correction means according to the first embodiment of the present invention, and the configuration of the correction optical device including this correction means is basically the same as that of the conventional correction optical device as described with FIG. 57. Thus, illustration of the configuration is omitted herein.

However, the configuration of the correction optical device according to the present invention excludes the position detecting elements 10078p, 10078y of PSDs or the like, the IREDs 10077p, 10077y as light emitting elements, and the ICs 10731p, 10731y for amplifying the outputs from the position detecting elements employed in the conventional example. Instead thereof, it is configured in such an arrangement that reflecting plates 11p, 11y are provided nearly at the center of coils 76p, 76y, respectively, and that photoreflectors 12p, 12y are provided on the hard board 715, not illustrated, so as to face reflective surfaces of the reflecting plates. The gap between the reflecting plates 11p, 11y and the photoreflectors 12p, 12y opposed to each other appears wide in FIG. 1 only for the sake of clarity, but this gap is set to be as narrow as, for example, about 0.5 mm in practice, thereby preventing an increase in size of apparatus.

On the reflective surface of the reflecting plate 11p, 11y a dark pattern 11pa, 11ya and a light pattern 11pb, 11yb are printed on either side of a border line perpendicular to the directions of arrows 731p, 731y, so that light emitted from the photoreflector 12p, 12y is reflected by either one of the patterns to be again incident to the photoreflector 12p, 12y. This incident light reveals a difference of intensity due to a difference between reflectivities of the above light and dark patterns, which changes the output from the photoreflector 12p, 12y. Since the reflecting plate 11p, 11y is mounted on the coil 76p, 76y, respectively, it moves in the directions of arrows 731p, 731y in accordance with the deviation correction drive of the correction optical system (comprised of lens 74 and support frame 75). Since the output from the photoreflector 12p, 12y changes according to the moving direction of the reflecting plate 11p, 11y, detection of this output is nothing but detection of the position of the correction optical system, that is, detection of the position of the correction means.

Accordingly, the correction means can be also drive-controlled using the photoreflectors 12p, 12y in place of the conventional position detecting elements (PSDs) 10078p, 10078y.

Now, described is the reason why the position is detected by such an arrangement that the plane (the reflective surface) of the reflecting plate 11p, 11y is made in parallel with the directions of arrows 731p, 731y and that the dark pattern 11pa, 11ya and light pattern 11pb, 11yb are provided on each reflective surface.

For obtaining the position by continuously detecting the change of reflected light with the photoreflector 12p, 12y, the normally employed method is a method for detecting a change in the gap between the photoreflector 12p, 12y and the reflecting plate 11p, 11y opposed thereto.

Figure 2:
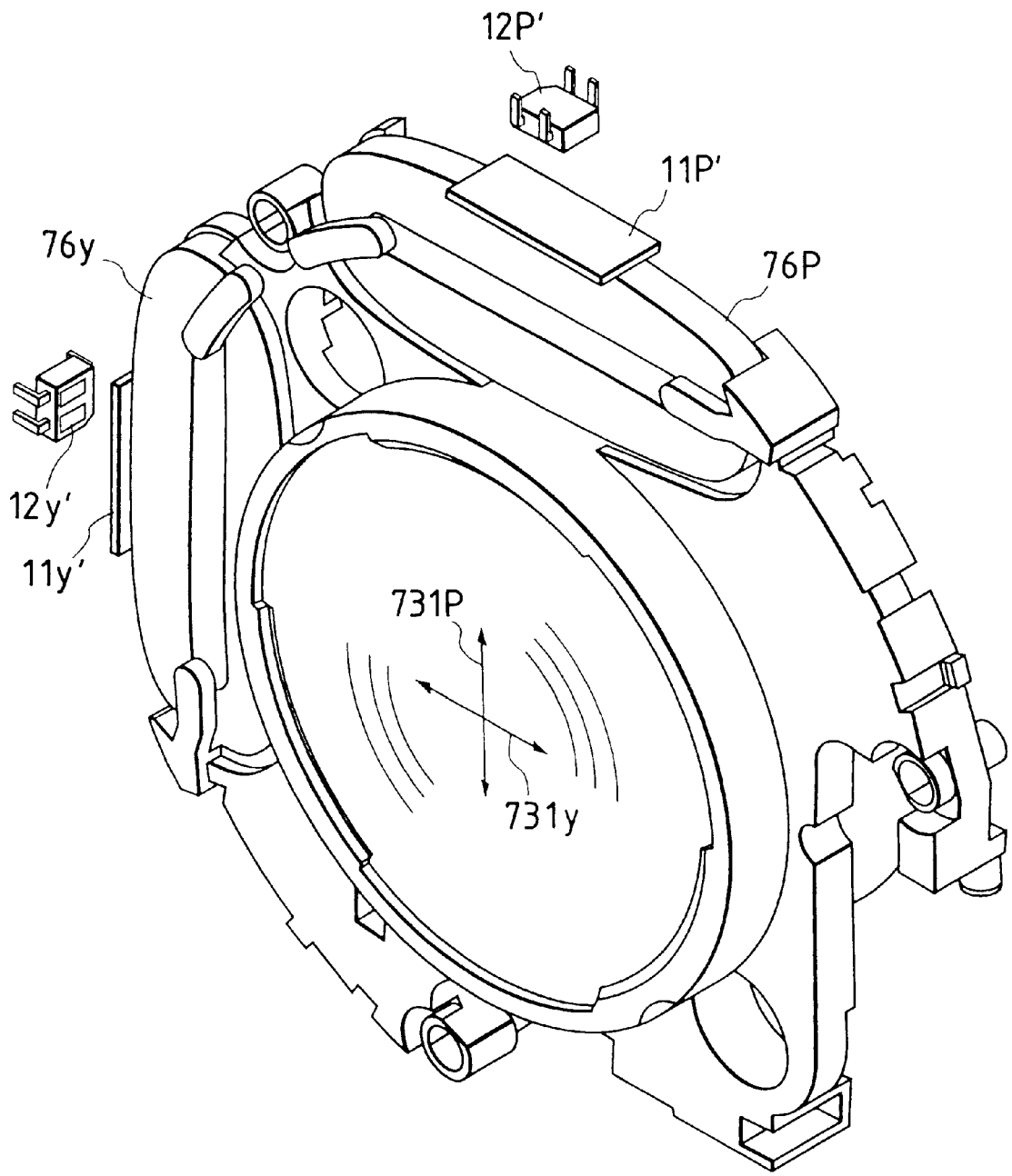
FIG. 2 is a perspective view to show the correction means in such a configuration that reflecting plates and photoreflectors are placed at different positions from those in FIG. 1.

It is possible to detect the position by such an arrangement, for example as shown in FIG. 2, that reflecting plates 11p', 11y' are provided on coils 76p, 76y, respectively, (so that the reflective surface of the reflecting plate 11p' becomes perpendicular to the directions of arrows 731p and the reflective surface of the reflecting plate 11y' becomes perpendicular to the directions of arrows 731y) and that photoreflector 12p', 12y' detects a change in the intensity of reflected light due to a change in the gap between the reflecting plate and the photoreflector 12p', 12y' opposed thereto (i.e., due to the deviation correction drive of the correction means). Use of this arrangement, however, raises two problems below.

The first problem is the size. FIG. 3 is a drawing to show the pairs of reflecting plate and photoreflector together for comparison of the arrangements of FIG. 1 and FIG. 2. In the arrangement of the reflecting plate 11p' and photoreflector 12p' shown in FIG. 2, the gap 13' between the two facing elements must be greater than the deviation correction stroke of the correction means as shown in FIG. 3. This increases the size (whereas, in the arrangement of FIG. 1, the gap 13 does not vary with the deviation correction drive of the correction means and the gap 13 can be thus set narrower, allowing the compact arrangement).

The second problem is as follows. In the case of the arrangement of FIG. 2, the output from the photoreflector 12p', 12y' does not have proportionality to the change in the gap between the facing photoreflector 12p', 12y' and reflecting plate 11p', 11y' (i.e., the output has no linearity). Therefore, a complicated circuit is required to correct the output from the photoreflector 12p', 12y' in order to know the position of the correction means. In contrast with it, the arrangement of FIG. 1 obtains a proportional region of the output of photoreflector 12p, 12y to movement of the border line in the directions of arrows 731p, 731y on the border between the light and dark patterns.

Accordingly, the system of FIG. 1 is more suitable as position detecting means of the correction means that is required to detect the position with accuracy and that is expected to decrease its size.

Figure 4A:
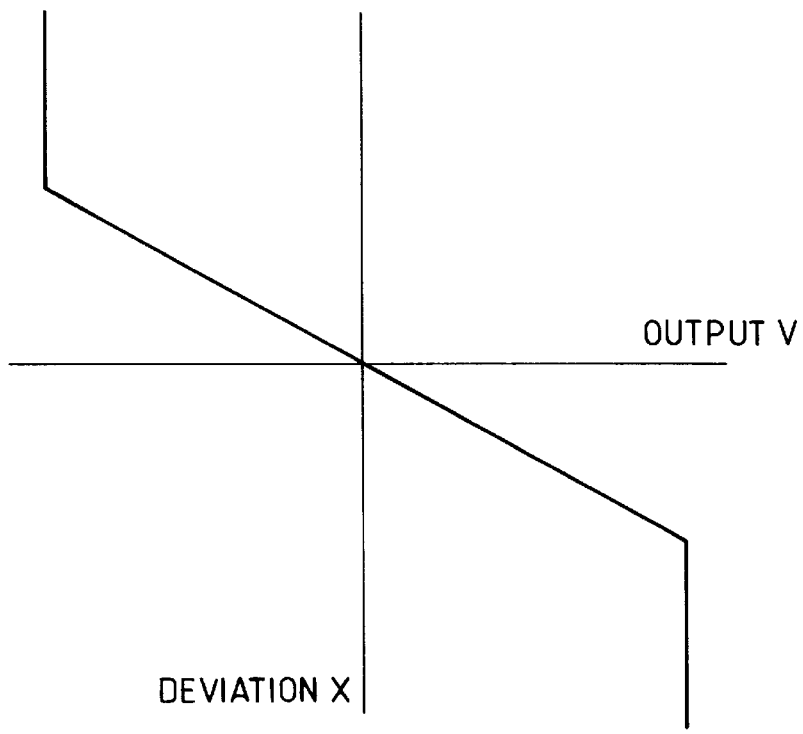
FIG. 4A and FIG. 4B are drawings for explaining output characteristics the photoreflectors of FIG. 1.

Even in the arrangement of FIG. 1 described above, the change in the output from the photoreflector 12p, 12y is obtained only in the vicinity of the border line between the light and dark patterns. FIG. 4A shows a state of the output, wherein the output change appears only in the narrow range around the central portion and the output saturates in the other regions. Therefore, the position detection accuracy is high on one hand, but a wide detection stroke cannot be attained on the other hand.

Figure 5A:
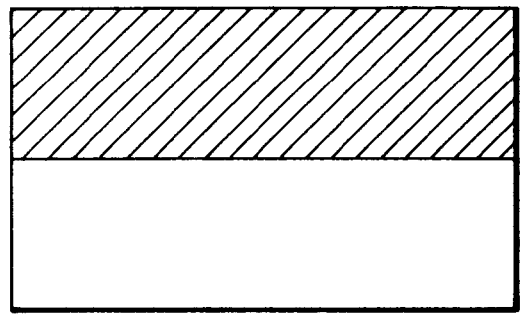
FIG. 5A, FIG. 5B, and FIG. 5C are drawings for explaining plan-view shapes (light/dark pattern shapes) of the reflecting plate FIG. 6, composed of FIGS. 6A and 6B, is a block diagram to show a part of the configuration of a camera according to the first embodiment of the present invention.
Figure 5B:
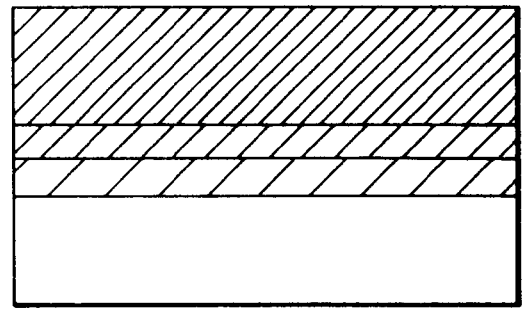
Figure 5C:
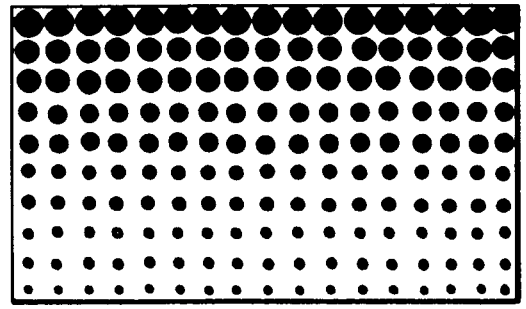

Thus, the light and dark patterns of reflecting plate 11p, 11y are better to be those with a gradated border zone in a certain range, those as shown in FIG. 5B wherein a plurality of intermediate reflectivity zones are provided in the border zone, or those as shown in FIG. 5C wherein a lot of dots are printed in fading sizes of dot on the reflecting plates 11p, 11y, rather than the separate light and dark patterns of two colors as shown in FIG. 5A.

Figure 4B:
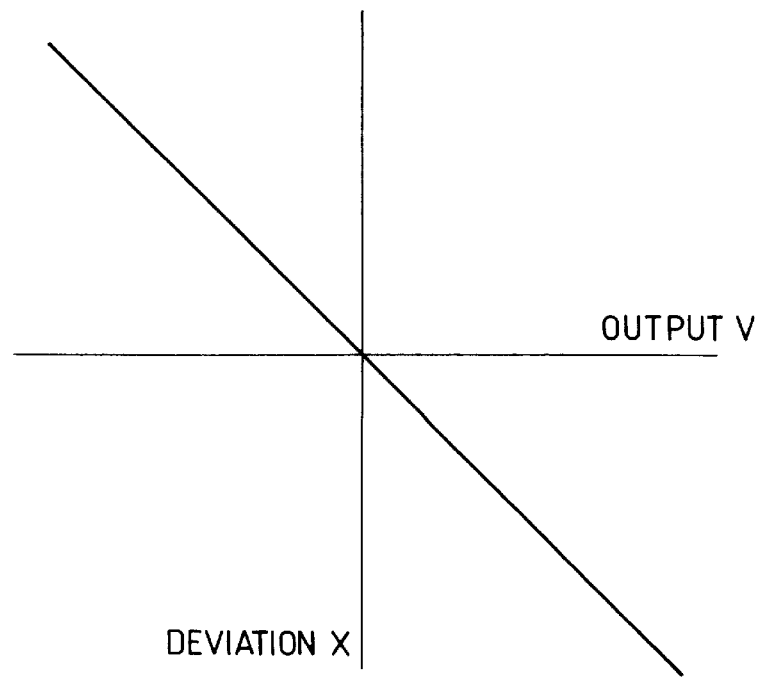

When the reflective surfaces are made of such light and dark patterns, the position detection stroke range can be broadened as shown in FIG. 4B. There is such a merit that the output states (the relation between position and output) of the photoreflectors 12p, 12y can be controlled by changing the arrangement of patterns of reflecting surface.

The longitudinal direction of the reflective surface of each reflecting plate 11p, 11y extends along the direction perpendicular to the directions of arrows 731p, 731y. For example, the reflecting plate 11p is used for position detection in the directions of arrows 731p, but it is also moved in the directions of arrows 731y with movement of the correction means along the arrows 731y. The length of the border line between the light and dark patterns needs to be set longer than the stroke along the arrows 731y so as to prevent the output of photoreflector 12p from changing upon the movement. In addition, the length of the border line is preferably set sufficiently longer than the stroke along the arrows 731y in order to prevent the output from changing at the stroke extremes in the directions of arrows 731y upon the movement. This is the reason why the reflecting plates 11p, 11y have their longitudinal direction extending along such direction.

When the photoreflectors 12p, 12y are used as position detecting means, the IREDs as light emitting elements, which were required conventionally, become unnecessary. This can avoid degradation of assemblability upon attachment thereof and can eliminate a change of position detection accuracy due to dispersion in attachment accuracy. Further, because it is not necessary to mount the IREDs on the support frame 75, degrees of freedom are increased for places of position detection, and the position detection can be carried out on the coils 76p, 76y as shown in FIG. 1 (whereas the IREDs cannot be set on the coils 76p, 76y).

This can suppress an increase in dimensions due to the position detecting means (because they can be placed at the same positions as the coils 76p, 76y are), so that the correction means, in turn the correction optical device, can be configured in a compact arrangement.

Further, since the position detection can be carried out at the center (thrust center) of coil 76p, 76y, the position detecting section and driving section can be set very close to each other, which enhances rigidity between them. This can enhance stability of position control dimensions of the correction means described in the conventional example and can also enhance reliability of the correction means.

At this point, the effects of the above configuration are summarized as follows.

The compact and easy-to-assemble position detecting means can be attained, because the configuration is such that the reflecting plates 11p, 11y are provided with the reflective surfaces parallel to the driving directions of the correction means (the directions of arrows 731p, 731y in FIG. 1), the light and dark patterns having the border lines perpendicular to the directions of arrows 731p, 731y are formed on the reflective surfaces, and the photoreflectors 11p, 11y are arranged to detect movement in the directions of arrows 731p, 731y with respect to the border lines.

Since the above border lines are arranged to be gradated or halftone pattern regions, the position detection stroke can be widened readily. Further, since the above reflective surfaces have their longitudinal direction extending in the directions perpendicular to the directions of arrows 731p, 731y, the position of the correction means movable in two directions can be detected each with accuracy. Since the reflecting plates 11p, 11y are provided on the respective driving sections of the correction means, the whole can be constructed compact and the reliability of drive control can be enhanced.

Next, the electric configuration of the blur correction system provided with the correction optical device of the above configuration will be described using the block diagrams shown in FIGS. 6A, 6B, 7A and 7B. The same sections as those in FIGS. 68A, 68B, and FIG. 69 showing the configuration of the conventional blur correction system will be denoted by the same reference symbols and the description thereof will be omitted.

Figure 68B:
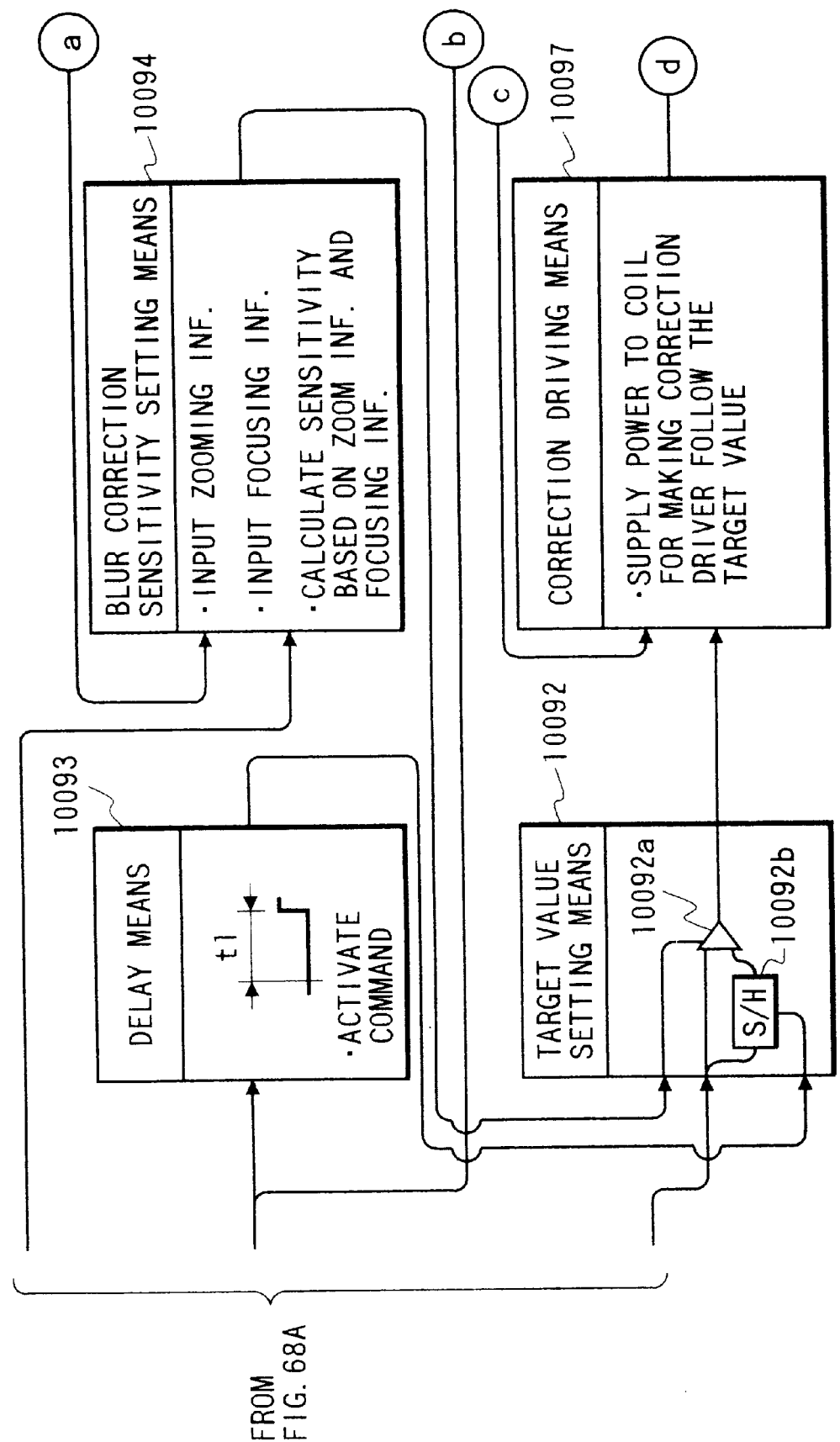
FIG. 68, composed of FIGS. 68A nd 68B, is a block diagram to show a part of circuit configuration of the blur correction system of the camera provided with the blur correction system.
Figure 69:
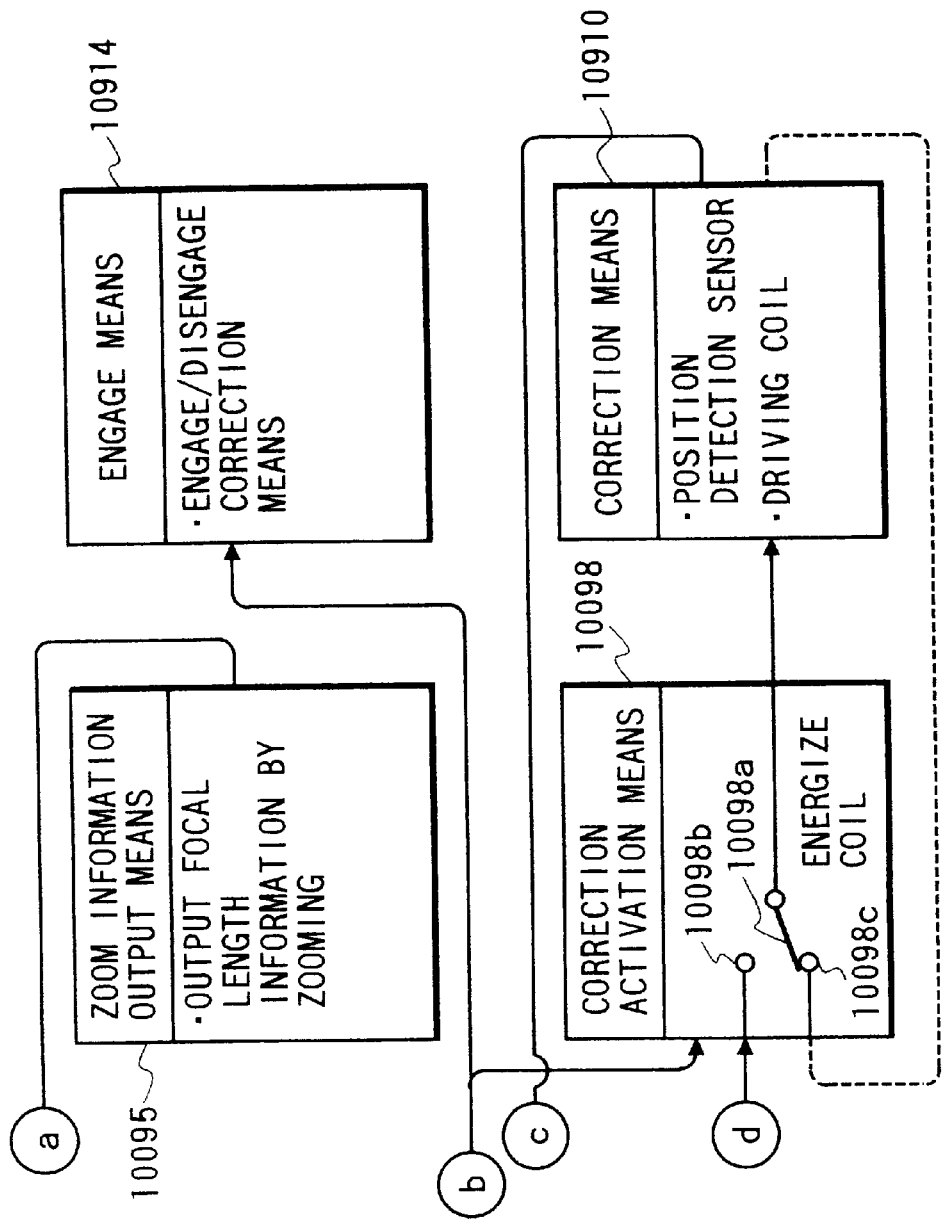
FIG. 69 is a block diagram to show a part of the circuit configuration of the blur correction system of the camera provided with the blur correction system.
Figure 70:
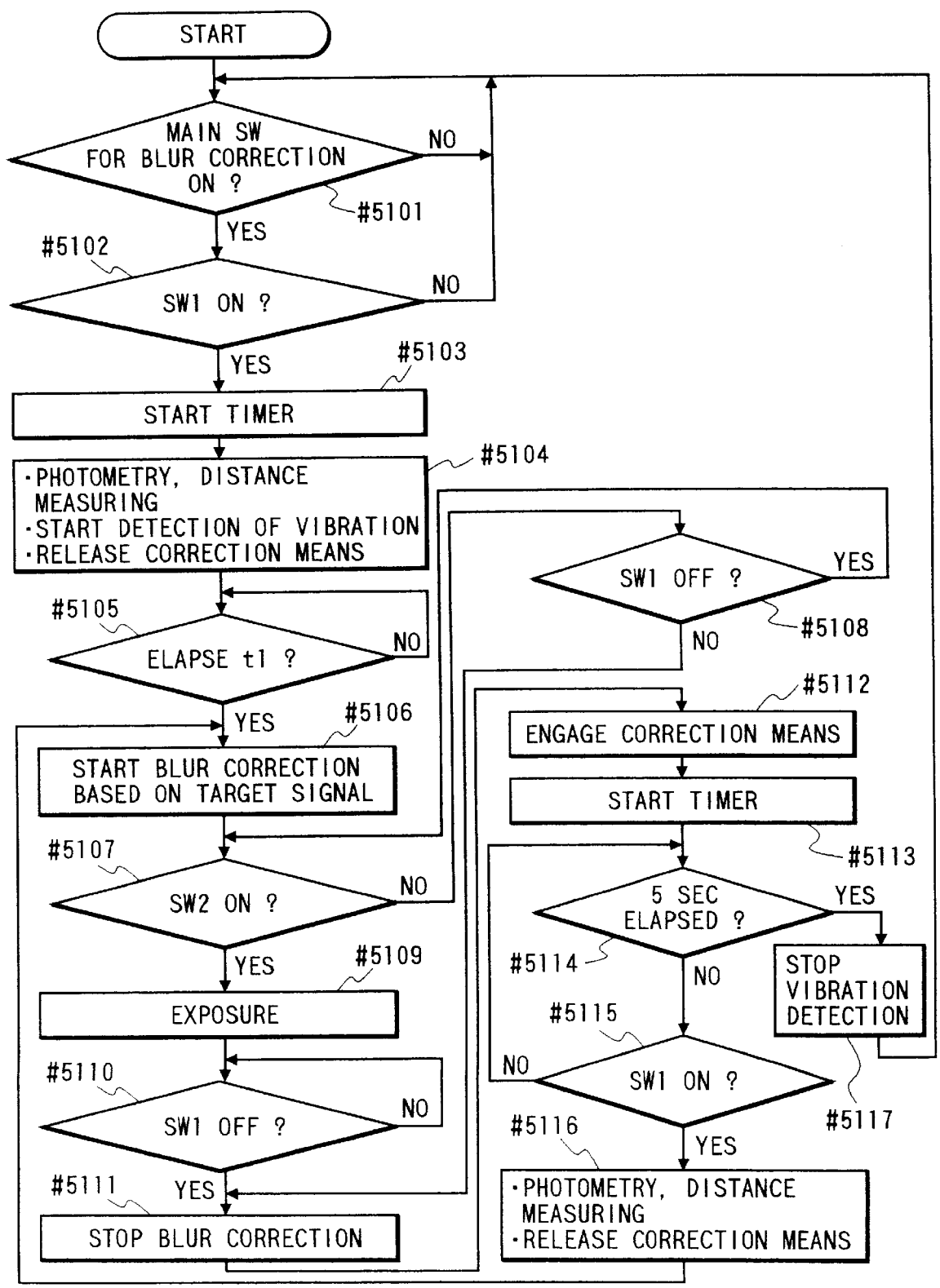
FIG. 70 is a flowchart to show the schematic operation of the camera in the circuit configuration of FIGS. 68A, 68B and 69.

The difference from the configuration shown in FIGS. 68A, 68B and 69 is that the apparatus additionally includes temperature detection means 21, response buffer means 22, characteristic changeover prohibition means 23, sensitivity altering means 24, and blur correction sensitivity altering means 25, as shown in FIGS. 7A and 7B.

The temperature detection means 21 detects the ambient temperature of the blur correction system and outputs a signal 21a according to the temperature to the response buffer means 22. The response buffer means 22 functions as a low-pass filter to output as-received signal 22a when no change appears in the signal 21a from the temperature detection means 21. When the signal 21a has a stepped change (a sudden temperature change), the response buffer means 22 dulls the change to make the signal 22a approaching the changed signal 21a for a certain time. If this characteristic change is carried out quickly in changing a characteristic of the blur correction system in accordance with the temperature change of ambience, the photographer will observe this change and might have unpleasant feeling. The response buffer means 22 thus has a function to prevent this quick characteristic changeover.

The signal 22a output from the response buffer means 22 enters a sample-hold circuit 23a of the characteristic changeover prohibition means 23. Since the sample-hold circuit 23a is normally in sampling, the signal 22a is output as signal 23b without change. Once the sample-hold circuit 23a receives an exposure signal 913a from the exposure means 913, the sample-hold circuit 23a holds the output during this period. Specifically, the characteristic changeover of the blur correction system due to the temperature change is inhibited during the exposure period, thereby preventing a transient response of the correction means during the characteristic changeover from being transferred onto the film.

The signal 23b output from the sample-hold circuit 23a of the characteristic changeover prohibition means 23 is supplied to the sensitivity altering means 24 and to the blur correction sensitivity altering means 25. The sensitivity altering means 24 alters the sensitivity of signal 910a from the position detection sensor (corresponding to the photoreflector 12p, 12y shown in FIG. 1 and other figures) of the correction means 910 in accordance with the input of signal 23b. The output sensitivity of photoreflector 12p, 12y tends to change nearly in proportion with the temperature and a slope of this change exhibits little individual difference. Therefore, the change in the output sensitivity of photoreflector 12p, 12y depending upon the temperature can be corrected readily by storing this sensitivity change slope.

Figure 6B:
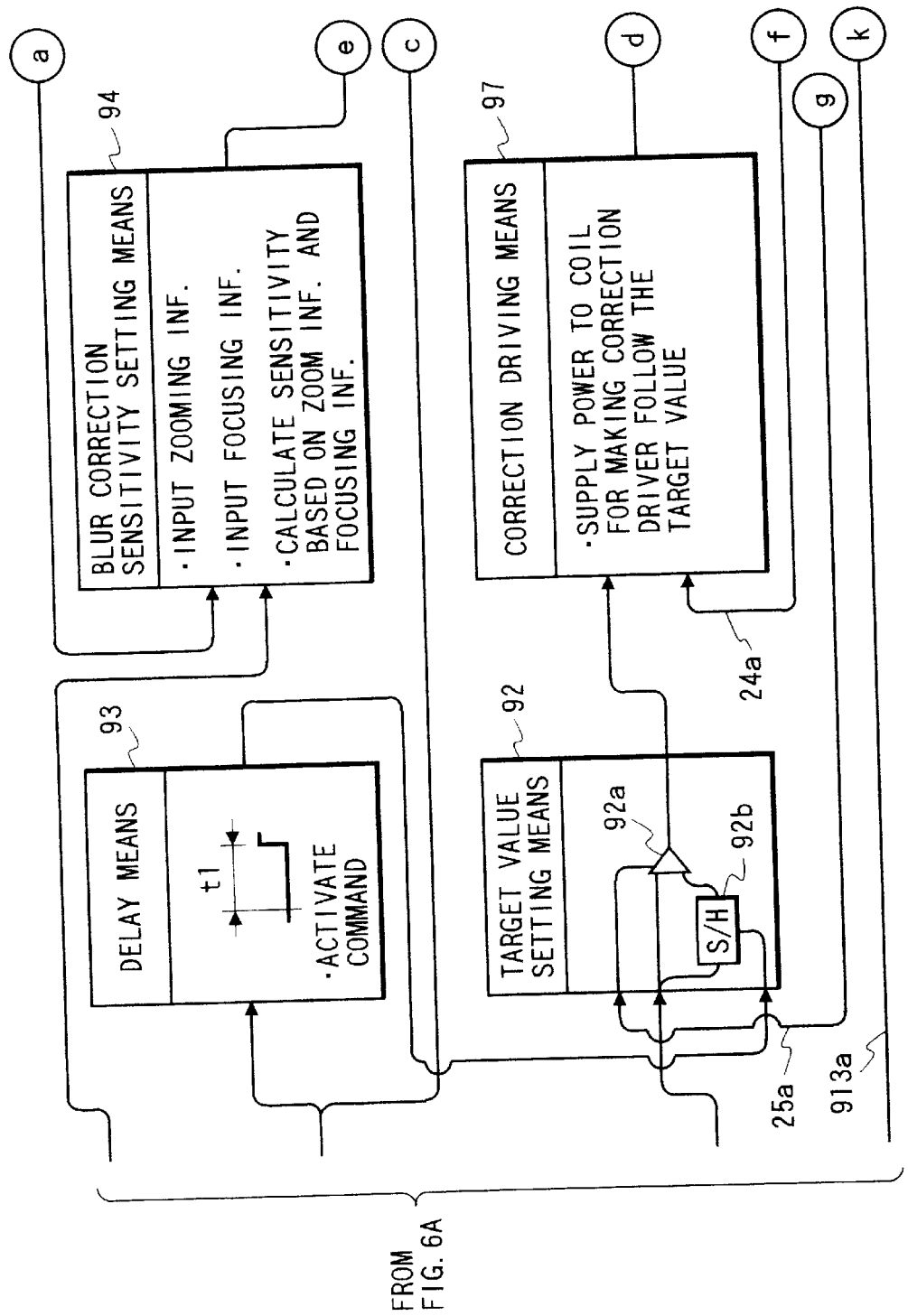
Figure 9B:
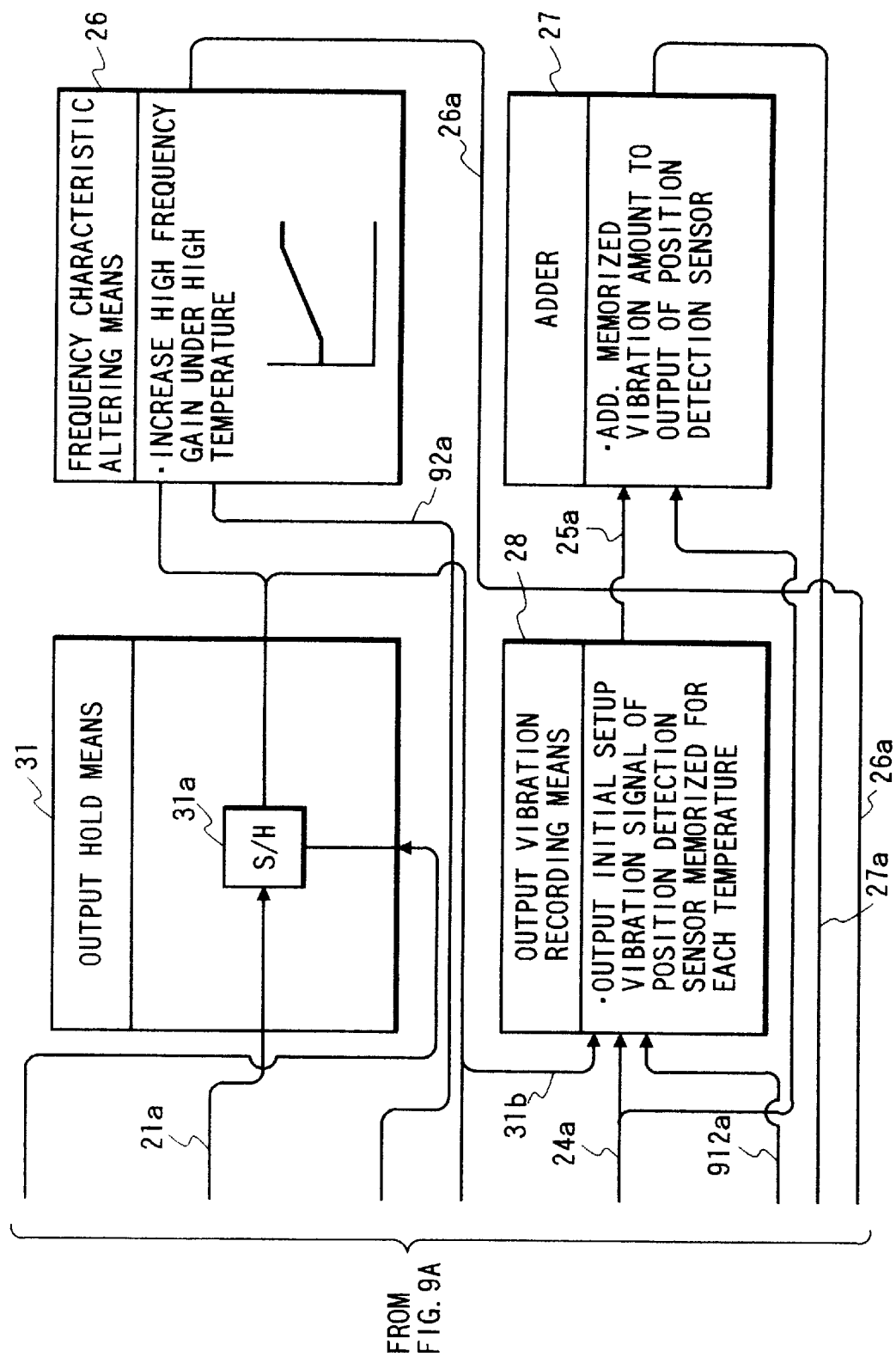
FIG. 9, composed of FIGS. 9A and 9B, is a block diagram to show the rest part of the configuration of the camera according to the second embodiment of the present invention.

Then the correction means 910 is driven independent of the temperature with accuracy by drive-controlling the correction means 910 as supplying the position detection signal 24a after correction to the correction drive means 97 shown in FIGS. 6A and 6B.

The blur correction sensitivity altering means 25 alters the sensitivity signal 94a of the blur correction sensitivity setting means 94 shown in FIG. 6B depending upon the temperature and supplies its output as signal 25a to the target value setting means 92. This means that the effect of blur correction is altered depending upon the temperature.

At the normal operation temperature, for example, at 20° C., the sensitivity of blur correction is set a little higher (for example, 10% higher) than the optimum value. Unless the vibration at 5 to 7 Hz, which is high-frequency components among the hand shakes, is corrected sufficiently, it will remain as a zone exhibiting the prominent correction remainder.

The vibration in this band is mainly due to shakes of arm, but vibration amplitudes are smaller than those of lower-frequency vibration. Vibration correction drive amounts of the correction means 910 are also small for correcting such small vibration. However, the small vibration correction drive amounts will increase influence of drive friction in percentage, which will result in failure in sufficient vibration correction. For reducing the influence, the vibration correction amounts are set larger than optimum (to effect over correction), thereby setting greater vibration correction drive amounts for the vibration in the above band.

At low temperatures amounts of shakes of photographer's arm increase and shakes of body are sometimes superimposed in the same band. This increases vibration amounts in this band and relatively decreases the influence of drive friction, because the vibration correction drive amounts of the correction means 910 increase. Without alteration of sensitivity the over correction of vibration at low temperatures would cause a seasick phenomenon (which is uncomfortable feeling due to an image flowing by the over-corrected amount in the opposite direction to the direction in which the lens is shaken by hand), which is not preferable. (If the vibration correction is insufficient, the image will flow by the insufficient degree of correction in the same direction as the direction in which the lens is shaken by hand, which will cause no uncomfortable feeling.) From this reason, the blur correction sensitivity is changed back to the optimum value (or is decreased 10% lower than that at the normal temperature), at low temperatures.

Since the above configuration corrects the sensitivity of position detecting means depending upon the change of temperature, blur correction can be always made with accuracy and the preferred blur correction effect is achieved throughout the entire operation temperature region. Since this characteristic changeover depending upon the temperature is carried out slowly, the unpleasant feeling (fluctuation of image or occurrence of sound), which would be caused with quick characteristic changeover, can be prevented from occurring. Further, since the characteristic changeover is inhibited during exposure, it can prevent the transient response of the correction means 910 due to the characteristic changeover from being projected onto the image plane.

(Second Embodiment)

FIGS. 8A, 8B, 9A and 9B are block diagrams to show the electric configuration of the blur correction system provided with the correction optical device according to the second embodiment of the present invention, in which the same portions as those in above FIGS. 6A, 6B, 7A and 7B are denoted by the same reference symbols, and the description thereof will be omitted.

The second embodiment is different from the above first embodiment in that frequency characteristic altering means 26 is provided in place of the blur correction sensitivity altering means 25 shown in above FIGS. 7A and 7B, output hold means 31 is provided in place of the characteristic changeover prohibition means 23, and output change storing means 28 is added newly.

In the above first embodiment, the blur correction sensitivity at low temperatures was returned to the optimum throughout the entire blur correction band (while the blur correction sensitivity at high temperatures was set greater than the optimum throughout the entire blur correction band). However, the band easy to produce the correction remainder is 5 to 7 Hz as described above, and it is thus not necessary to set the blur correction sensitivity greater for lower-frequency vibration than this band (because of its large amplitude) because the follow-up property of the correction optical device is good in the case of the low-frequency vibration (or otherwise the blur correction effect will be degraded).

In order to increase only the blur correction sensitivity in the above band of 5 to 7 Hz at high temperatures, the target value signal 92a of the target value setting means 92 is filtered by the frequency characteristic altering means 26 and the output therefrom is supplied as signal 26a to the correction drive means 97. The signal 21a from the temperature detection means 21 is supplied to the output hold means 31 and the signal 31a through the output hold means 31 is supplied to the frequency characteristic altering means 26. The above filtering is not effected at low temperatures (because the vibration of 5 to 7 Hz becomes greater). Accordingly, the blur correction effect can be achieved sufficiently throughout the entire blur correction band, regardless of the temperature change.

The above first embodiment was arranged to eliminate the unpleasant feeling (sound or vibration) due to discontinuity before and after the characteristic changeover by relatively slowly carrying out the changeover of blur correction characteristic depending upon the temperature change through the response buffer means 22. In addition, the characteristic changeover was inhibited during exposure.

In this second embodiment, the timing of characteristic changeover is simplified more so as to compactify the circuitry.

The hold signal to the sample-hold circuit 31a in the output hold means 31 is the signal 99a of the AND means 99. With start of blur correction the signal 21a of temperature detection means 21 is held before the actuation command signal 93a (blur correction start) is output from the delay means 93. Thus, the signal 21a becomes of a constant value and at this point the blur correction characteristic changeover is carried out. After that, the characteristic changeover is not carried out until the output of signal 99a is stopped, that is, until the blur correction is stopped. This can eliminate the unpleasant feeling due to the changeover of characteristic during the blur correction.

The output change storing means 28 stores the opposite in polarity to the rise transient response from power-on of the position detection sensor (photoreflector 12p, 12y). The photoreflector changes its output for a certain period after power-on (see FIG. 10). This is caused by heat or the like generated with flow of electric current and the blur correction accuracy is lowered during this transient response duration.

The signal 28a of the output change storing means 28, which is the opposite characteristic to the output transient response of photoreflector, starts changing with a blur correction switch on signal 912a of the blur correction changeover means 912 (the photoreflectors also start being powered at this time). This signal 28a is added to the signal 24a (the output from photoreflector after sensitivity correction depending on the temperature) by adder 27.

Thus, the signal 27a becomes a signal without any output change since the power-on, which is supplied to the correction drive means 97. Therefore, the blur correction accuracy is not lowered during the output change duration.

Figure 10:
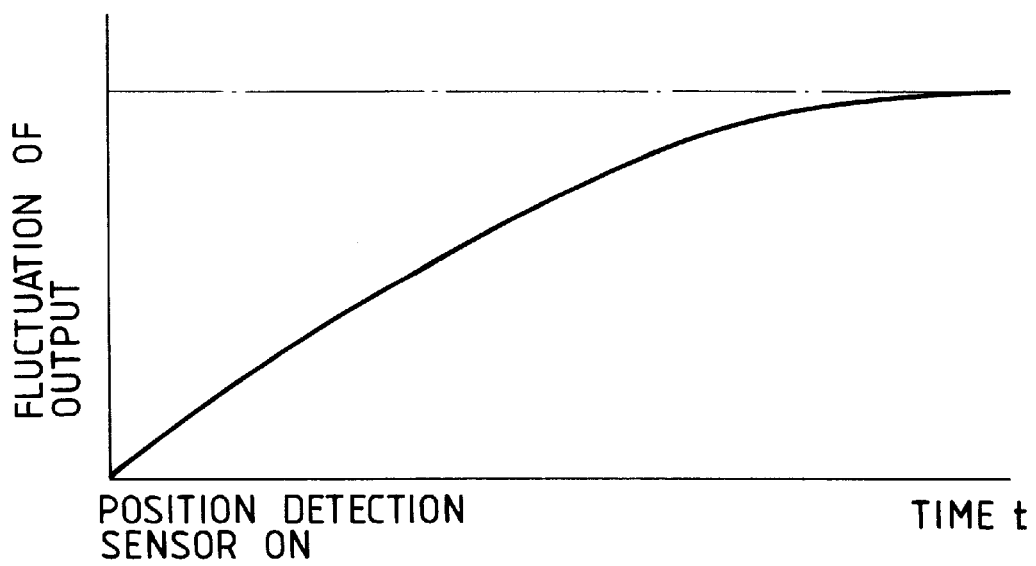
FIG. 10 is a drawing to show initial rise characteristic of the position detecting sensor of FIGS. 9A and 9B.
Figure 11B:
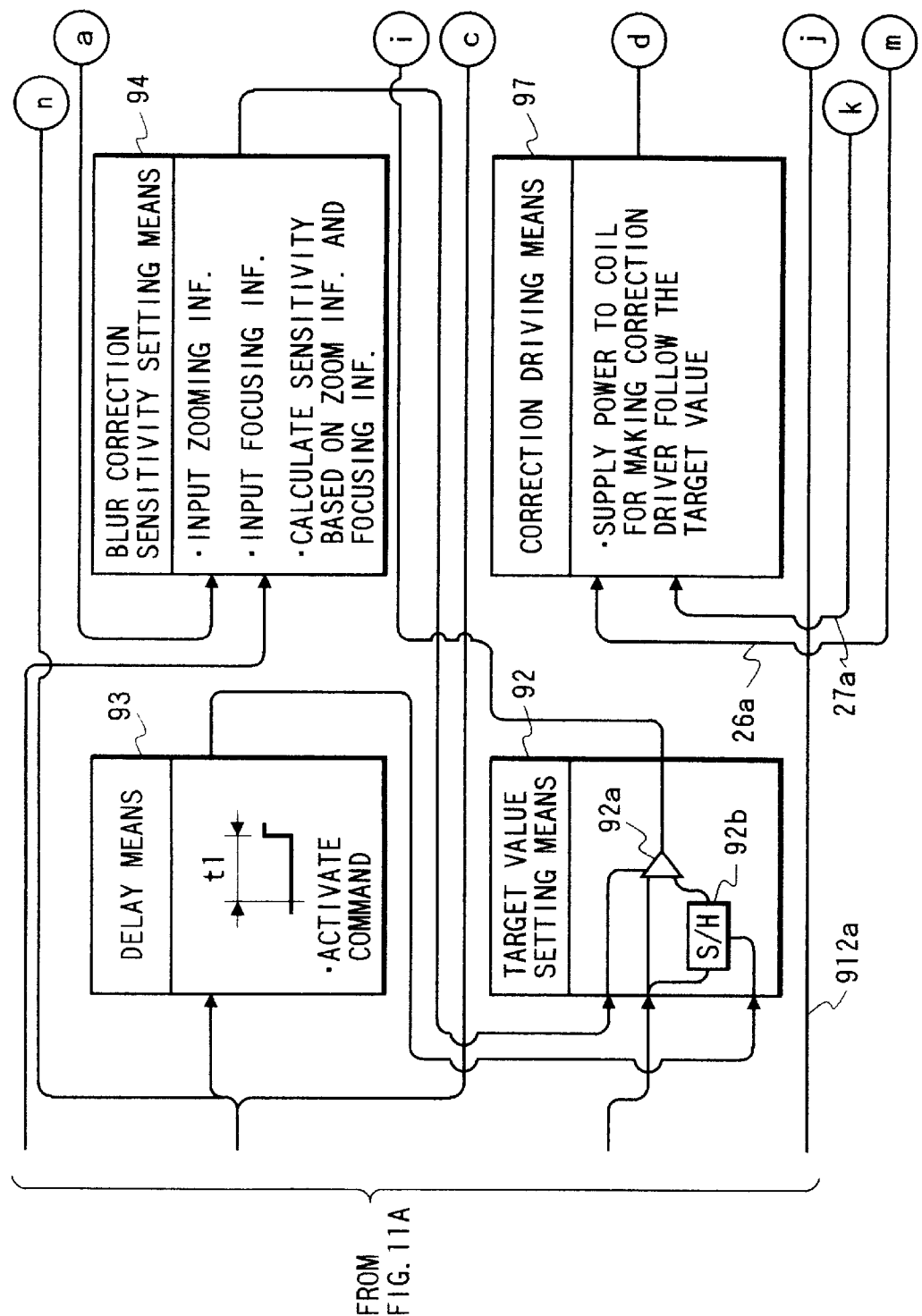
FIG. 11, composed of FIGS. 11A and 11B, is a block diagram to show a part of the configuration of a camera according to the third embodiment of the present invention.
Figure 14B:
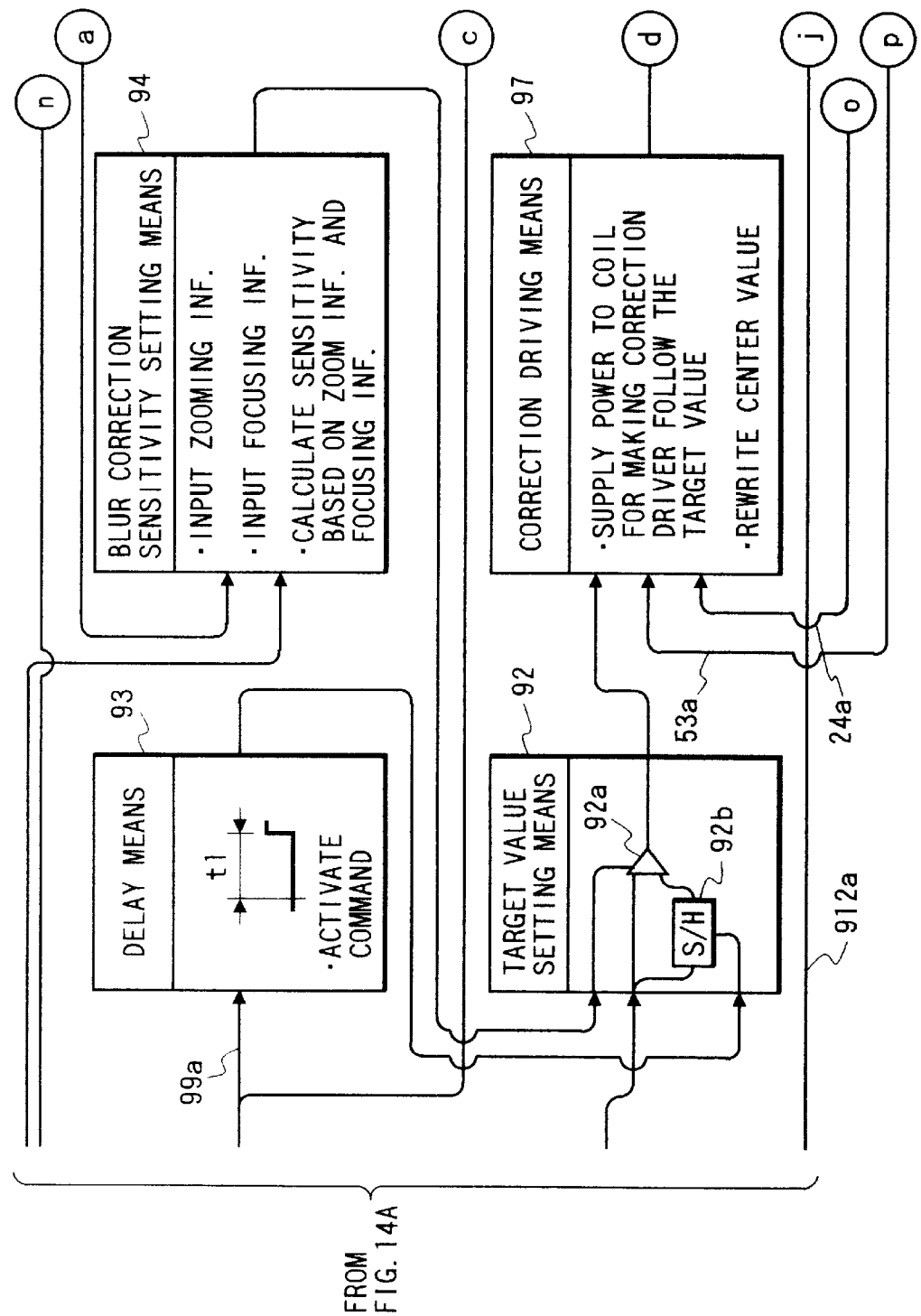
FIG. 14, composed of FIGS. 14A and 14B, is a block diagram to show a part o the configuration of a camera according to the fourth embodiment of the present invention.
Figure 16:
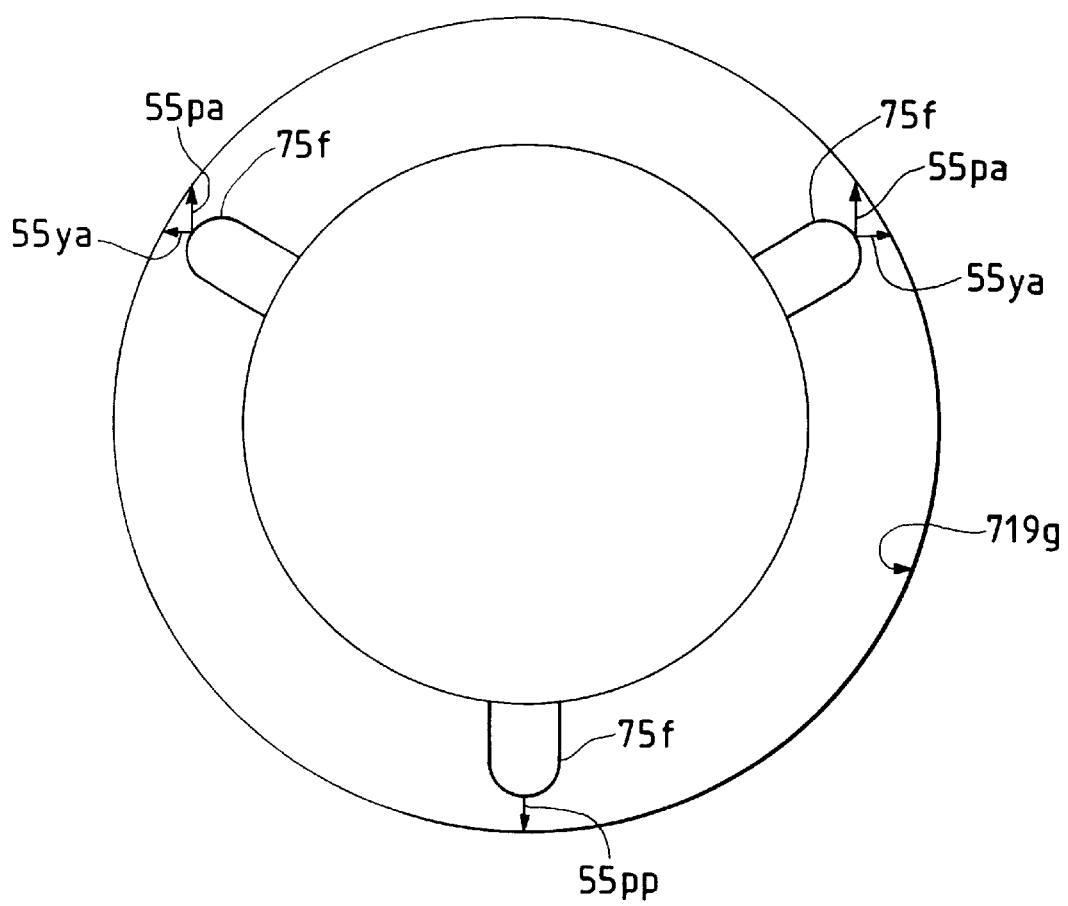
FIG. 16 is a drawing for explaining sensitivity correction of the position detecting sensor in the camera according to the fourth embodiment of the present invention.

The output change storage values, shown in FIG. 10, of the output change storing means 28 are stored for each of plural ambient temperatures and a storage value is selected according to the temperature signal 31a from the output hold means 31 to be output. Since the rise output change of photoreflector differs depending upon the ambient temperature, the above arrangement is employed for correction thereof.

This embodiment is arranged to store the rise change of output for each ambient temperature, but it is also possible to employ a method for observing the initial state of output change of photoreflector and obtaining a subsequent output change from the data.

(Third Embodiment)

FIGS. 11A, 11B, 12A and 12B are block diagrams to show the electric configuration of the blur correction system provided with the correction optical device according to the third embodiment of the present invention, wherein the same portions as those in above FIG. 6A to FIG. 9B are denoted by the same reference symbols, and the description thereof will be omitted.

Output change calculation means 29 in FIG. 12B receives the signal 24a from the position detection sensor, in place of the hold signal 31a through the output hold means 23 originating from the signal 21a from the temperature detection means 21.

Then the output (see FIG. 13) is observed for a certain period in synchronism with the blur correction switch on signal 912a (at this time the photoreflector is powered), an output change after the observed output change is calculated (for example, a slope of the output change during the observation period is extended), and it is output as a signal 29a to the adder 27. During this output observation period no vibration signal is supplied as a target value (the blur correction is not started only with on of the blur correction main switch unless the release means 911 is half depressed; and blur correction will not be effected during the delay time of the delay means 93 even if the release is half depressed). Since the pure output change of photoreflector can be observed during this period, the output change thereafter can be suppressed well with accuracy.

(Fourth Embodiment)

FIGS. 14A, 14B, 15A and 15B are block diagrams to show the electric configuration of the blur correction system provided with the correction optical device according to the fourth embodiment of the present invention, wherein the same portions as those in above FIGS. 6A, 6B, 7A and 7B, and so on are denoted by the same reference symbols, and the description thereof will be omitted.

As described previously, the sensitivity of photoreflector changes depending upon the temperature and the first to third embodiments described above were provided with the temperature detection means 21 to perform the sensitivity correction based thereon. The fourth embodiment is arranged to correct the sensitivity without using the temperature detection means.

Calculation drive command means 51 receives the release half-depression signal 911a from the release means 911 and the blur correction switch on signal 912a from the blur correction changeover means 912. The signal 911a is inverted and the both signals are supplied to an AND gate 51a. Thus, the AND gate 51a gives an output when the blur correction switch is on and when the shutter release button is not depressed half. With this signal as a trigger the calculation drive command means 51 outputs a signal 51b for a certain period (for example, for 100 msec). Then this signal 51b is supplied to the calculation drive means 52, to the center value calculation means 53, to the sensitivity calculation means 54, and to the correction actuation means 98. Thus, the correction means 910 starts the drive control at this point.

With input of the signal 51b the calculation drive means 52 outputs the signal 52b to drive the engaging means 914 in the engaging direction. (The engaging means is originally in the engaging state, but it is again driven here to engage, thereby enhancing certainty of engagement). Further, the calculation drive means 52 outputs an alternating target value signal 52a to supply it as a target value to the correction actuation means 98. Therefore, from this point the correction means 910 is alternately driven in the full limit stroke within the lock play as described in the conventional example.

This control stroke is an amount resulting from engagement plays 55pa, 55pb, 55ya, 55yb between the internal wall 719g of lock ring and the projections 75f of support frame 75, and this amount is determined mechanically (which is a constant amount not affected by the temperature or the like). Specifically, the detection sensitivity of photoreflector can be determined by monitoring the maximum and minimum of the output from the photoreflector at this time.

The sensitivity calculation means 54 monitors the signal 910a from the position detection sensor (photoreflector) in synchronism with input of signal 52a and calculates its detection sensitivity. Then the sensitivity altering means 24 amplifies or attenuates the output of signal 910a by the sensitivity obtained to correct it and outputs it to the correction drive means 97. The center value calculation means 53 also receives the output of signal 910a from the photoreflector in synchronism with signal 51b, obtains a center position by properly proportioning the maximum and minimum, and rewrites the center position of correction drive means 97. Since the output of photoreflector changes its absolute value with the change of sensitivity depending upon the temperature (or the DC bias varies), the center control position of the correction means 910 changes therewith. However, influence of the change can be decreased by driving the correction means 910 within the limit stroke and rewriting the center position based upon the output as described above.

Since the above mechanical limit stroke is small, it is also possible to employ such an arrangement that the center value is attained by simply storing the output of photoreflector in the engagement state without obtaining it by calculation, if any position in the stroke may be determined as the center.

Now described are reasons why the correction means 910 is driven only in the narrow stroke range within the engagement play upon calculation of sensitivity.

First, the output of photoreflector loses its linearity with approaching the extreme. Therefore, the sensitivity is obtained more accurately with narrower stroke of drive. Second, since the sensitivity is calculated in the disengaged state, full-stroke drive of correction means 910 will make the photographer perceive the image change caused thereby, thus giving the unpleasant feeling.

Therefore, the drive range is narrowed upon the center value and sensitivity calculation by activating the engagement means 914.

The present configuration used the engagement means 914 as means for restricting the drive stroke as it was, but, without having to be limited to this, dedicated limiting means for calculation of center value and sensitivity may be provided as being arranged to withdraw upon blur correction.

(Fifth Embodiment)

FIGS. 17A, 17B, 18A and 18B are block diagrams to show the electric configuration of the blur correction system provided with the correction optical device according to the fifth embodiment of the present invention, wherein the same portions as those in above FIGS. 14A, 14B, 15A and 15B, etc. are denoted by the same reference symbols, and the description thereof will be omitted.

The fifth embodiment is different in the configuration of the engaging means 914 from the above fourth embodiment.

The engaging means up to the above fourth embodiment was electromagnetically driven with energization of the coil 720, as described with the engaging means of the conventional correction optical device.

Figure 19:
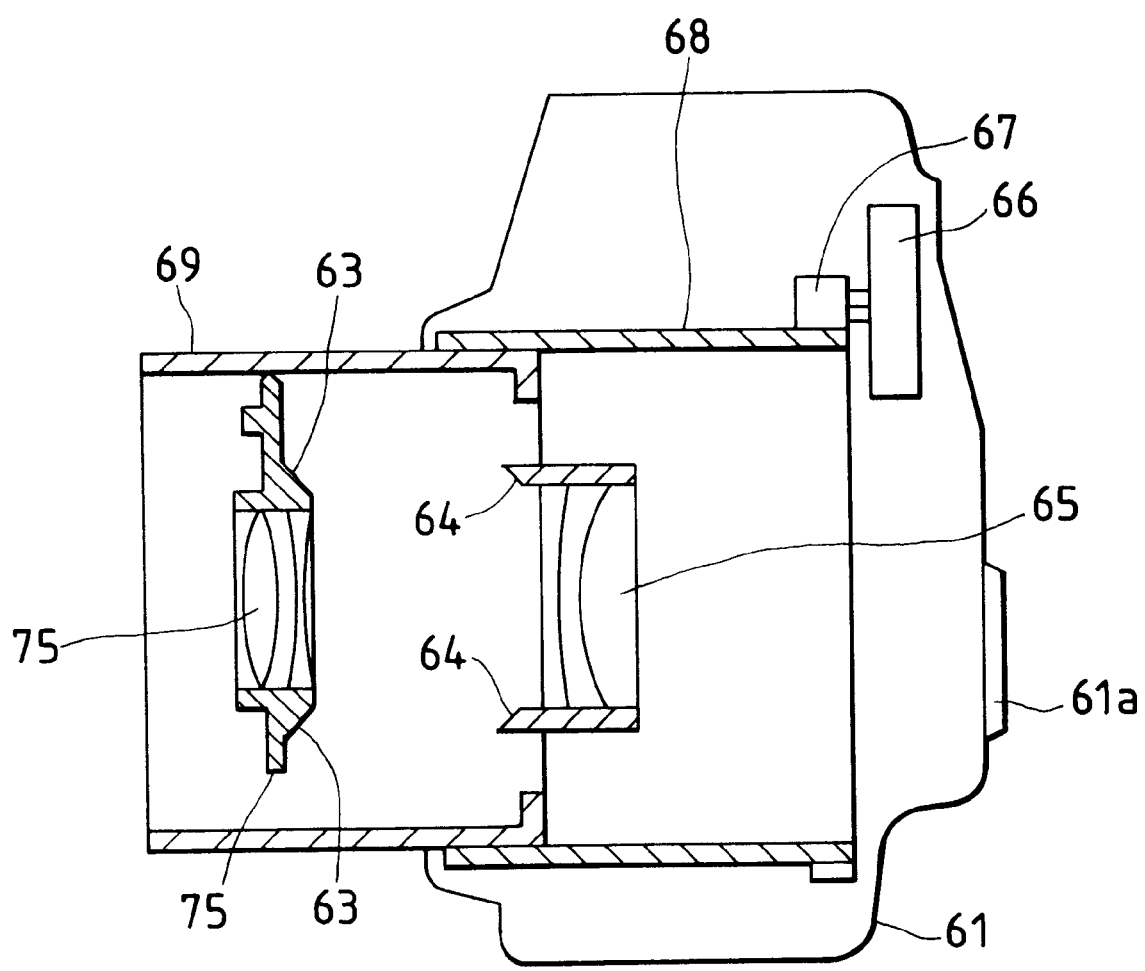
FIG. 19 is a cross-sectional view to show the main configuration of the camera according to the fifth embodiment of the present invention.

The fifth embodiment will be described as to the blur correction system incorporated in a camera constructed in a configuration wherein the lens barrel is collapsed when not used. In the configuration, the correction optical device is built in the lens barrel 69 arranged to be drawn out upon photography but to be retracted when not used (in synchronism with a main switch control part 61a of camera) as shown in FIG. 19, and the support frame 75 is provided with a taper portion 63. Lens 65 is also suspended in the lens barrel 69, but the optic axis shows little position change upon collapse of lens barrel. A holding frame of lens 65 is also provided with an inverse taper portion 64.

Accordingly, the lens 65 and correction lens 74 come closer to each other upon collapse of barrel, so that the taper portion 65 and inverse taper portion 64 come to engage with each other, thereby engaging the correction means 910.

In FIG. 19, a motor 66 in the camera body 61 rotates a cam cylinder 68 through pinion 67 so as to draw the lens barrel 69 out or in (collapse). When the main switch control part 61a is turned on upon use of camera, the motor 66 rotates in the feeding direction to draw the lens barrel 69 out. When the main switch control panel 61a is turned off or when the operation of camera is not carried out for a certain period, the motor 66 rotates in the collapse direction to draw the lens barrel 69 in. Here, the feed rotation of barrel by the motor 66 is not arranged to respond directly to the main switch control part 61a of camera.

The output signal 61b of the camera main switch means 61 shown in FIGS. 17A and 17B is generated with the on operation of the main switch control part 61a of camera, but the signal is not supplied directly to the motor 66 being collapse drive means 62. It is supplied to the calculation drive command means 51 shown in FIG. 18A. In response thereto the calculation drive command means 51 outputs the signal 51b for a certain period.

Therefore, the correction means 910 is driven within the engagement play to obtain the sensitivity and center value, as described in the above fourth embodiment. In synchronism with output. stop of the command signal 51b of the calculation drive command means 51 (completion of calculation and thus end of calculation of sensitivity and center value), the calculation drive command means 51 generates the signal 51c, which is supplied to the collapse drive means 62 to first draw the barrel 69 out, and the engagement of correction means 910 is released.

Therefore, the correction means 910 becomes in the disengaged state after that, but the half-depression signal 911a of the release means 911 is supplied directly to the correction actuation means 98. Thus, the correction means 910 is drive-controlled before release of half depression of release button after the release half depression (also during exposure), regardless of on/off of blur correction. Thus, the correction means 910 is stabilized almost at the center position (upon off of blur correction) or is under blur correction from the center value (upon on of blur correction).

Unless the release button is depressed during collapse of barrel, the correction means 910 is positioned at a position shifted from the center. However, since the engaging portions are tapered, the correction means 910 is moved toward near the center with collapse of barrel to be engaged.

When the main switch control part 61a of camera is turned off upon collapse, the camera main switch means 61 outputs the signal 61c to supply it directly to the collapse drive means 62. Thus, the motor 66 rotates the lens barrel 69 in the collapse direction. Further, when the collapse drive means 62 detects continuation of no operation of camera for a certain period during draw-out of barrel 69, it rotates the motor 66 in the collapse direction of barrel 69.

As described above, in the camera with the collapsible barrel, the blur correction system has the compact and power-saving engaging means 914 achieved by engaging the correction means 910 in synchronism with collapse of barrel, wherein the calibration of photoreflector (calculation for calibrating the sensitivity and center value) is carried out before draw-out of camera, thereby easily enhancing the output accuracy of photoreflector and constructing the compact and highly accurate blur correction system.

As described above, each of the above embodiments realizes the correction optical device which is compact and easy to assemble, thus enhancing the reliability.

Each of the above embodiments realizes the correction optical device, blur correction apparatus, and blur correction camera that can always keep high-accuracy blur correction performance.

(Sixth Embodiment)

Figure 20:
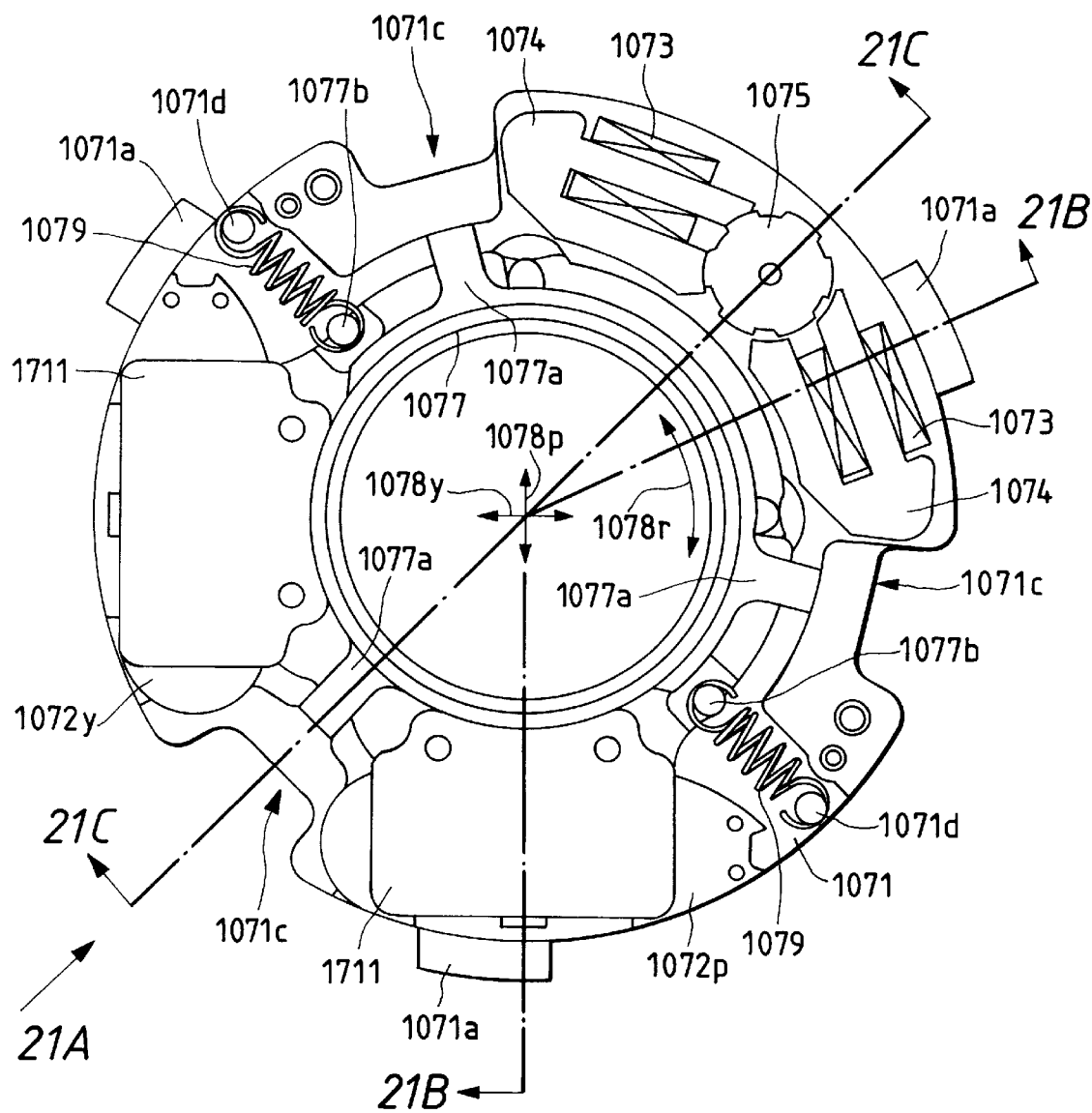
FIG. 20 is a plan view to show the main part of a deviation correction device according to the sixth embodiment of the present invention.
Figure 21C:
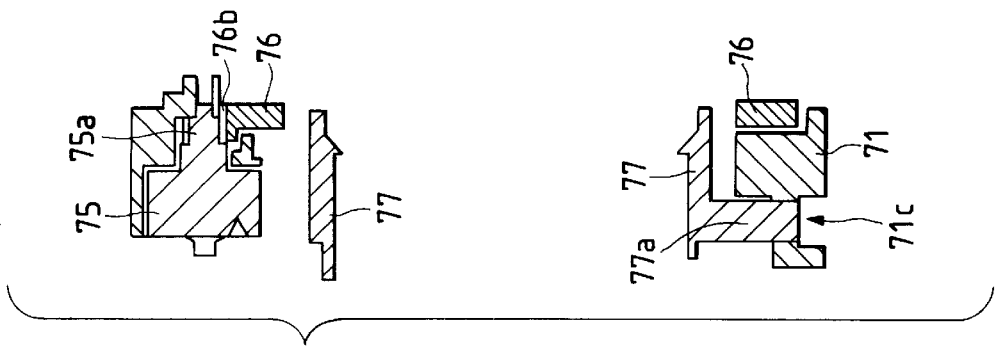
FIG. 21A, FIG. 21B, and FIG. 21C are drawings to show a side view of the deviation correction device of FIG. 20, seen along the direction of arrow 21A, and cross sections taken along 21B—21B and along 21C—21C, respectively.
Figure 21B:
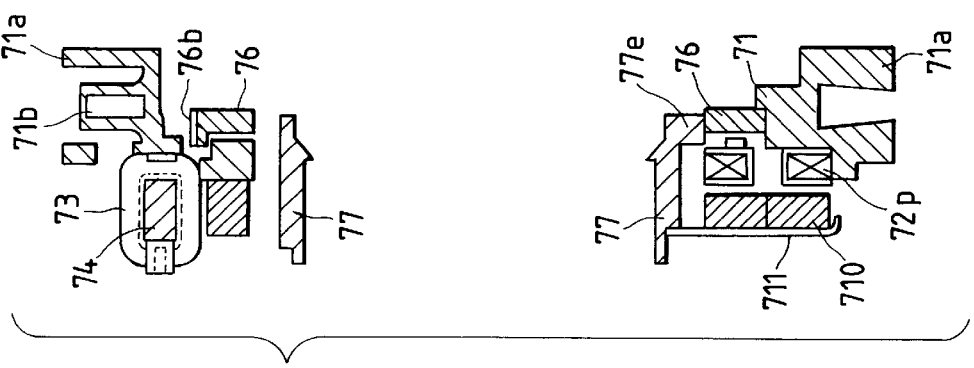
Figure 21A:
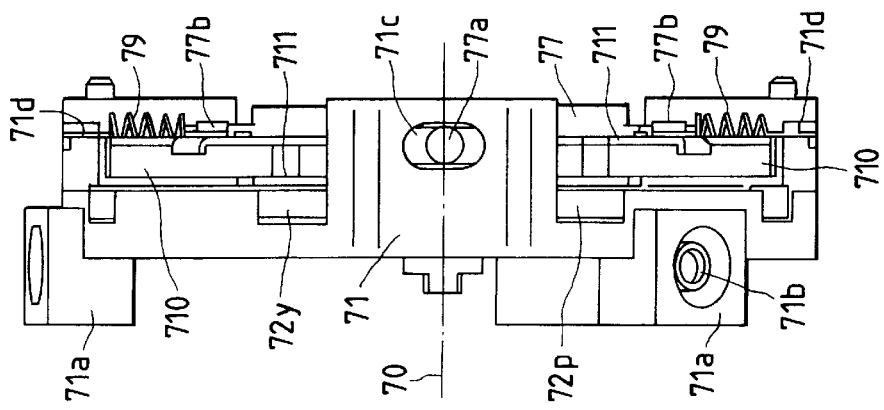
Figure 22:
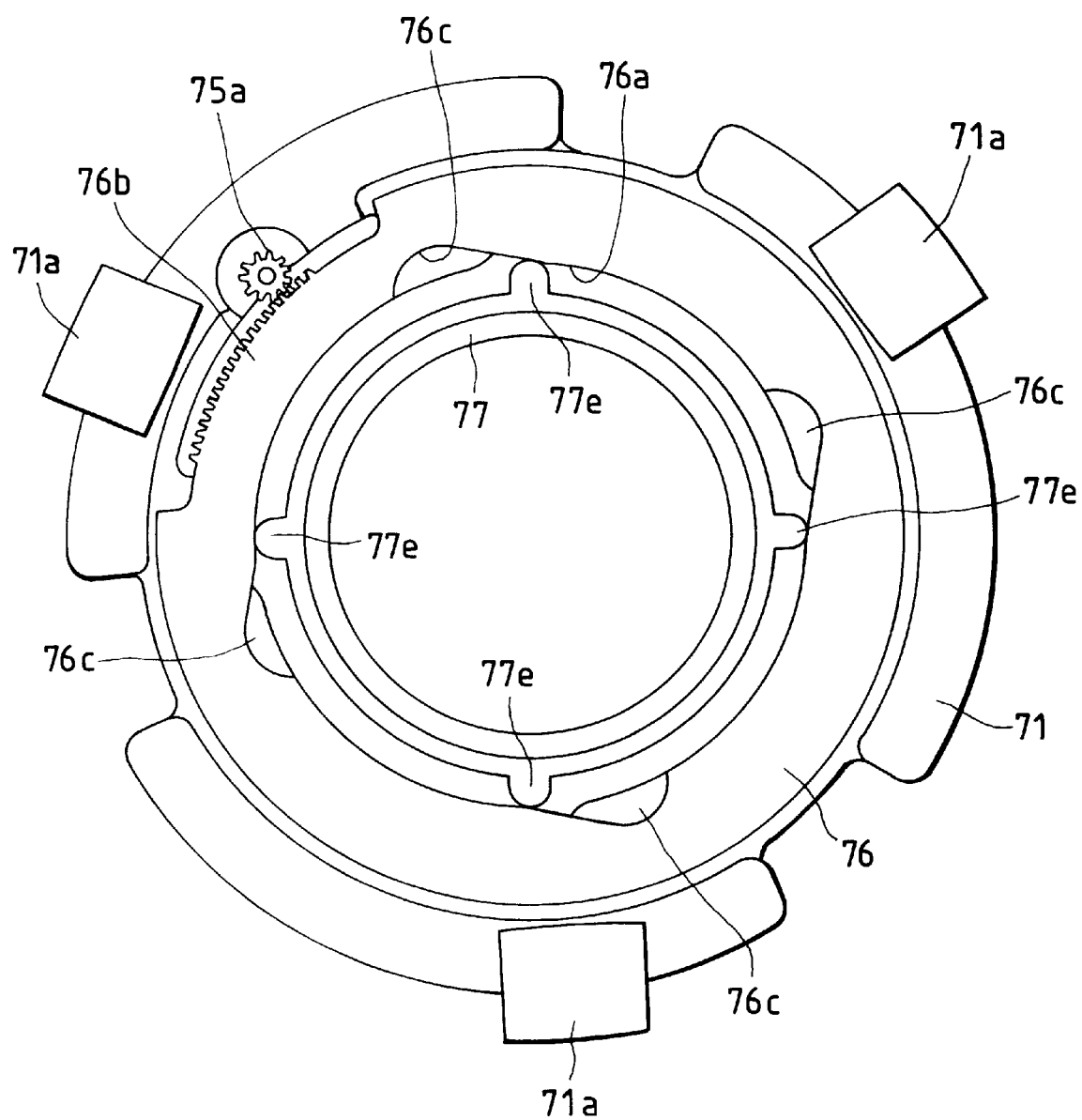
FIG. 22 is a plan view of the deviation correction device of FIG. 20, seen from the back thereof.

FIG. 20 to FIG. 22 are drawings to show a deviation correction device used in the blur correction system as described above. The total configuration of the correction optical device is the same as that shown in FIG. 57. More specifically, FIG. 20 is a front view. of the deviation correction device (which is a view thereof seen from the object side of the lens barrel 10082 of FIG. 57), FIG. 21A is a side view seen along the direction of arrow 21A of FIG. 20, FIG. 21B is a cross-sectional view taken along 21B—21B of FIG. 20, FIG. 21C is a cross-sectional view taken along 21C—21C of FIG. 20, and FIG. 22 is a back view of FIG. 20.

In these drawings, 1071a designates engagement frames equally arranged at three positions on the base plate 1071, which engage the internal periphery of the lens barrel 1082 of FIG. 57. They are coupled with each other utilizing holes 1071b (see FIG. 21A and FIG. 21B). Shift coils 1072p, 1072y wound on bobbins as shown in FIG. 20 are fixed to the base plate 1071. Further, stator 1074 with lock coil 1073 wound thereon is fixed to the base plate 1071. Rotor 1075 is mounted on the base plate 1071 so as to be rotatable about its axis. The rotor 1075, stator 1074, and lock coil 1073 compose a well-known step motor.

The base plate 1071 has elongate holes 1071c at three equally distributed positions on the outer peripheral surface thereof (which are illustrated only in FIG. 21A and which are indicated by arrows at the positions in FIG. 20 and FIG. 21C). Lock ring 1076 (see FIG. 22) is attached to the back of the base plate 1071 so as to be rotatable about arrow 1076a. Pinion 1075a of rotor 1075 is in mesh with a gear 1076b, so that the lock ring 1076 can be vibrated (rotated) about the arrow 1076a in FIG. 22 by the step motor.

Support frame 1077 for holding the correction lens (not shown) has support shafts 1077a extending radially outward at three equally distributed positions from the periphery as shown in FIG. 20 or FIG. 21A.

Tip portions of the support shafts 1077a are engaged in the associated elongate holes 1071c of the base plate 1071. Each of the three engagement portions is in the same relation between the elongate hole 1071c and support shaft 1077a shown in FIG. 21A and, as apparent from the drawing, the relation of each is fixed in the direction of the optic axis 1070 (see FIG. 21A) but they are slidable relative to each other in the directions perpendicular to the optic axis 1070 (because the hole 1071c is an elongate hole). Namely, the support frame 1077 is restricted from moving in the directions along the optical axis relative to the base plate 1071, but can freely move in the plane perpendicular thereto. When this motion is decomposed, directions thereof are separated into pitch directions 1078p, yaw directions 1078y, and roll directions 1078r shown in FIG. 20.

As shown in FIG. 20, a pair of tension springs 1079 are stretched between pin 1077b of support frame 1077 and pin 1071d of base plate to pull the support frame 1077 from the both sides. Further, shift yoke 1711 to which shift magnet 1710 adheres is attached to the support frame 1077 so as to face each shift coil 1072p, 1072y on the base plate 1071 (see FIG. 21B).

From the relationship between them, with supply of electric current to the shift coil 1072p the support frame 1077 is driven in a direction along arrows 1078p against elastic force of the tension springs 1079, and with supply of electric current to the shift coil 1072y the support frame is also driven similarly in a direction along arrows 1078*y* against elastic force of the tension springs 1079. No rotational force occurs in the roll directions 1078*r*. Since the support frame 1077 is elastically restricted from rotating in these directions as being pulled by the tension springs 1079 from the both sides, the support frame 1077 does not rotated in these directions.

Now, the image plane can be stabilized as described above by driving the support frame 1077 in the directions of arrows 1078*p*, 1078*y* based on the deviation information from the vibration detecting circuit for detecting vibration of camera (with energizing the shift coils 1072*p*, 1072*y*). When the blur correction system is not used, it is necessary to keep the support frame 1077 stationary relative to the base plate 1711. The reason is as follows. The support frame 1077 fluctuates due to disturbance vibration upon carry or the like, which could generate impact sound when colliding with the base plate 1071. Thus, the support frame needs to be fixed in order to avoid such impact sound and breakage thereof upon collision.

FIG. 22 is a drawing to show the status at this time (when the blur correction system is not used), wherein four projections 1077*e* of the support frame 1077 are in contact with the inner peripheral wall 1076*a* of the lock ring 1076. Therefore, the support frame 1077 is restricted from moving in the directions of arrows 1078*p*, 1078*y*.

When the blur correction system is used, the lock ring 1076 is rotated by a predetermined amount clockwise in FIG. 22 by the step motor. Then the surfaces opposed to the projections 1077*e* become cam parts 1076*c*, so that they become disengaged from each other. Thus, the support frame 1077 becomes free from the lock ring 1076, so that it can be driven in the directions of arrows 1078*p*, 1078*y*.

Summarizing the deviation correction device described above in element: groups, the support frame 1077, shift magnet 1710, shift yoke 1711, and correction lens comprise the correction means; the base plate 1071, shift coils 1072*p*, 1072*y*, and tension springs 1079 comprise the support means for supporting the correction means; the lock ring 1076 and the projections 1077*c* provided in the support frame 1077 comprise the engaging means for engaging the correction means; and the lock coils 1073, the stator 1074 and rotor 1075, composing the step motor, comprise the drive means for driving the engaging means.

For accurate deviation correction drive of the deviation correction device described above, the position of the support frame 1077 holding the correction lens is detected and the detection output is fed back to the driving means.

Figure 23:
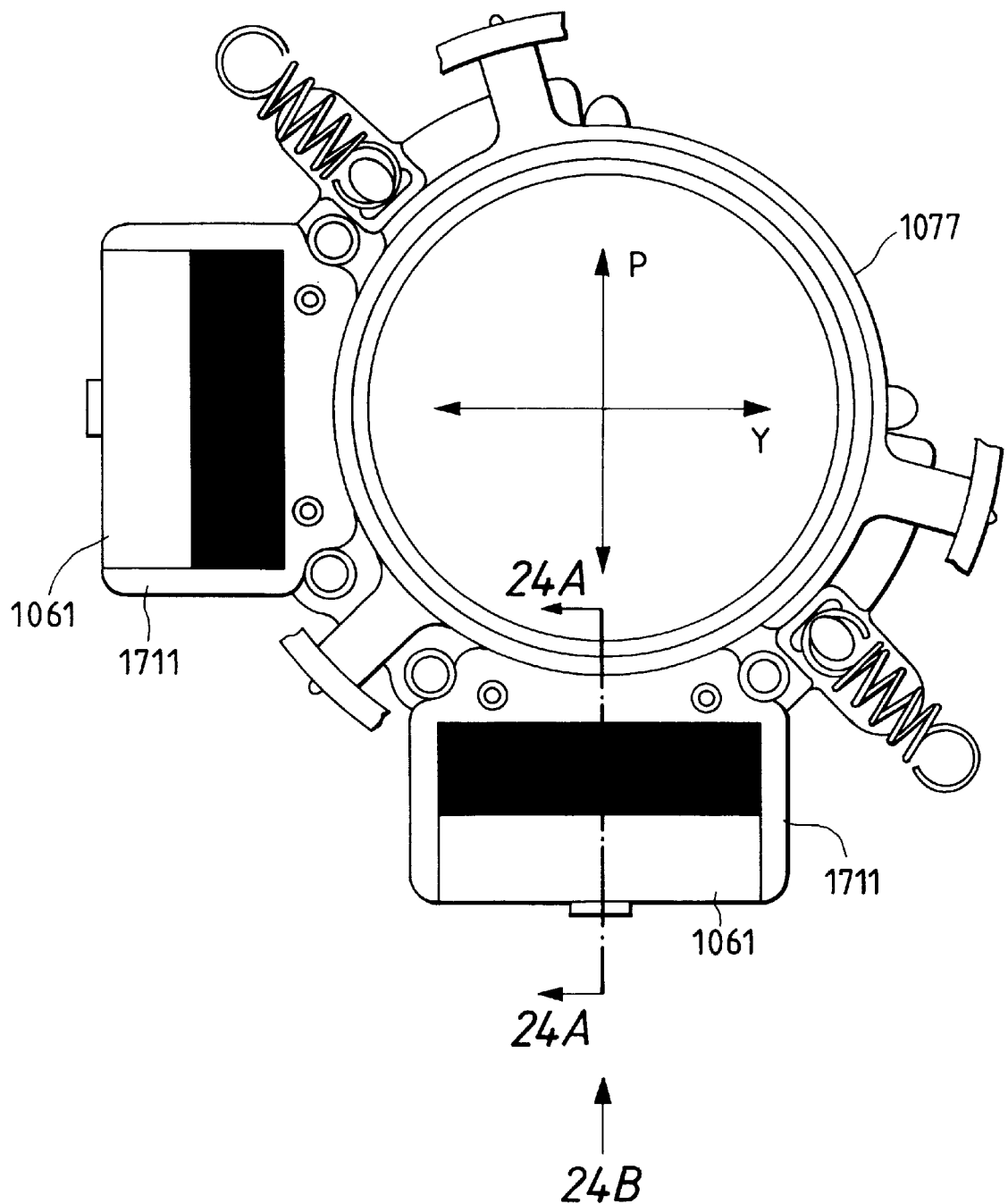
FIG. 23 is a plan view to show the main configuration of the deviation correction device according to the sixth embodiment of the present invention.

The position is detected by reflection type optical position sensors (for example, photoreflectors), each yoke 1711 attached to the support frame 1077 of FIG. 23 is provided with a reflecting plate 1061 having a high-reflectivity pattern (white) and a low-teflectivity pattern (black), and position changes of the reflecting plates 1061 due to motion in the directions of arrows P, Y of the support frame 1077 are detected as changes of reflectivity by the optical position sensors opposed thereto.

Figure 24A:
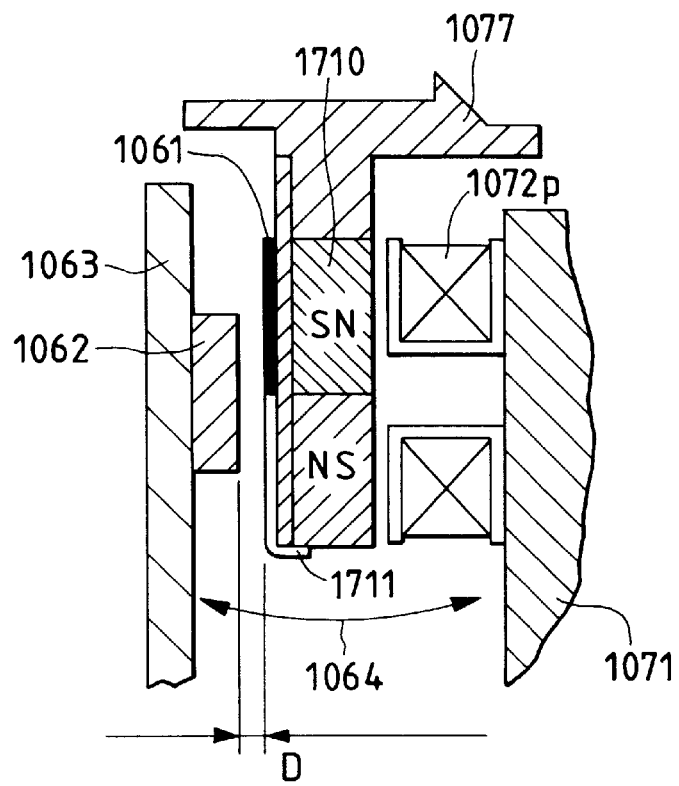
FIG. 24A and FIG. 24B are a side view of the deviation correction device of FIG. 23, when seen along the direction of arrow 24B, and a cross section taken along 24A–24B, respectively.
Figure 24B:
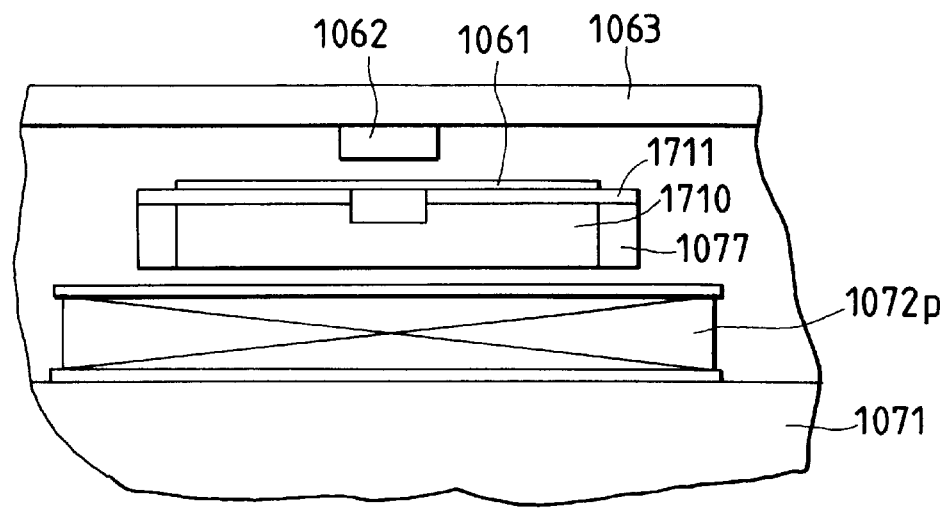

FIG. 24A is a cross section along 24A–24B of FIG. 23 and FIG. 24B is a side view seen along the direction of arrow 24B of FIG. 23.

As shown in FIG. 24A, the optical position sensor 1062 attached to board 1063 (which is fixed to the base plate 1071 with the support frame 1077 inbetween from above the plane of FIG. 23) is opposed almost to the border surface between the white and black patterns of the reflecting plate 1061. The quantity of reflected light is detected of the light projected from the optical position sensor 1062 to the reflecting plate.

Therefore, the quantity of reflected light returning to the optical position sensor 1062 varies with motion of the support frame 1077 (i.e., the opposing surface varies from the white pattern to the black pattern or from black to white), thereby detecting the position (moving direction) of the support frame 1077.

Figure 25:
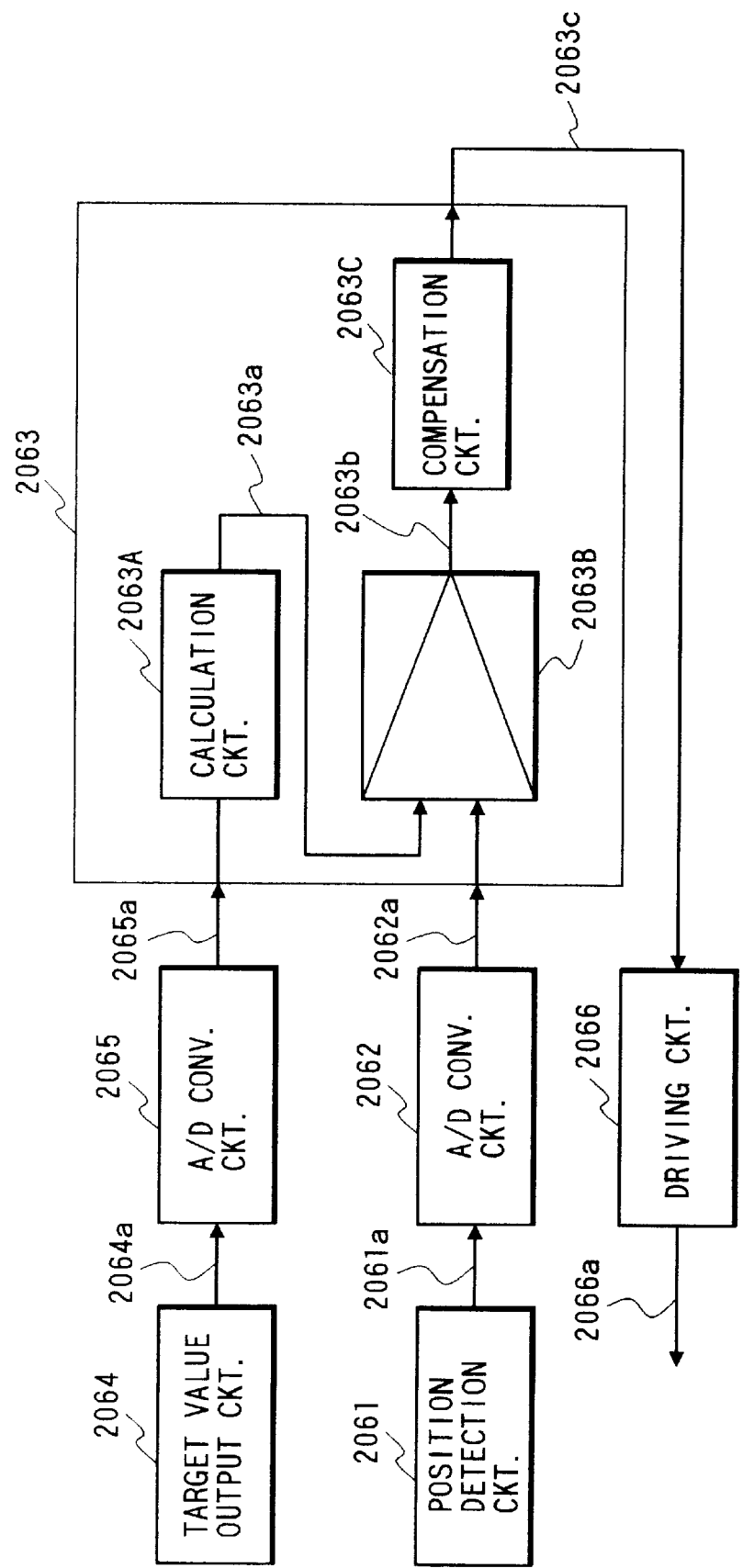
FIG. 25 is a block diagram to show the schematic configuration of the deviation correction device.

FIG. 25 is a block diagram to show the circuit configuration for feedback-controlling the drive of support frame 1077, wherein an output signal 2061*a* from a position detection circuit 2061, including the optical position sensor 1062 etc. shown in FIGS. 24A and 24B, for detecting the relative position of the support frame 1077 to the base plate 1071 is converted to a digital signal 2062*a* by A/D (analog-digital) conversion circuit 2062 to be supplied to a microcomputer 2063 having calculation circuit 2063A, differential amplifier 2063B, and compensation circuit 2063C.

On the other hand, an output signal 2064*a* from target value output circuit 2064 (which is a deviation correction target value of the correction means obtained by properly calculating the output from the vibration detection circuit for detecting deviation of the lens barrel) is converted to a digital signal 2065*a* by A/D conversion circuit 2065 to be supplied to the microcomputer 2063.

The signal 2065*a* (target value) is subjected to calculation of integration, DC cut, and the like and to amplification according to the photographing condition of camera by the calculation circuit 2063A in the microcomputer 2063, and the signal thus processed is supplied as a signal 2063*a* to the differential amplifier 2063B. The differential amplifier 2063B obtains a difference between the signals 2063*a* and 2062*a*, which is an error between the signal 2063*a* of the position desired to move as a target and the signal 2062*a* of actual position of the correction means (the position of support frame 1077). Then the differential amplifier sends an output signal 2063*c* representing the difference through the compensation circuit 2063C to driving circuit 2066. This causes the driving circuit 2066 to output a signal 2066*a* to the shift coil 1072 (FIG. 20 and FIGS. 21A to 21C), thus driving the correction means.

This method is called a position control technique, whereby the correction means is driven faithfully to the target value and the hand shakes can be corrected accurately.

The compensation circuit 2063C is a well-known phase compensator for stabilizing the position control.

Figure 26:
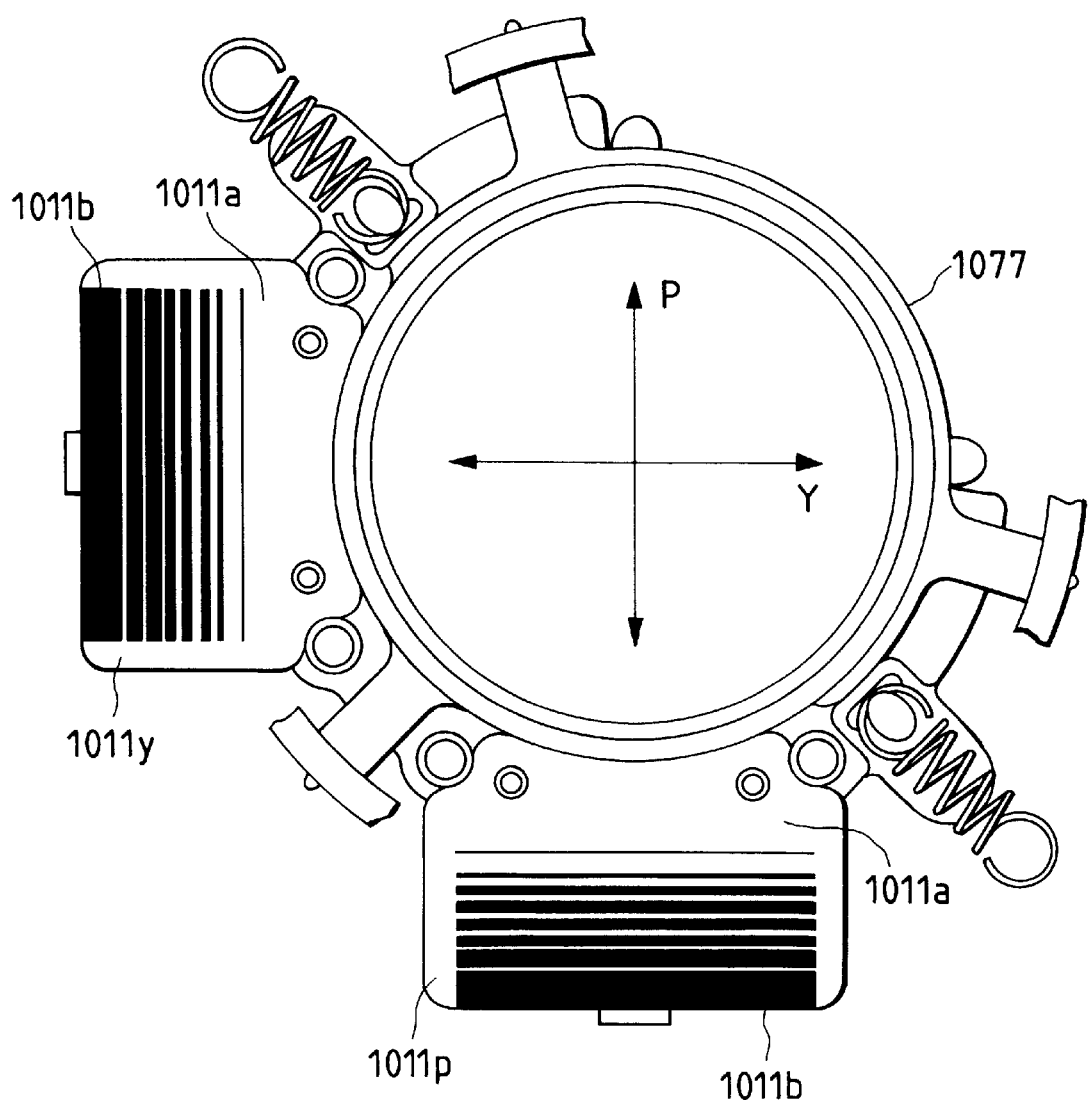
FIG. 26 is a plan view to show the main configuration of a deviation correction device as a modification of the sixth embodiment of the present invention.

FIG. 26 is a plan view to show the major part of a modification of the deviation correction device according to the sixth embodiment of the present invention described above. The modification is different from the sixth embodiment of FIGS. 20 to 25 in that each reflecting plate 1011 of FIG. 23 is modified to have a first pattern 1O11a (white) of high reflectivity located inside and a second pattern 1011*b* (black) of low reflectivity located outside, alternating first and second patterns are arranged along the detecting directions (the directions P on the reflecting plate 1011*p* or the directions Y on the reflecting plate 1011*y*), and an area ratio of first pattern and second pattern varies along the position detecting directions (the component ratio of the first pattern increases in accordance with the direction of first pattern).

First described here is the reason why the first pattern 1011*a* (white) with high reflectivity is located inside.

As shown in FIG. 24A, the reflecting plate 1061 is attached in the cantilever shape to the support frame 1077 and undergoes deflection vibration in the directions of arrows 1064. This changes the distance D between the optical position sensor 1062 and the reflecting plate 1061, which is also a cause of output error.

However, (1) the closer to the tip of the cantilever (to the outer-diameter side of the support frame 1077), the greater the amplitude of this vibration; whereas the closer to the base (the inner), the smaller the amplitude. On the other hand, (2) in the case of the reflection type optical position detecting device, it also detects the vibration in these directions (in the directions of arrows 1064 in FIG. 24A) and the larger the quantity of reflected light, the higher the detection sensitivity for detecting the vibration (i.e., the sensitivity becomes higher with increasing reflectivity of reflecting plate, which means that the sensitivity is higher to white than to black of the reflecting plate). This means that with the same amplitude an error due to vibration in a detected value becomes larger in detection with a white reflecting plate than with a black reflecting plate.

For decreasing the sensitivity in these directions in consideration of above (1) and (2), the low-reflectivity pattern is located on the tip side with greater amplitude of vibration while the high-reflectivity pattern on the base side with smaller amplitude of vibration. This lowers the rate of variation in these directions (the directions perpendicular to the directions desired to detect) appearing as superimposed as an error output in the detecting directions, thereby maintaining high deviation correction accuracy of the deviation correction device.

Figure 27:
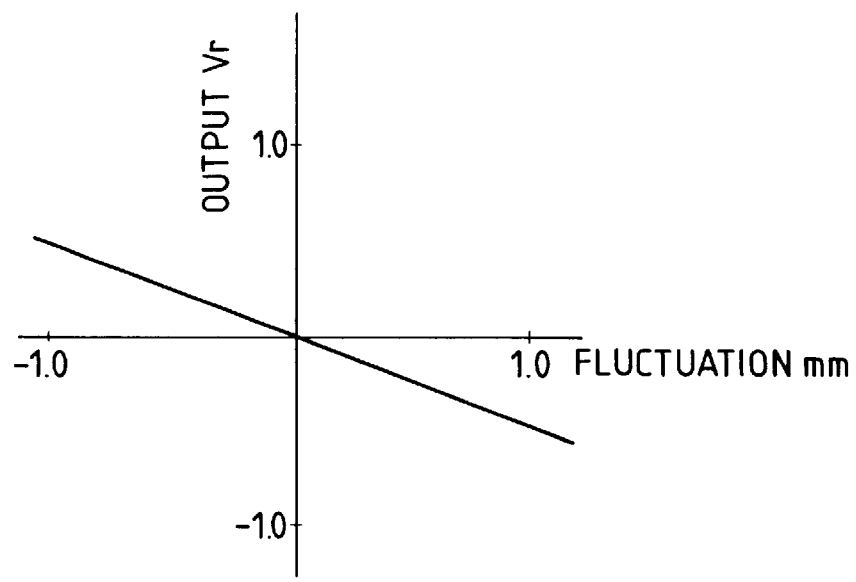
FIG. 27 is a drawing to show the detection output of the position sensor incorporated in the deviation correction device of FIG. 26.

In the case of such an arrangement that, as shown in FIG. 26, the patterns of reflecting plates 1011p, 1011y are formed in a bar-code shape and the area ratio of two reflectivity patterns is changed along the detection directions, for example, the area ratio "white/black" of black pattern and white pattern is increased toward the white pattern in the detecting direction, the output from the optical position detecting device exhibits linearity throughout the entire stroke (the abscissa), as shown in FIG. 27.

This is because the reflectivities are gradually changing in the detecting direction (the arrangement of black and white lines does not result in stepped output, because the light spot emitted from the optical position detecting device has some diameter). The linearity can be corrected partially by partially adjusting gaps between the black and white lines with necessity.

The point is that the reflectivities of patterns of reflecting plates 1011 vary slowly in the detection directions. Thus, without having to be limited to the patterns of FIG. 26, the patterns may be any combination of two-reflectivity patterns extending in the detecting directions, as shown in FIGS. 28A to 28C.

Figure 28A:
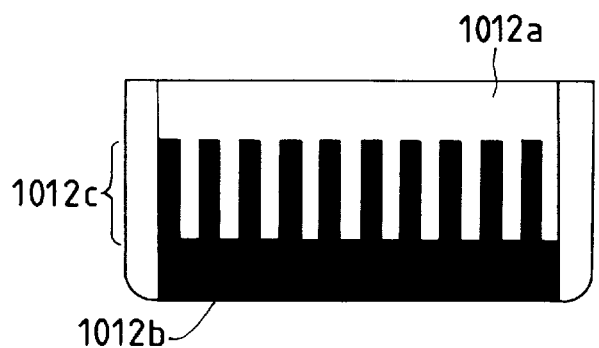
FIG. 28A, FIG. 28B, and FIG. 28C are drawings to show other examples of patterns for position detection than that of FIG. 26.

When the patterns are arranged as shown in FIG. 28A wherein the portions of first pattern 1012a and the second pattern 1012b are left and wherein the intermediate border portion is of combinational pattern 1012c, differences of reflected light quantity are large and the sensitivity can thus be enhanced, because the portions of only the first and second patterns are left. The intermediate portion (pattern 1012c) is an intermediate reflectivity pattern in which the first and second patterns are mixed, which prevents a quick change of reflectivity and assures linearity.

Figure 28B:
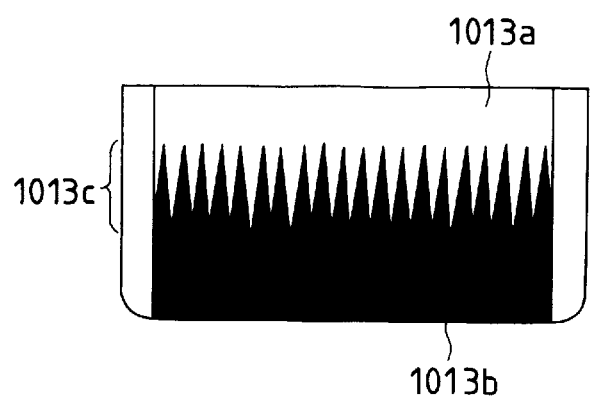
Figure 28C:
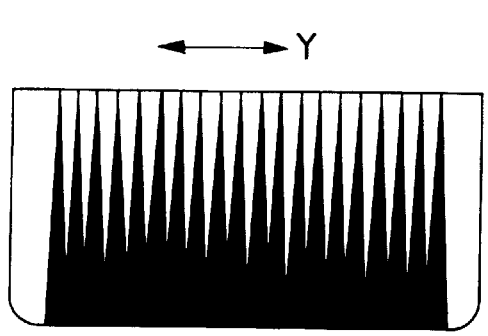

For making the reflectivity change gentler in the border portion, the intermediate pattern may be a triangular combinational pattern 1013c as shown in FIG. 28B or the entire surface may be made of such a combinational pattern as shown in FIG. 28C.

The reflecting plate, for example 1011p, moves not only in the detection directions P, but also in the directions Y (because the support frame 1077 moves in the directions along the two axes).

In the case of the bar-code patterns like 1011p, there is no change of output with motion in the directions Y, because there is no change of reflected light toward the opposing optical position detection device with the Y-directional movement. In contrast, in the case of the combinational patterns as shown in FIGS. 28A to 28C, the patterns change in a pulsed manner with the Y-directional movement. However, the projected light spot has some diameter as described above, and thus no stepped output change will appear as long as the pitch of the combinational pattern is fine enough.

Supposing the distance between the reflecting plate and the optical position detecting device is L and the combination pitch is P, the change of output with Y-directional change becomes negligible when approximately "$P/L \leq 0.5$" is met.

As described above, the position detection accuracy of the support frame can be enhanced by positioning the high-reflectivity pattern on the support side (i.e., on the root side) of the reflecting plate. Further, the linearity of output sensitivity of the position detecting device can be enhanced by providing the reflecting plate with the alternating arrangement of first-reflectivity pattern and second-reflectivity pattern along the position detection directions and changing the area ratio of respective patterns in accordance with the position detection directions.

Also, the linearity of output sensitivity can be enhanced by making the border surface between the first pattern and the second pattern in an overlapping shape of the respective patterns (or in a combinational shape of plural extending patterns).

When the detection accuracy of the position detecting device is raised as described above, the deviation correction accuracy can be enhanced.

It is noted that such an improvement in sensitivity linearity is not achieved only in the reflection system, but an improvement in sensitivity linearity may also be attained in the case of transmission type optical position detecting devices (for example, also in the case of photo interrupters) wherein a transparent film is set between light projector and light receiver and first-transmissivity pattern and second-transmissivity pattern are positioned on the transparent film as in the above description, of course.

(Seventh Embodiment)

The above sixth embodiment achieved the improvement in linearity only by designing the reflection/transmission patterns, while the seventh embodiment of the present invention is directed to a configuration for improving the linearity by providing a plurality of position sensors, which will be described referring to FIG. 29 to FIG. 31.

Figure 29:
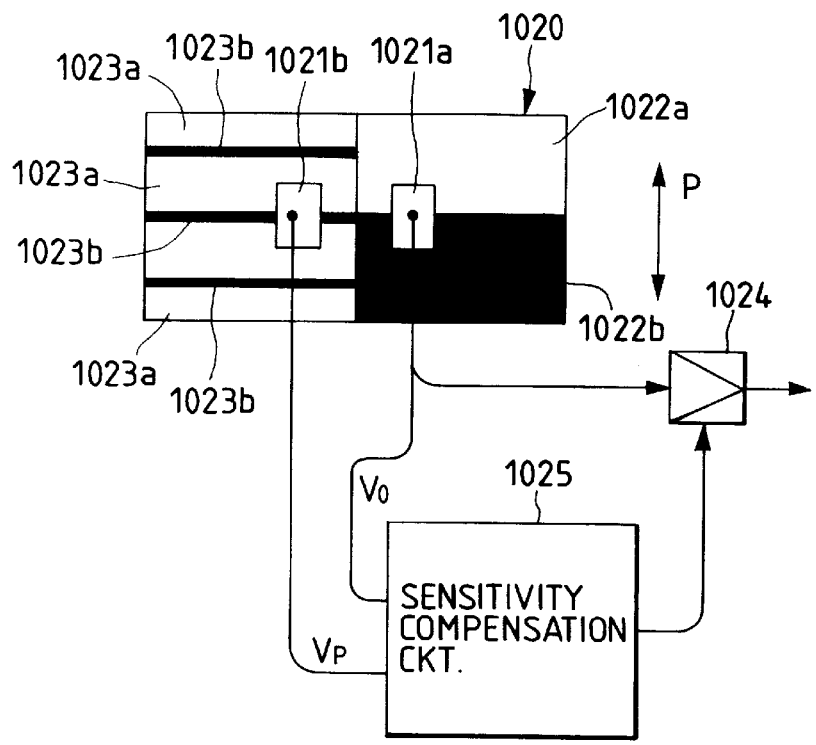
FIG. 29 is a plan view to show the main configuration of a deviation correction device according to the seventh embodiment of the present invention.

A single reflecting plate 1020 (for detection directions P) shown in FIG. 29 is provided with two types of position detecting patterns, one of which is comprised of a first pattern 1022a of high reflectivity and a second pattern 1022b of low reflectivity arranged along the detection directions and the other of which is comprised of third patterns 1023b (for pulsed output) with a narrow width and fourth patterns 1023a having a different reflectivity from that of the third patterns 1023a. Position sensors 1021a, 1021b are provided for the respective position detecting patterns.

Figure 30:
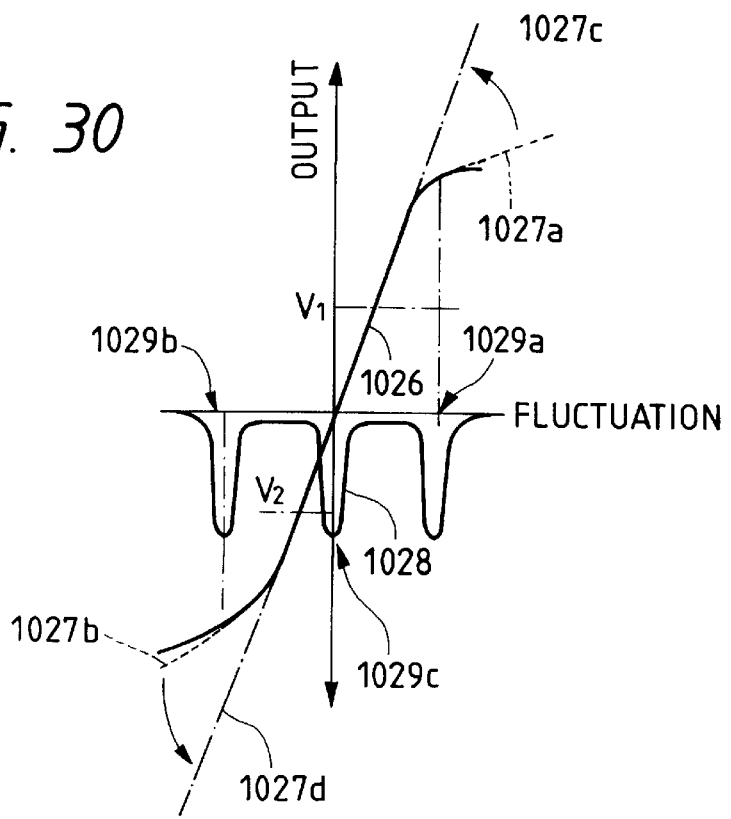
FIG. 30 is a drawing for explaining output waveforms from the respective position sensors of FIG. 29.

When the first and second patterns 1022a, 1022b move in the detection direction P, the position sensor 1021a opposed thereto gives an output as shown by waveform 1026 in FIG. 30. This lacks the linearity similarly as in the description of conventional example. Since the output from the position sensor 1021b suddenly changes at a portion facing the pattern 1023b, it accurately detects positions opposed to the patterns 1023b (see waveform 1028 in FIG. 30). The outputs from the position sensors 1021a, 1021b are supplied to sensitivity correction circuit 1025.

The operation of the sensitivity correction circuit 1025 will be described with the flowchart of FIG. 31.

Figure 31:
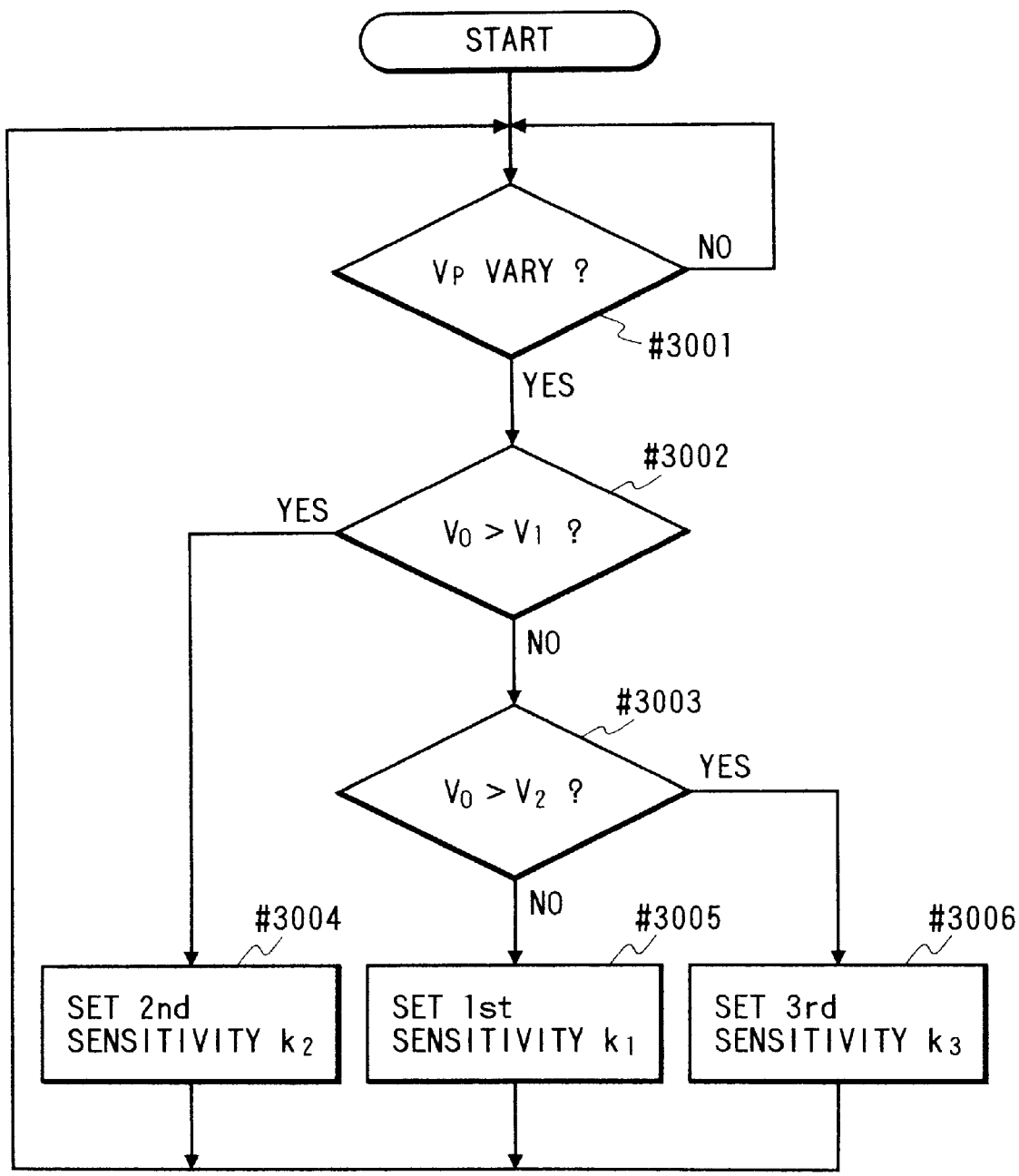
FIG. 31 is a flowchart to show the operation carried out upon detection of position in the seventh embodiment of the present invention.

The flowchart of FIG. 31 starts at the same time as on of position sensor, and first at step #3001 a change in output $V_P$ of position sensor 1021b is awaited. When the output changes, that is, when the reflecting plate 1020 moves to the next pattern 1023b, the flow proceeds to step #3002. At this step #3002 and at next step #3003, the output $V_0$ from the position sensor 1021a is compared in magnitude with values $V_1$ and $V_2$.

The output $V_0$ from the position sensor 1021a lacks the linearity as described previously. However, observation of magnitude of the output allows the position to be grasped to some extent. Therefore, by checking the output from the position sensor 1021a with the pulsed output $V_0$ being given from the position sensor 1021b, it is possible to know to a pattern of which pulse (out of the three pulses generated in FIG. 29) the position sensor 1021b is opposed.

Then the relative position between the position sensor 1021a and the reflecting plate 1020 is found out from the comparison at steps #3002 and #3003 and the amplification factor of amplifier 1024 for the position sensor 1021a is determined depending upon the position.

In FIG. 30, when the reflecting plate 1020 is displaced to the position indicated by arrow 1029a, the position sensor 1021b shows a pulsed output change and the output $V_0$ (output with the first pattern 1022a) of the position sensor 1021a is greater than $V_1$. At this time the flow goes from step #3002 to step #3004 to set the amplification sensitivity to $k_2$, thereby changing the sensitivity line from 1027a to 1027c.

Similarly, at the time of arrow 1029b the position sensor 1021b shows the pulsed output and the output $V_0$ (output with the second pattern 1022b) of the position sensor 1021a is smaller than $V_2$. At this time the flow goes from step #3003 to step #3006 to achieve amplification of sensitivity $k_3$, thereby changing the sensitivity line from 1027b to 1027d. At the time of arrow 1029c the position sensor 1021b also gives the pulsed output and the output $V_0$ of the position sensor 1021a on this occasion is between $V_1$ and $V_2$. At this time the flow goes from step #3003 to step #3005 to achieve amplification of sensitivity $k_1$, thus not changing the sensitivity line.

The above configuration can improve the detection linearity of position sensor 1021a, thereby enhancing the image blur correction accuracy.

As described, the correction of linearity can be achieved by such an arrangement that the device is provided with a plurality of position sensors 1021a, 1021b and the sensitivity correction circuit 1025 for correcting the sensitivity with the outputs from the respective position sensors, one position sensor 1021b is opposed to the pulse patterns to give the pulsed outputs (having the high position detection accuracy, but having no tendency of output with movement of reflecting plate), the other position sensor 1021a is opposed to the bisected patterns to give the analog output (having the slope of output according to the position in the detection direction, but showing the insufficient linearity and thus having the low position detection accuracy), and the amplification factor of the latter sensor is changed with respect to the output from the former sensor.

(Eighth Embodiment)

FIG. 32 is a drawing to show the main configuration of the deviation correction device according to the eighth embodiment of the present invention. The eighth embodiment is different from the above seventh embodiment in that the pattern of the reflecting plate 1031 opposed to each position sensor 1032a, 1032b is composed of patterns 1031a, 1031b with different reflectivities bisected in the detection directions P.

The border line between the patterns opposed to the position sensor 1032a is shifted in the detection direction P relative to the border line between the patterns opposed to the position sensor 1032b and a differential amplifier 1033 obtains a difference output between the outputs from the respective position sensors 1032a, 1032b.

FIG. 33A is a drawing to show an output waveform 1034a of the position sensor 1032a and an output waveform 1034b of the position sensor 1032b with movement of the reflecting plate 1031 in the detection direction P. As shown in this figure, the linearity range is narrow for each of the outputs, but the difference output between them has a widened linearity range by complementing insufficient parts of linearity with each other as shown in FIG. 33B.

As described, the deviation correction accuracy is enhanced by broadening the position detection linearity by such an arrangement that the first pattern is composed of the pair of patterns of high reflectivity and low reflectivity arranged in the position detection directions, the first position sensor is opposed to the first pattern, the second pattern has the phase shifted in the position detection direction from the first pattern, the second position sensor is opposed to the second pattern, and the sensitivity correction circuit (differential amplifier 1033) is provided for continuously transferring the outputs of the first and second position sensors one from another.

(Ninth Embodiment)

Figure 34:
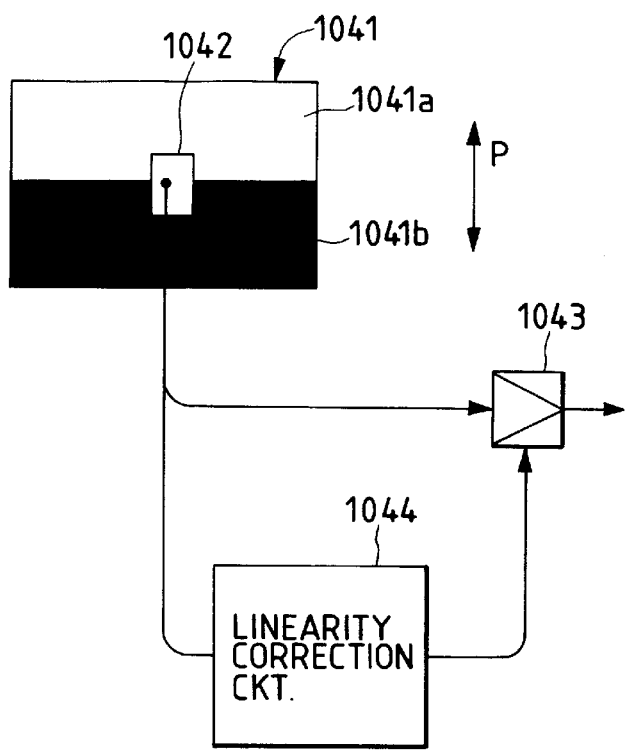
FIG. 34 is a plan view to show the main configuration of a deviation correction device according to the ninth embodiment of the present invention.
Figure 35:
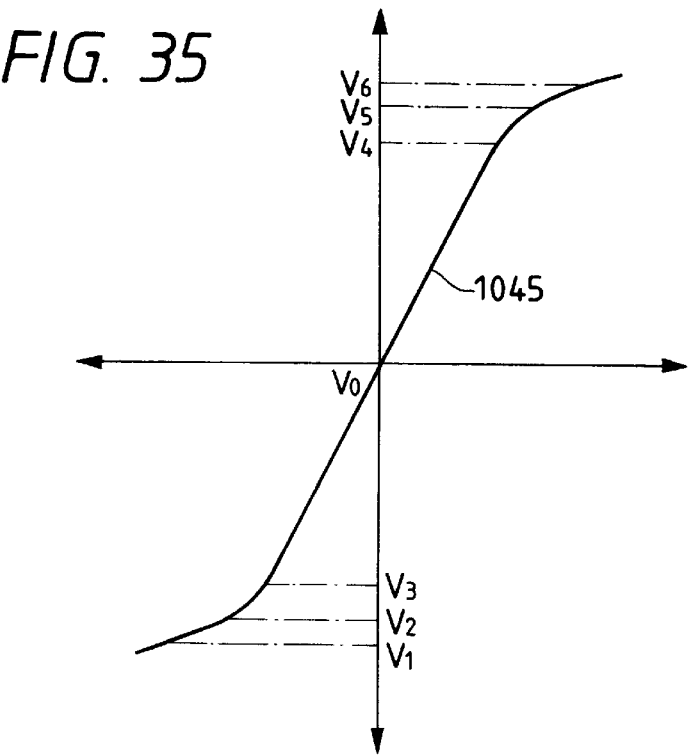
FIG. 35 is a drawing for explaining an output waveform from each position sensor of FIG. 34.

FIG. 34 is a drawing to show the main configuration of the deviation correction device according to the ninth embodiment of the present invention. Since the reflecting plate 41 facing the position sensor 1042 is composed of patterns of two reflectivities bisected in the detection directions similarly as in the sixth embodiment, the output thereof exhibits insufficient linearity as shown in FIG. 35.

The output from the position sensor 1042 is supplied to a variable amplifier 1043 and to a linearity correction circuit 1044.

The output linearity 1045 (see FIG. 35) of the position sensor 1042 is preliminarily measured and correction values of sensitivity corresponding to respective outputs $V_0$ to $V_6$ (to change the amplification factor of variable amplifier 1043 so as to keep the sensitivity constant independent of the position) are stored in the linearity correction circuit 1044.

Upon position detection the linearity correction circuit 1044 receives the output from the position sensor 1042 and outputs the corrected sensitivity to the variable amplifier 1043. This keeps the output sensitivity of position sensor constant irrespective of the position (to widen the sensitivity linearity range).

As described above, the linearity range can be widened so as to enhance the deviation correction accuracy by providing the linearity correction circuit 1044 for correcting the position detection sensitivity based on the position detection output, measuring the sensitivity linearity of the position sensor 1042 upon initial adjustment, obtaining and storing the sensitivity correction amounts from the data, and utilizing the data upon the position detection.

(Tenth Embodiment)

Figure 36:
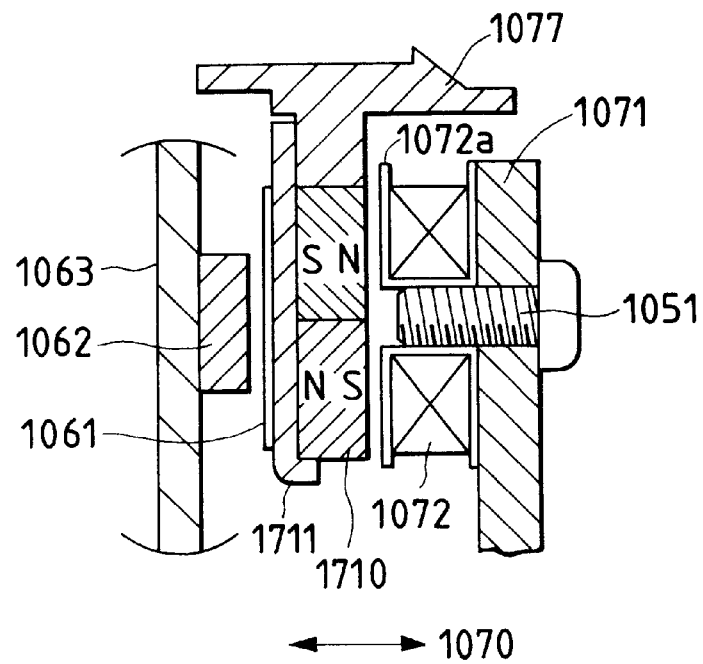
FIG. 36 is a cross-sectional view to show the main configuration of a deviation correction device according to the tenth embodiment of the present invention.

Described in the above modification of the sixth embodiment was the method for reducing the influence on the position sensors, of the vibration in the directions of arrows 1064 in FIG. 24A, and FIG. 36 is a drawing to show another example thereof as the tenth embodiment of the present invention, which is a cross section along 24A–24B of FIG. 23.

The present embodiment is different from FIG. 24A in that a bobbin 1072a of coil 1072 is fixed by a screw 1051 of a magnetic member to the base plate 1071. Magnet 1710 is attached to the back of the reflecting plate 1061. The magnet 1710 and screw 1051 attract each other, thereby biasing the reflecting plate 1061 in the optic-axis direction 1070.

This reduces the deflection vibration amounts of the reflecting plate 1061 in the optic-axis directions, which can enhance the position detection accuracy.

As described above, the position detection accuracy can be kept high by the arrangement wherein the reflecting plate 1061 is urged in the opposed direction to the position sensor 1052. Further, the magnet for driving the correction lens is also used for the urging method, and the bias method can thus be achieved by the extremely compact arrangement.

By changing the length of screw 1051 of FIG. 36, the distance is changed between the screw and the magnet so as to adjust the biasing force, thus achieving the optimum biasing force (too strong biasing force would increase the drive friction and degrade the drive accuracy). The biasing with magnetization is not limited to the screw used in FIG. 36, but another opposite magnet may also be used on the base plate 1071 side.

(Eleventh Embodiment)

Figure 37:
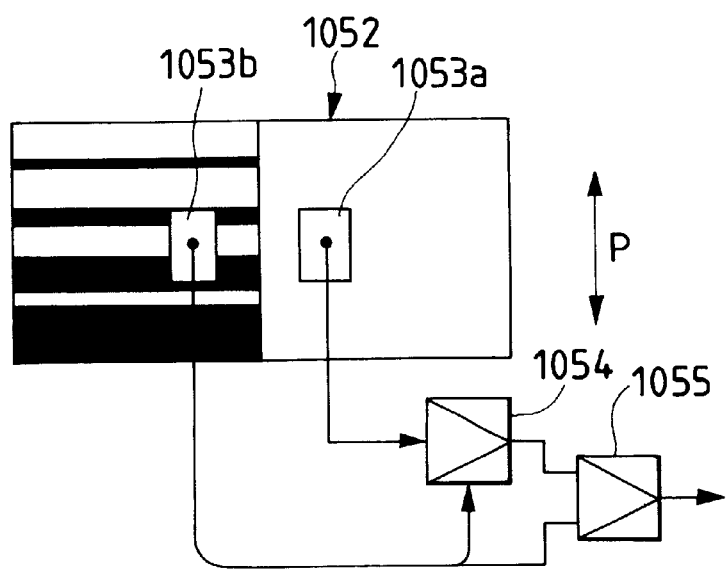
FIG. 37 is a plan view to show the main configuration of a deviation correction device according to the eleventh embodiment of the present invention.

FIG. 37 is a drawing to show the major configuration of the deviation correction device according to the eleventh embodiment of the present invention. The eleventh embodiment shows another example for reducing the influence of vibration in the directions of arrows 1064 of FIG. 24A on the position sensor, similarly as in the above tenth embodiment.

There are two position sensors 1053*a*, 1053*b* for the detection directions P and the surface of the reflecting plate 1052 facing the position sensor 1053*a* has a monochrome pattern showing no change in reflectivity in the detection directions P. The surface of reflecting plate facing the position sensor 1053*b* has the bar-code patterns similar to those in the above sixth embodiment. Then the output from this position sensor 1053*a* is supplied through a variable amplifier 1054 to a differential amplifier 1055. The output from the position sensor 1053*b* is supplied to the differential amplifier 1055, and the amplification factor of the variable amplifier 1054 is arranged to change in accordance with the output from the position sensor 1053*b*.

Since the surface of the reflecting plate 1052 facing the position sensor 1053*a* is monochromatic, the position sensor 1053*a* does not detect movement of the reflecting plate 1052 in the detection directions P. However, it detects vibration of the reflecting plate 1052 in the directions normal to the plane of drawing (i.e., in the directions of arrows 1064 in FIG. 24A).

The position sensor 1053*b* detects movement of the reflecting plate 1052 in the detection directions P as described in the above sixth embodiment. However, it also detects the vibration normal to the plane of drawing and the sensitivity thereof changes depending upon the reflectivity of the reflecting plate 1052 opposed thereto. Specifically, the sensitivity in the above vibration directions is high when the sensor faces the pattern with high reflectivity at one end of detection directions P, while the sensitivity in the vibration directions is low when the sensor faces the pattern with low reflectivity at the other end.

If the amplification factor of the position sensor 1053*a* is changed according to the magnitude of output from the position sensor 1053*b* (by the variable amplifier 1054), the output from the position sensor 1053*a* will detect only the vibration of the position sensor 1053*b* in the directions perpendicular to the plane of drawing. When the differential amplifier 1055 obtains a difference between the outputs from the two sensors, the output includes only the sensitivity in the position detection directions P.

As described above, the position detection accuracy and the deviation correction accuracy are enhanced by arranging the optical position detecting device for detecting the position by the quantity of reflected light in such a way that the position sensor 1053*b* is provided for detecting the position in the first direction of the opposing reflecting plate 1052, the position sensor 1053*a* is provided for detecting the position in the second direction (in the vibration direction in this example) different from the first direction, and the device is provided with the means (the variable amplifier 1054 and differential amplifier 1055) for correcting the output from the position sensor 1053*b* based on the output from the position sensor 1053*a*.

The foregoing described the sixth to the eleventh embodiments of the present invention and the following effects are attained thereby.

1) The high-reflectivity pattern 1011*a* is used for smaller amplitudes of vibration in the opposing directions of the opposing reflecting plate 1011*p*, 1011*y*, the low-reflectivity pattern 1011*b* is for greater amplitudes of vibration in those directions, and the position detection in the driving directions P, Y is carried out according to the change of reflectivity. Specifically, when the reflecting plate is fixed in the cantilever shape, the high-reflectivity pattern 1011*a* is set on the mount base side. This lowers the sensitivity at the portion with large amplitude of the above vibration (because of the low-reflectivity pattern), thus enhancing the position detection accuracy.

2) The opposing reflecting plate 1011 is urged in the opposing direction so as to suppress deflection in this direction, thus improving the position detection accuracy. The above urging method is one for magnetically urging the reflecting plate (by attraction or repulsion with screw 1051) and thus the urging can be achieved by the simple configuration.

3) Two position sensors 1053*a*, 1053*b* are provided for one detection direction to detect the position in the opposing direction (the second direction P) of the opposing reflecting plate and in the direction perpendicular thereto (the first direction 1064). The first position sensor is opposed to the patterns of different (changing) reflectivities to detect the position in the first direction and in the second direction, while the second position sensor is opposed to the pattern without change of reflectivity to detect the position only in the second direction. The output from the first position sensor is corrected (the difference is obtained) with respect to the output from the second position sensor and the output only in the first direction is given. This obtains the position detection output with linearity.

4) A plurality of sensors for detecting the position by the quantity of reflected light are opposed to respective different patterns and outputs therefrom are complemented with each other, thereby obtaining the position detection output with linearity. Provided are the pulse output sensor 1021*b* for accurately detecting the position as counting opposing pulse patterns 1023*a*, 1023*b* and the analog output sensor 1021*a* for detecting the moving direction by the patterns 1022*a*, 1022*b* with changing reflectivity, and the sensitivity correction circuit 1025 corrects the sensitivity linearity of the analog output sensor by the pulse output sensor. In another case, correction of sensitivity linearity is carried out by continuously transferring the outputs of plural sensors 1032*a*, 1032*b* facing the respective patterns 1031*a*, 1031*b* shifted in phase in the detection direction one from another. This allows the position detection output to be obtained with linearity.

5) The insufficient linearity of the output from the position detection sensor 1042 is preliminarily stored and the linearity is corrected based on the stored values, thereby obtaining the position detection output with linearity.

6) The opposing reflecting plate/transmitting plate has the pattern of the first reflectivity 1011*a*/transmissivity and the pattern of the second reflectivity 1011*b*/transmissivity along the detection directions thereof, they are arranged in the alternating manner, and the area ratio of the first pattern and second pattern is changed according to the position detection direction. In another case, they are used in a combination in the border portion between the first and second patterns, thereby making the change of reflectivity gentler from the first reflectivity to the second reflectivity. This permits the position detection output to be obtained with linearity.

(Twelfth Embodiment)

The twelfth embodiment of the present invention will be described.

In the present embodiment the photoreflectors for detecting the position of support frame 1077 are additionally provided with the configuration for compensating for a change of detection sensitivity depending upon the temperature or the like.

The main configuration of the deviation correction device in the present embodiment is substantially the same as that shown in FIG. 20 to FIG. 24B. In this configuration the present embodiment is arranged so that the border line between the two patterns with different reflectivities of reflecting plate 4011*p*, 4011*y* is opposed to the photoreflector at the position where the correction means is engaged by the engaging means (or nearly at the drive center).

The photoreflectors give little output when the reflectivity of reflecting plate is very low (for example, with a black pattern), and the output increases as the reflectivity increases.

In the case of the two reflectivity patterns (white and black) as shown in FIG. 23, the output is nothing at the black pattern while the output becomes maximum at the white pattern. The output is intermediate at the border part between them. Namely, the pair of photoreflectors both give the intermediate output at the position where the correction means is engaged and their output values vary depending upon the sensitivity of photoreflector. More specifically, the intermediate output increases with increasing sensitivity, and the intermediate output decreases with decreasing sensitivity.

Figure 38:
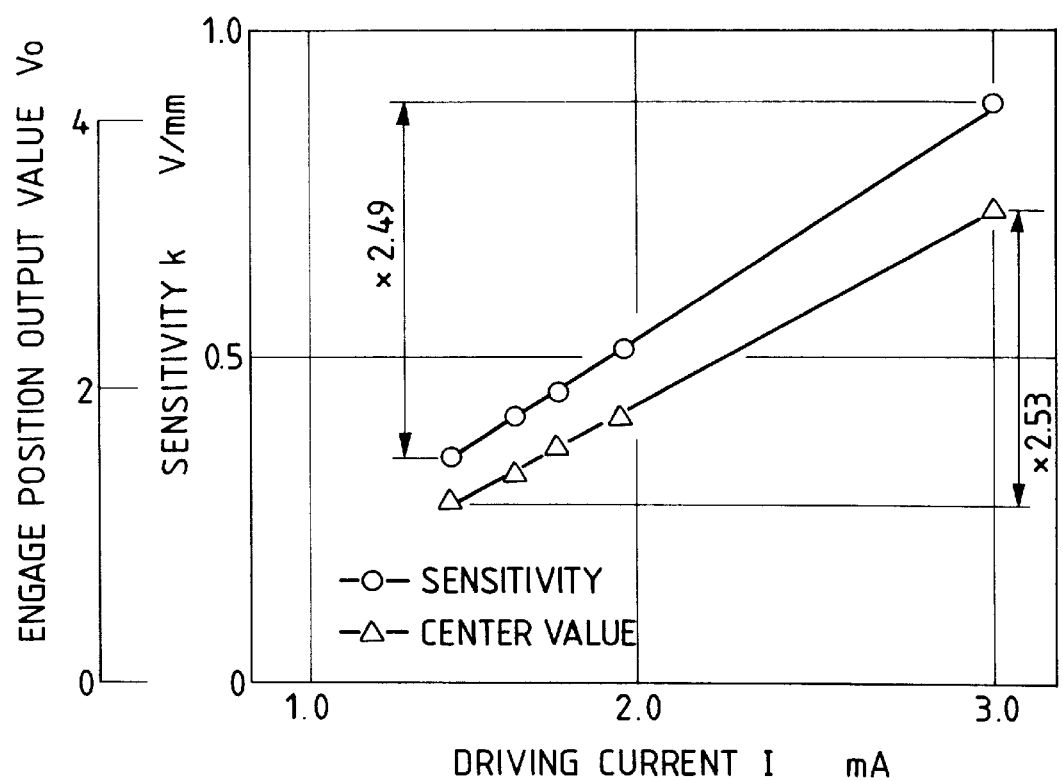
FIG. 38 is a drawing to show the relationship among the engagement position of the correction means, the drive current of photoreflector, and the sensitivity.

FIG. 38 is a drawing to illustrate the detection sensitivity in the directions of arrows P, Y and the photoreflector output at the engagement position against change in the driving current (described hereinafter) of photoreflector together. It is seen that the sensitivity and the center value (output of photoreflector at the engagement position of the correction means) increase at the same rate in accordance with the increase of driving current. Describing in more detail, the engagement position of the correction means is set so as to increase them at the same rate in accordance with the increase in the driving current of photoreflector (the details of which will be described hereinafter using FIG. 39). Accordingly, a change of sensitivity can be determined by knowing a change of center value.

Since the photoreflector and reflecting plate are positioned so that the output of photoreflector at the engagement position of the correction means changes according to the change of sensitivity, observation of the output from photoreflector at the engagement position of correction means before start of blur correction allows the sensitivity at that time to be known, thereby enabling to calibrate the sensitivity every time of operation even with a change in sensitivity depending upon the temperature.

Figure 39:
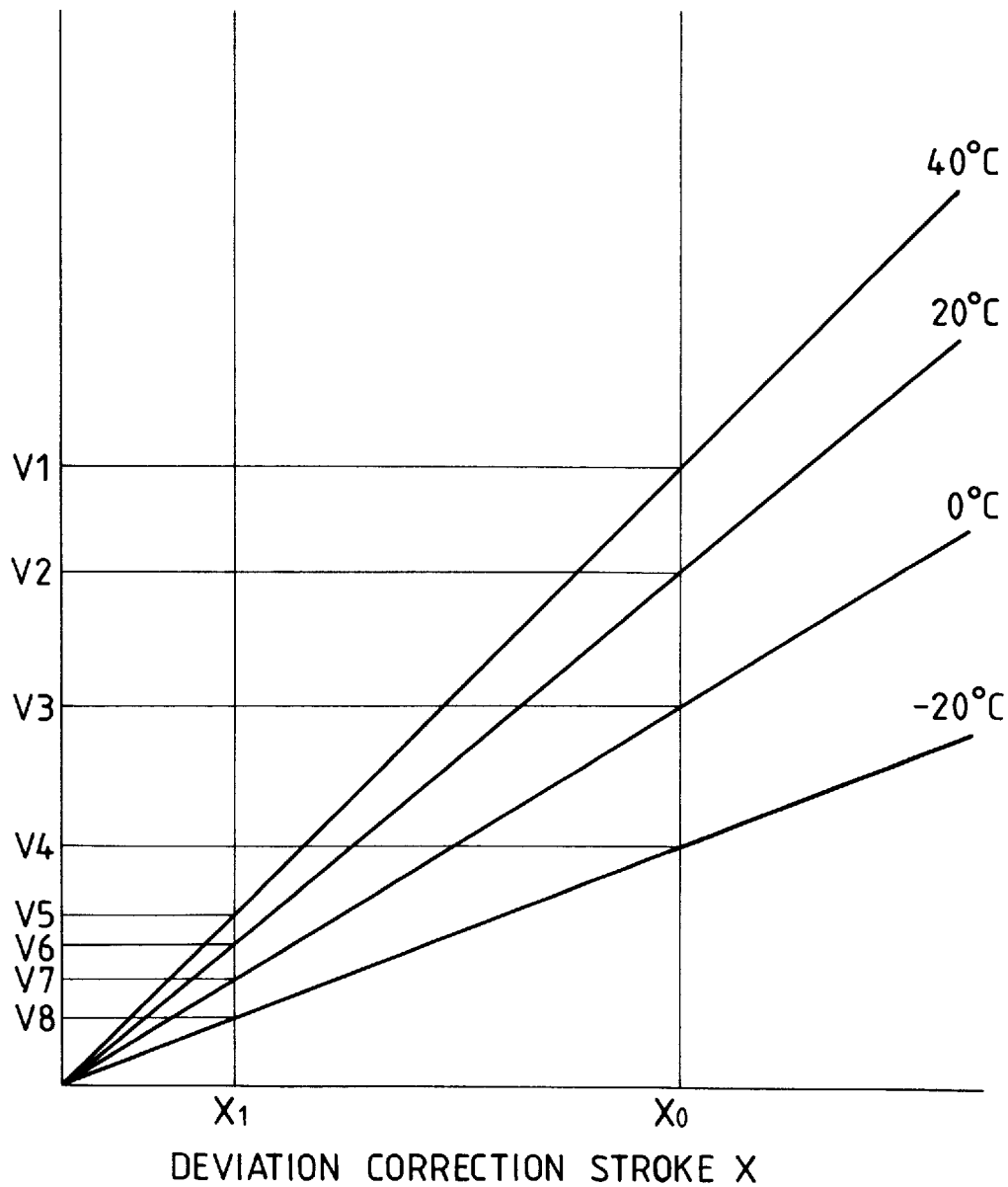
FIG. 39 is a drawing to show the relationship between the engagement position of the correction means and change of sensitivity of photoreflector depending upon the temperature.

Now described referring to FIG. 39 is the reason why the engagement position of the correction means is set so as to increase the sensitivity at the same rate as the driving current of photoreflector increases.

As shown in FIG. 39, the output representing the deviation correction stroke (of the correction means) from the photoreflector changes depending upon the temperature (the slope of this output is the sensitivity). When the correction means is engaged at the position $X_0$ of deviation correction stroke, the output is, for example, $V_1$ at the temperature 40° C. For example, if the electric current for light emission of photoreflector is decreased so as to obtain the output of $V_2$ at this time, the slope will be the same as that at 20° C., thus correcting the sensitivity at 40° C. Similarly, if the electric current for light emission is increased so as to change the output $V_4$ at −20° C. to $V_2$, the sensitivity at this time will also be the same as that at 20° C.

In contrast with it, for example, when the engagement position of the correction means is at $X_1$, there becomes little difference among outputs $V_5$ to $V_8$ of photoreflector. Thus, accurate sensitivity correction cannot be expected by correction of sensitivity with detection of this output. In order to make accurate sensitivity correction possible, the correction means needs to be engaged at a position where the output of photoreflector changes greatly depending upon the temperature.

Where (1) a known engaging means holds the correction means substantially at the center of the optic axis in which the output of photoreflector changes greatly depending upon the temperature, and (2) use of the known engaging means eliminates the need for a new means for engaging the correction means, the present embodiment uses the output of photoreflector at this engagement position (the position $X_0$ of FIG. 39) as the center value, thus enabling to perform accurate sensitivity correction.

Figure 40:
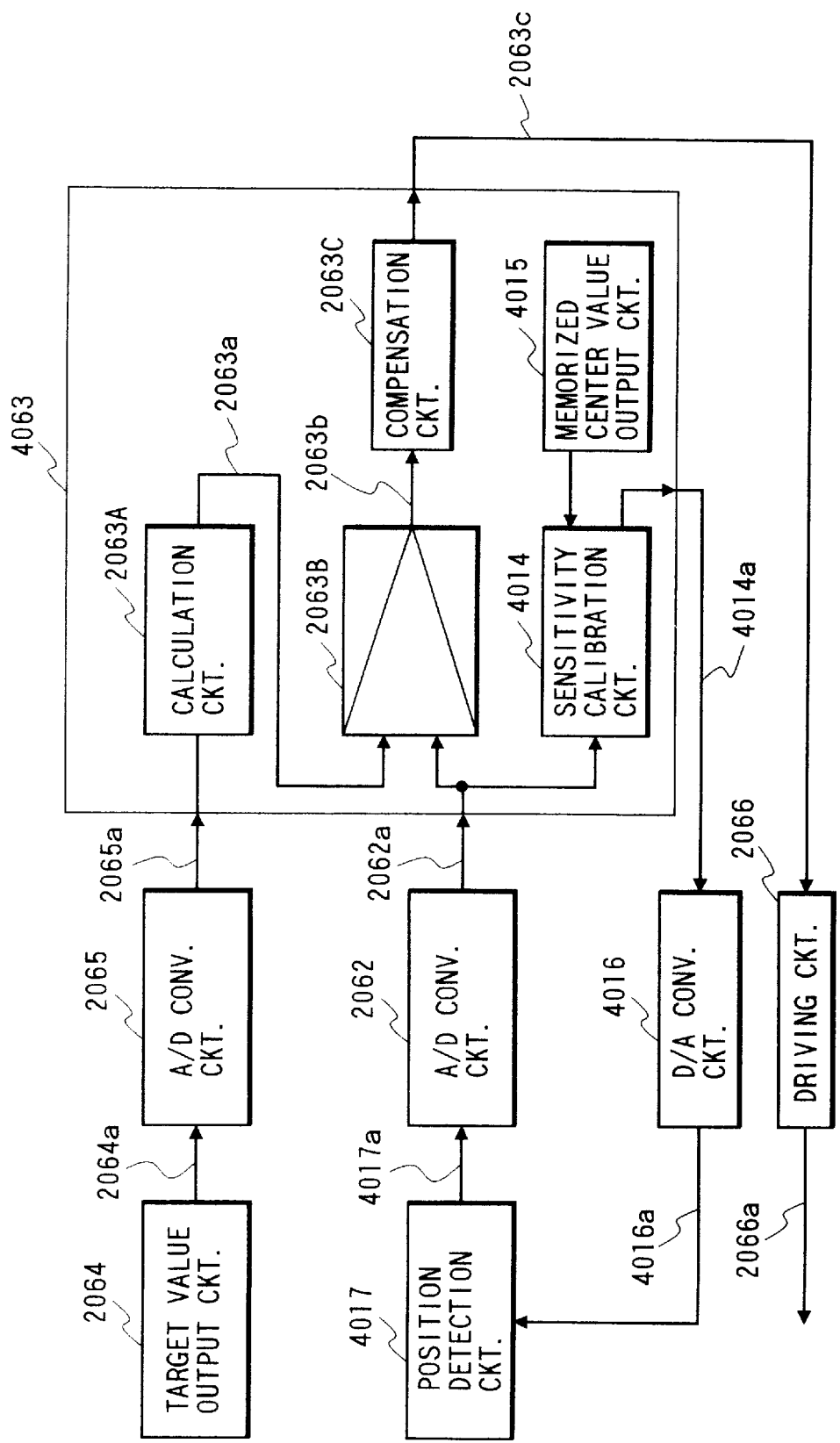
FIG. 40 is a block diagram to show the circuit configuration of a deviation correction device according to the twelfth embodiment of the present invention.

FIG. 40 is a block diagram to show the circuit configuration in the twelfth embodiment of the present invention, wherein the same elements as those in FIG. 25 of the sixth embodiment are denoted by the same reference symbols. The twelfth embodiment is different from the configuration of FIG. 25 in that the position detection circuit 4017 has a different circuit configuration (described below with FIG. 41), there are a sensitivity calibration circuit 4014 and a memorized center value output circuit 4015 provided in the microcomputer 2063, and an output signal 4014*a* from the sensitivity calibration circuit 4014 is supplied to a D/A (digital-analog) conversion circuit 4016, where it is converted to an analog signal. The analog signal is supplied as an output signal 4016*a* to the position detection circuit 4017.

Figure 41:
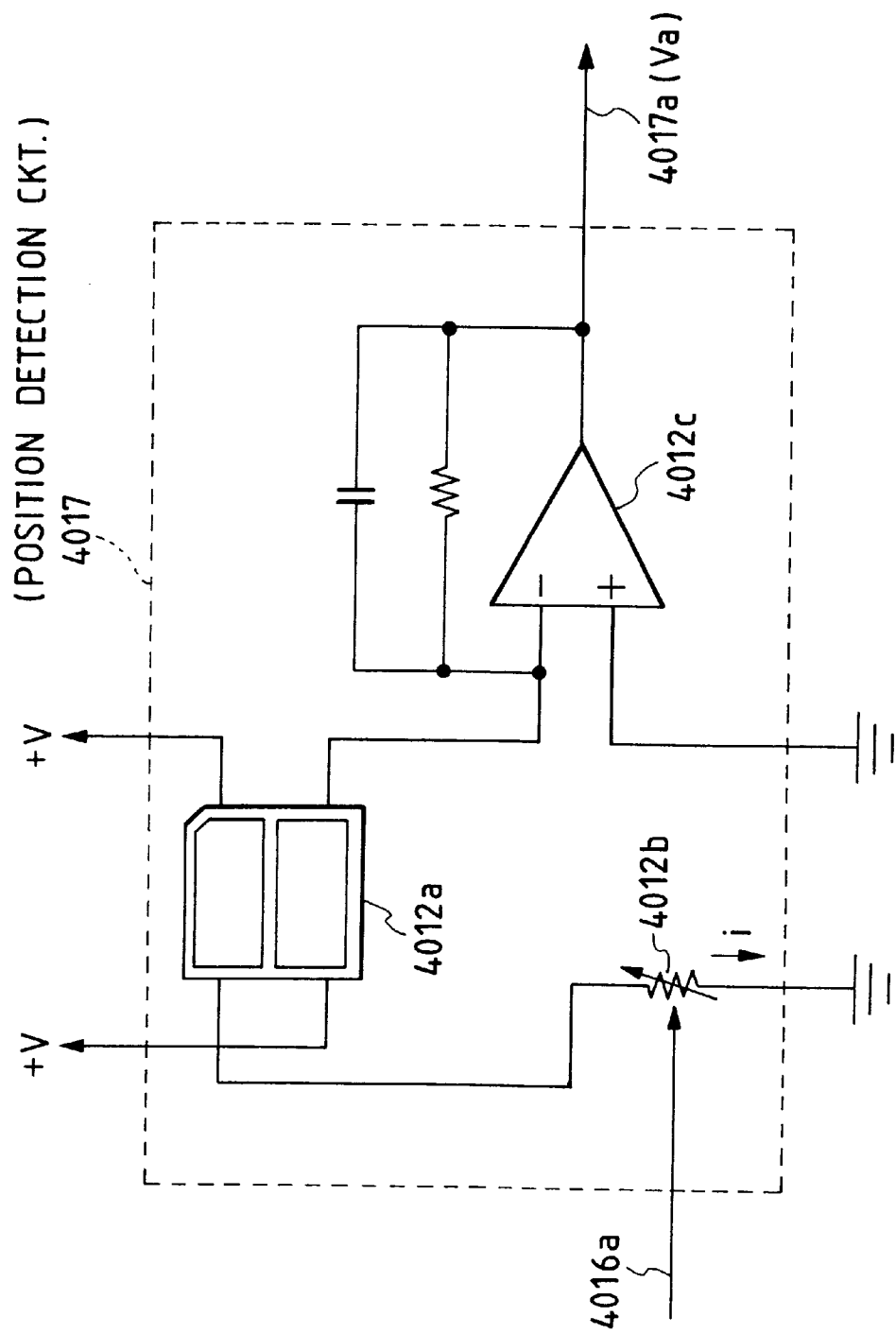
FIG. 41 is a circuit diagram to show the configuration of the position detecting circuit of FIG. 40.

The position detection circuit 4017 is comprised of, as shown in FIG. 41, a photoreflector 4012*a*, a variable resistor 4012*b* for controlling the light-emission-side driving current of photoreflector 4012*a*, an amplifier 4012*c* for current-voltage conversion of light-reception-side output of photoreflector 4012*a*, and so on. The output signal 4016*a* from the D/A conversion circuit 4016 is input so as to change the resistance of resistor 4012*b*.

The change of sensitivity by changing the driving current of photoreflector 4012*a* was described with FIG. 38, whereas this is arranged to change the sensitivity by changing the resistance of variable resistor 4012b of FIG. 41 to control the emission-side current amount of photoreflector, thereby increasing or decreasing the quantity of emitted light.

Figure 42:
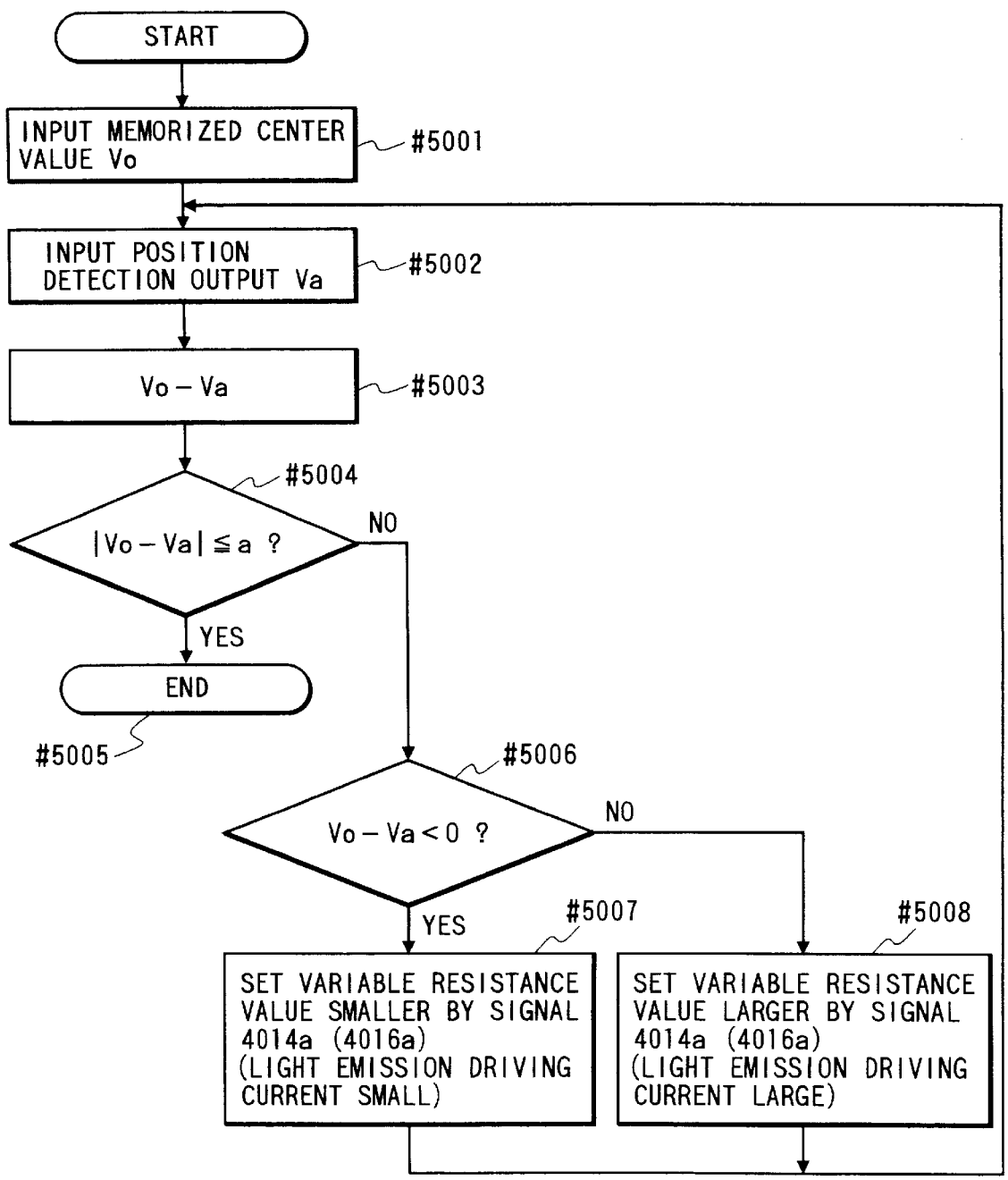
FIG. 42 is a flowchart to show the operation of the main part of the deviation correction device according to the twelfth embodiment of the present invention.

FIG. 42 is a flowchart to show the operation upon the sensitivity calibration of photoreflector 4012a. This flow starts immediately before execution of deviation correction, when the main switch of camera is turned on, when the lens is mounted on the camera, when the release button is half depressed, or the like. The correction means is arranged not to be drive-controlled yet before end of this flow.

At step #5001 the memorized center value $V_0$ is retrieved from the memorized center value output circuit 4015. This memorized center value is a measured value of the output of photoreflector at the engagement position of the correction means after adjustment (to eliminate an individual difference) of sensitivity of photoreflector upon production of deviation correction device.

At next step #5002, the signal 4062a from the A/D conversion circuit 4062, i.e., the current position detection output Va (the position detection output at the engagement position of the correction means) is taken in. If the sensitivity is changed due to a change in temperature or the like, $V_0$ and Va will be different values as described above.

At step #5003 a difference is taken between $V_0$ and Va. Then, at next step #5004, it is determined whether this difference is within specified tolerance a (inclusive). If the difference is within the specified tolerance a then the flow will go to step #5005 to end this flow. On the other hand, if the difference between $V_0$ and Va is out of the specified tolerance a then the flow will proceed to step #5006, where the polarity of "$V_0$-Va" is determined. When Va is larger than $V_0$, the flow goes to step #5007 under the determination that the sensitivity became high. When Va is smaller than $V_0$, the flow goes to step #5008 under the determination that the sensitivity became low.

At step #5007, because the sensitivity became high, the sensitivity calibration circuit 4014 outputs such signal 4014a as to increase the resistance of variable resistor 4012b of FIG. 41 by a certain amount (for example, 100 •) (or decreasing the electric current to the light emitter of photoreflector 4012a). On the other hand, at step #5008, because the sensitivity became low, the resistance of variable resistor 4012b is decreased by a certain amount. In either case the flow then returns to step #5002 and the above operation will be repeated before |$V_0$-Va| becomes within the specified tolerance a.

Namely, this flow is arranged to perform the feedback control to repeat the operation for changing the electric current applied to the position detection circuit 4017 so that the position detection output at the engagement position of the correction means reaches the preset value.

At the end of this flow Va is a value near $V_0$ (within ±a), and the change of sensitivity is also corrected.

Figure 43:
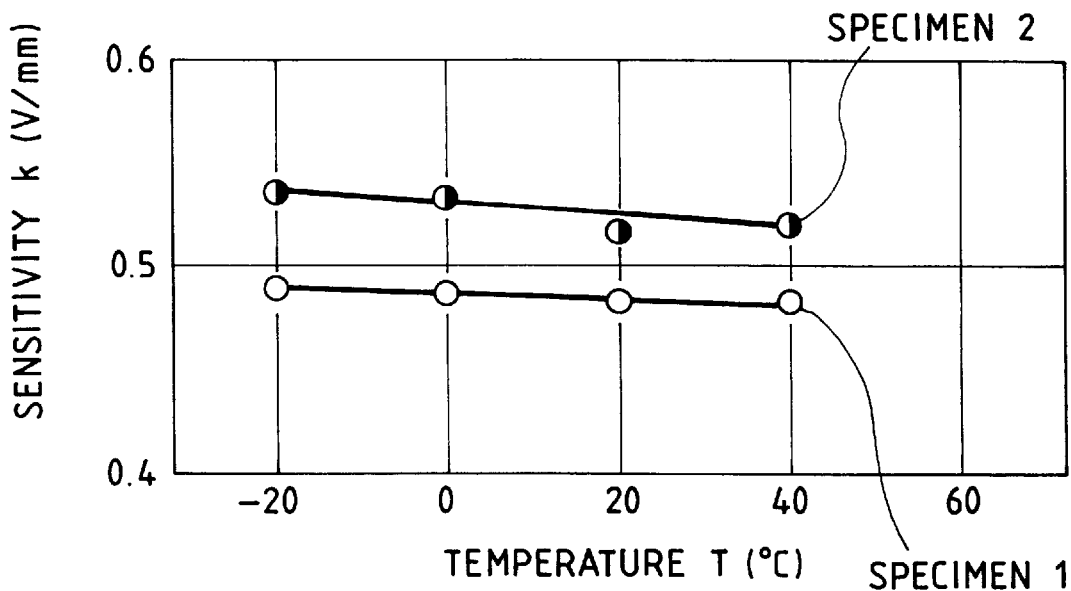
FIG. 43 is a drawing to show the relationship between the sensitivity of photoreflector and temperature change after completion of the operation of FIG. 42.

FIG. 43 shows results of sensitivity calibration carried out in accordance with the above flow, wherein the sensitivity is kept almost constant with change of temperature for each specimen.

The above flow of FIG. 42 is arranged to make Va approach $V_0$ by execution of the feedback control, but another method may be one for determining the resistance of variable resistor 4012b by an arithmetic value of $V_0$ and Va. This example will be described.

Figure 44:
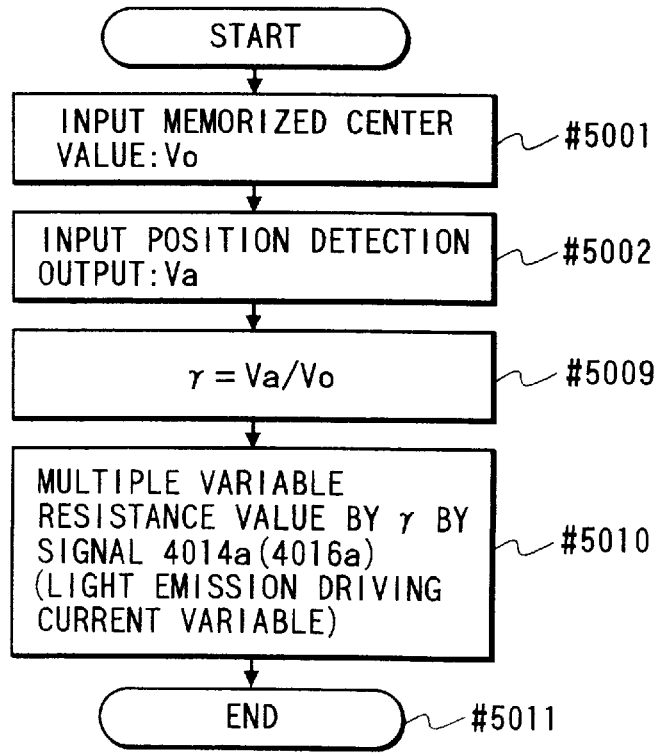
FIG. 44 is a flowchart to show another example of the operation of the main part of the deviation correction device according to the twelfth embodiment of the present invention.

FIG. 44 shows a flowchart of this example, in which step #5001 to step #5002 are the same as those in above FIG. 42. Thus, the description thereof is omitted herein.

At next step #5009, a ratio of Va and $V_0$, "Va/$V_0$ (a change rate of center value)," is obtained. Since the change rate γ of sensitivity corresponds to the change rate of center value (see FIG. 38), the sensitivity can be corrected by changing the resistance of variable resistor 4012b by this change rate γ.

At subsequent step #5010, the sensitivity calibration circuit 4014 outputs the signal 4014a according to the change rate γ as described above and the resistance of variable resistor 4012b in the position detection circuit 4017 is changed by the signal 4016a through the D/A conversion circuit 4016. Then the flow is ended at step #5011.

The configuration to perform the above operation of FIG. 44 has an advantage of decreasing the time up to the sensitivity correction, because it does not repeat the flow unlike FIG. 42.

As described above, the present embodiment permits the calibration of sensitivity under every operating condition (the temperature etc.) of camera and can always keep the sensitivity constant even in use of the position detection circuit 4041 showing the individual difference in the sensitivity change depending upon the temperature, thereby preventing degradation of deviation correction accuracy, because of the following features:

1) there is the sensitivity calibration circuit 4014 for calibrating the sensitivity of the position detection circuit 4017, based on the output of the position detection circuit 4017 for detecting the position of the correction means for correcting deviation, provided at the position where the correction means is engaged, and the sensitivity calibration circuit 4041 is activated before the correction means starts the deviation correction drive;

2) the sensitivity calibration circuit 4041 is arranged as position detection control means for controlling the output of the position detection circuit 4061 so that the output of the position detection circuit 4017 for detecting the position of the correction means becomes the preset value;

3) the detailed operation is to perform the feedback control for changing the electric current applied to the position detection circuit 4041 so that the output of position detection circuit 4041 becomes the preset value or to change the electric current applied to the position detection circuit 4041, based on the arithmetic value of the preset value and the output from the position detection circuit 4041.

(Thirteenth Embodiment)

Figure 45:
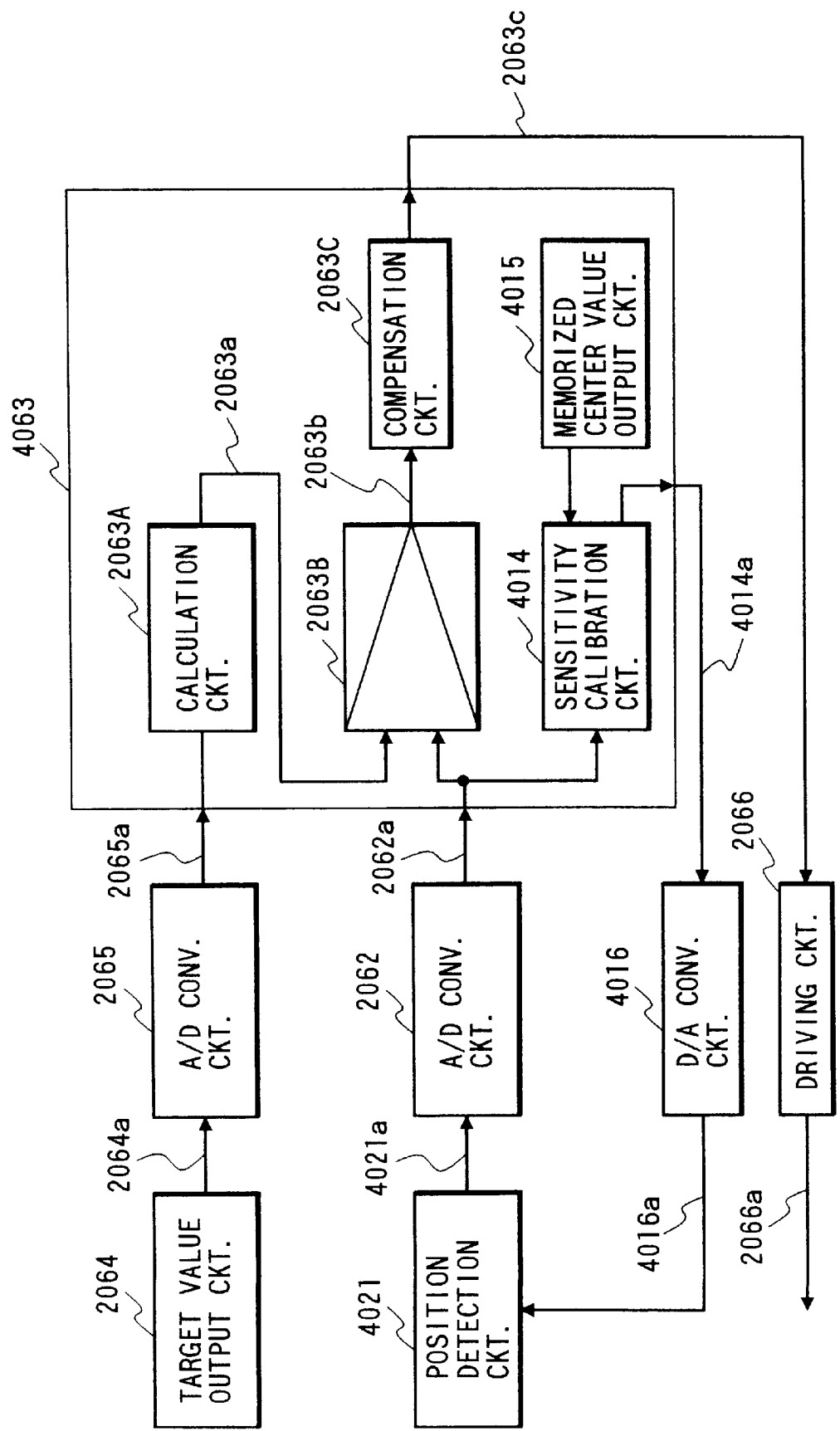
FIG. 45 is a block diagram to show the circuit configuration of a deviation correction device according to the thirteenth embodiment of the present invention.
Figure 46:
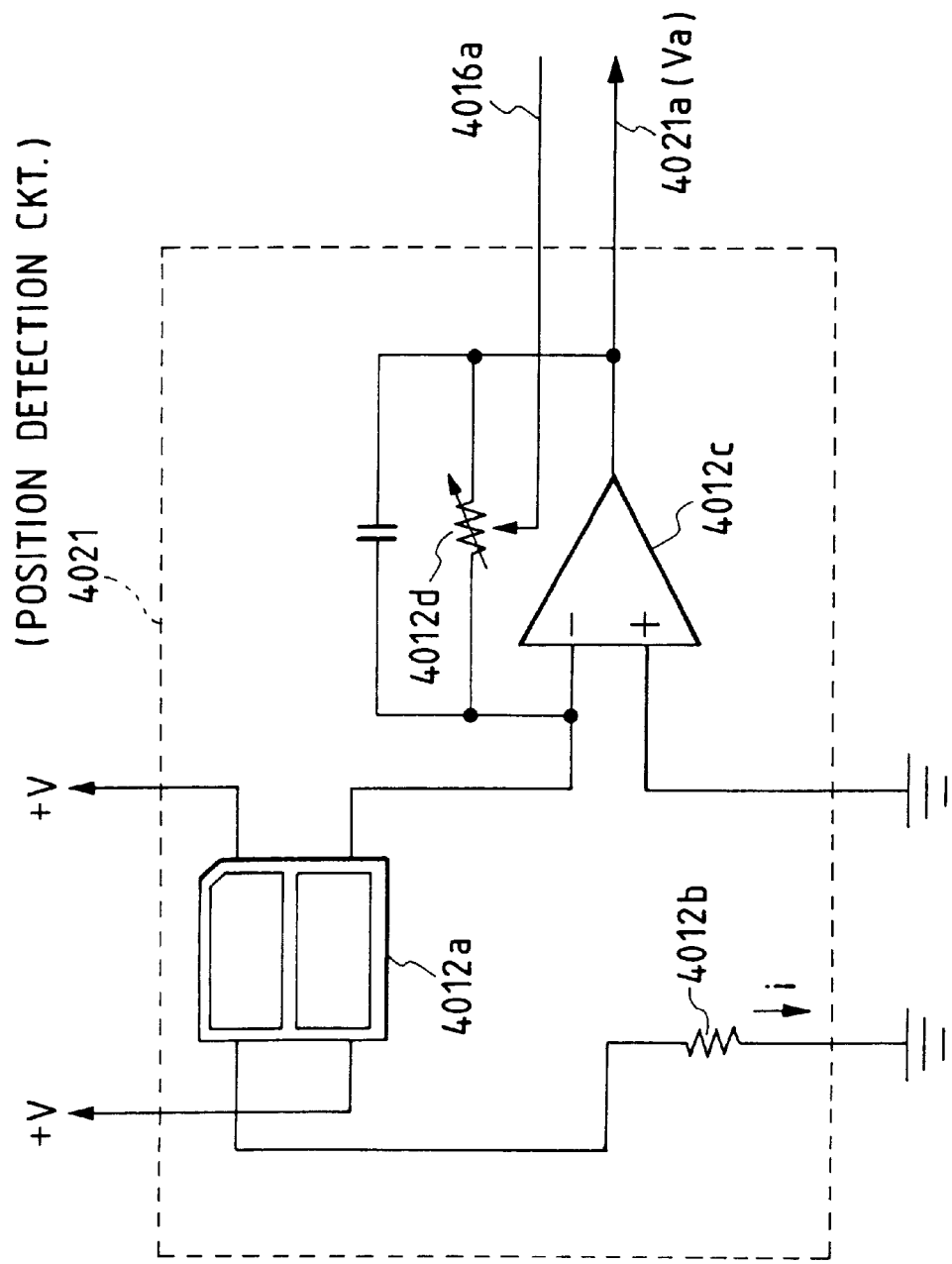
FIG. 46 is a circuit diagram to show the configuration of the position detecting circuit of FIG. 45.

FIG. 45 is a block diagram to show the main configuration of the deviation correction device according to the thirteenth embodiment of the present invention, and the thirteenth embodiment is different from FIG. 40 in that the resistance of variable resistor 4012d of amplifier 4012c in the position detection circuit 4021 the detailed configuration of which is shown in FIG. 46 is changed by the D/A converted signal 4016a.

This configuration can change the amplification factor of output of photoreflector 4012a, thereby controlling the position detection sensitivity.

Then the sensitivity change is corrected by observing the position detection output at the engaged position of the correction means every operation of the blur correction system as in the above twelfth embodiment, determining a change of sensitivity as a degree to which the output deviates from the initial set value, if any, and changing the amplification factor of amplifier 4012c.

Figure 47:
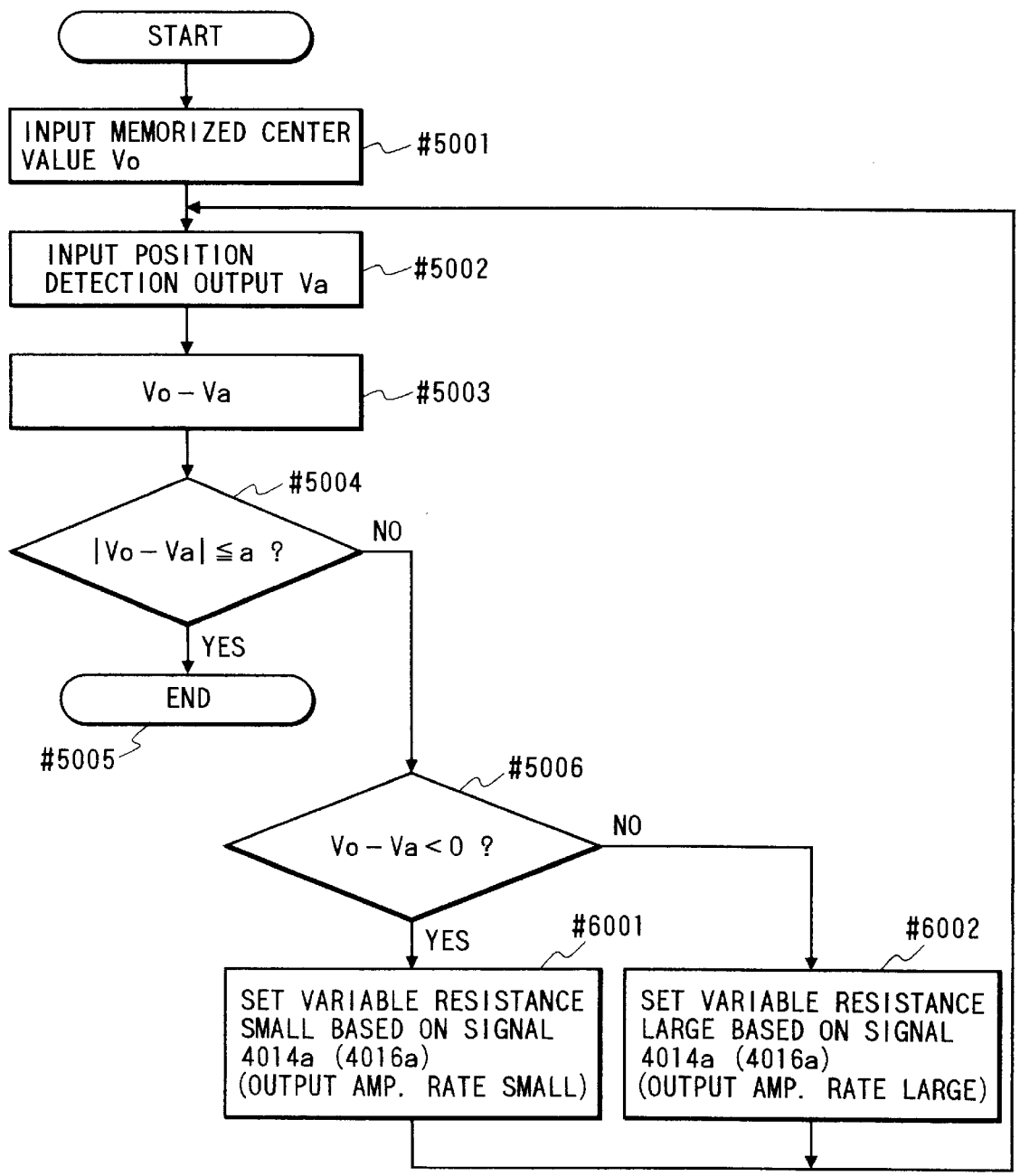
FIG. 47 is a flowchart to show the operation of the main part of the deviation correction device according to the thirteenth embodiment of the present invention.

FIG. 47 is a flowchart to show the operation upon the sensitivity correction, which is basically the same as the feedback control method of FIG. 42 described above.

However, the electric current applied to the light emitter of photoreflector 4012 was changed at steps #5007, #5008 of FIG. 42, whereas the thirteenth embodiment is arranged to increase or decrease the amplification factor of amplifier 4012c of FIG. 46 at step #6001 or #6002 (for example, the resistance of variable resistor 4012d is decreased 3% every loop of steps #5002→#5003→#5004→#5006→#6001).

This flow is repeated before the position detection output Va (the output of amplifier 4012c) comes close to the memorized center value $V_O$ (within the specified tolerance of ±a), which can correct the sensitivity change.

Figure 48:
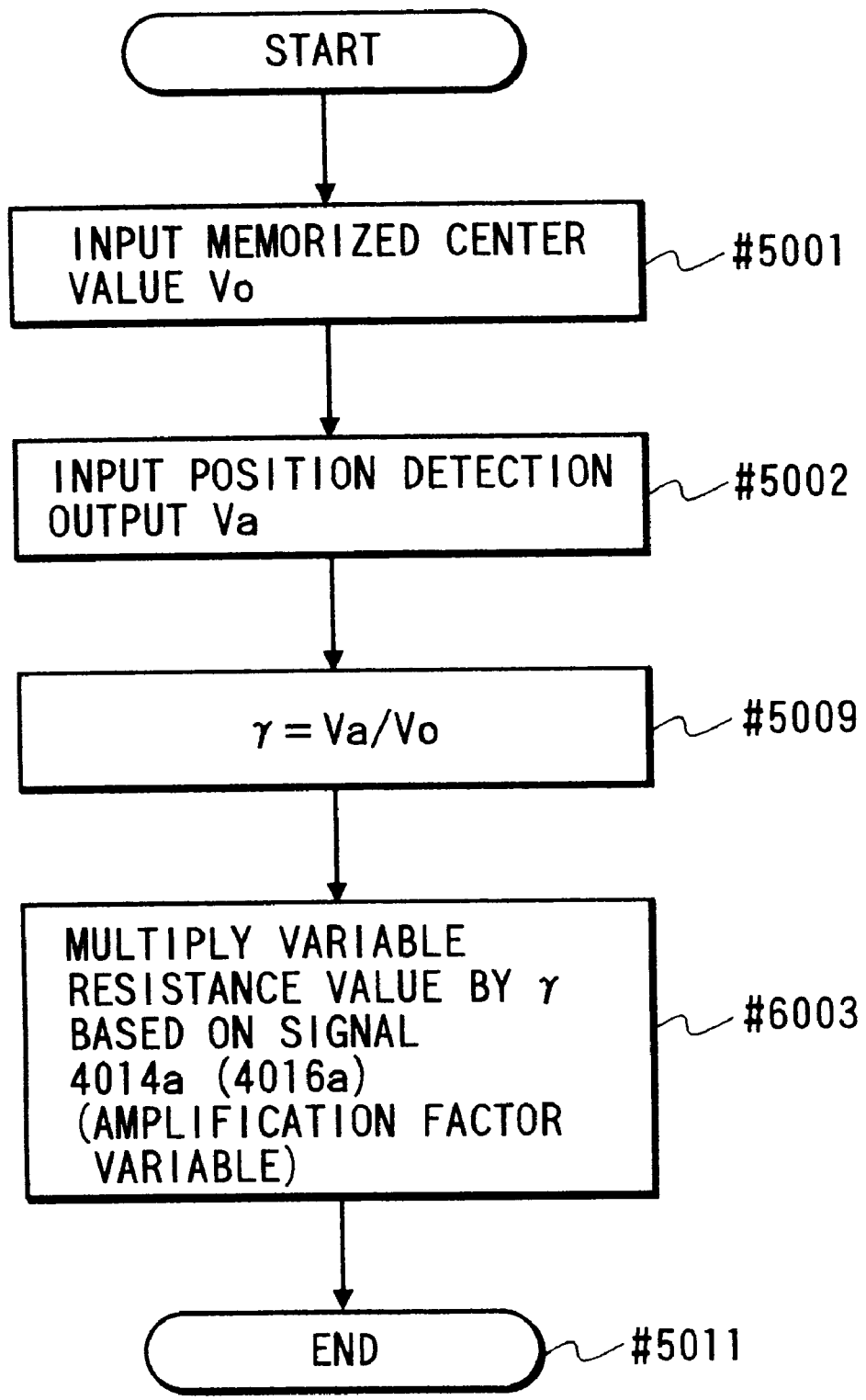
FIG. 48 is a flowchart to show another example of the operation of the main part of the deviation correction device according to the thirteenth embodiment of the present invention.

Further, the sensitivity change may be corrected by another arrangement as shown in the flowchart of FIG. 48 (which is basically the same as FIG. 44, but is modified to change step #5010 of FIG. 44 to step #6003), wherein at step #6003 the resistance of variable resistor 4012d is changed by the output change rate γ obtained at step #5009 to change the amplification factor of amplifier 4012c.

(Fourteenth Embodiment)

The above thirteenth embodiment was arranged to change the amplification factor in the position detection circuit 4021, but, without having to be limited to this, quantized signal 2062a in microcomputer 7063 may be increased or decreased.

Figure 49:
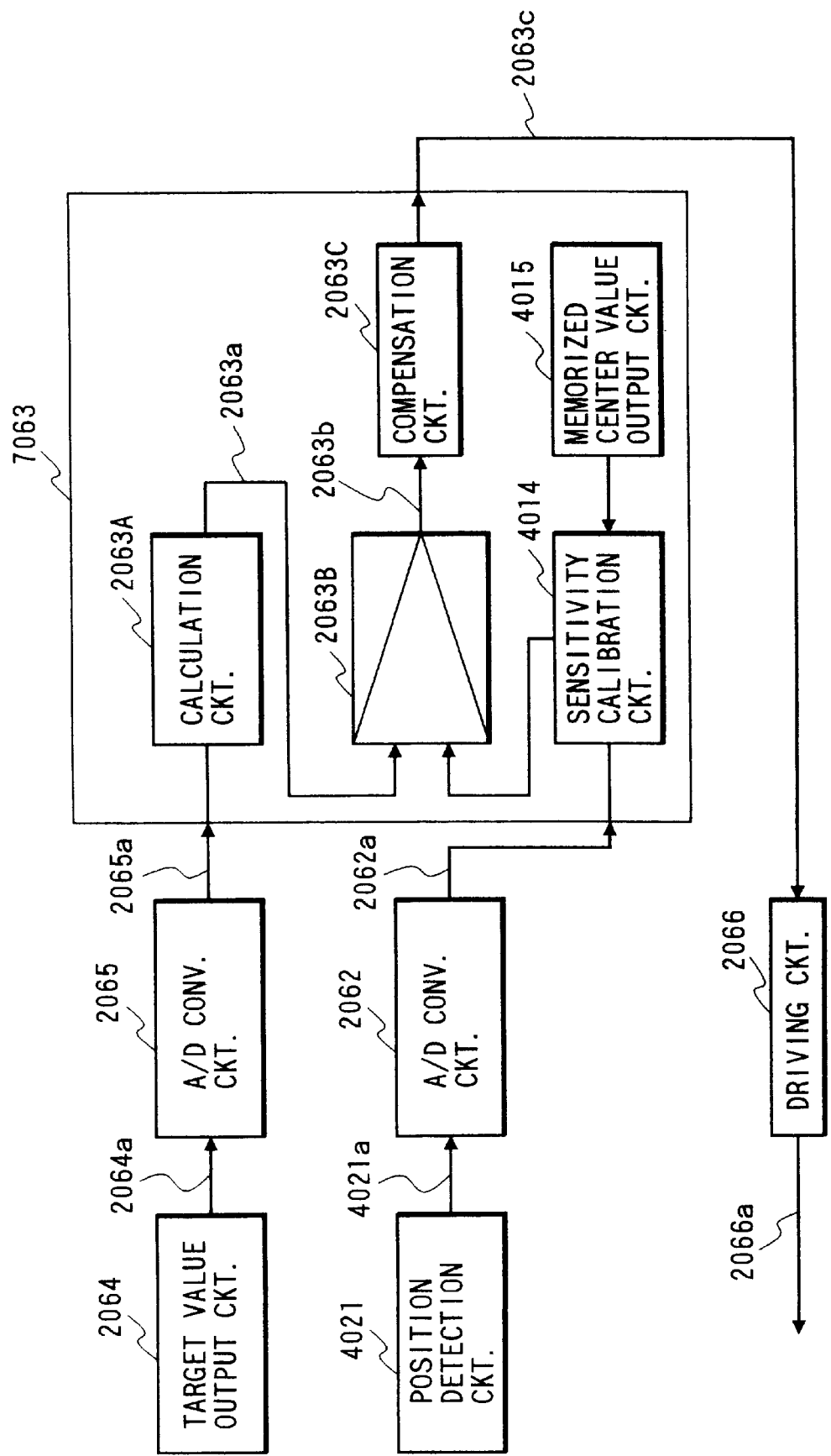
FIG. 49 is a block diagram to show the circuit configuration of a deviation correction device according to the fourteenth embodiment of the present invention.

FIG. 49 is a block diagram of the deviation correction device according to the fourteenth embodiment of the present invention to show the circuit configuration of this case. The present embodiment is different from FIG. 45 in that the output signal 2062a from the A/D conversion circuit 2062 is supplied through the sensitivity calibration circuit 4014 to the differential amplifier 2063B and in that the loop (signals 4014a, 4016a) returning from the sensitivity calibration circuit 4014 to the position detection circuit 4021, shown in FIG. 45, is eliminated.

The sensitivity calibration circuit 4014 performs such multiplication/division that the value of quantized signal 2062a at the engagement position of the correction means approaches the value of the stored center value output circuit 4015. After the two outputs are settled within the specified tolerance, the amplification factor after the multiplication/division is sent to the differential amplifier 2063B to start control of the correction means.

Figure 50:
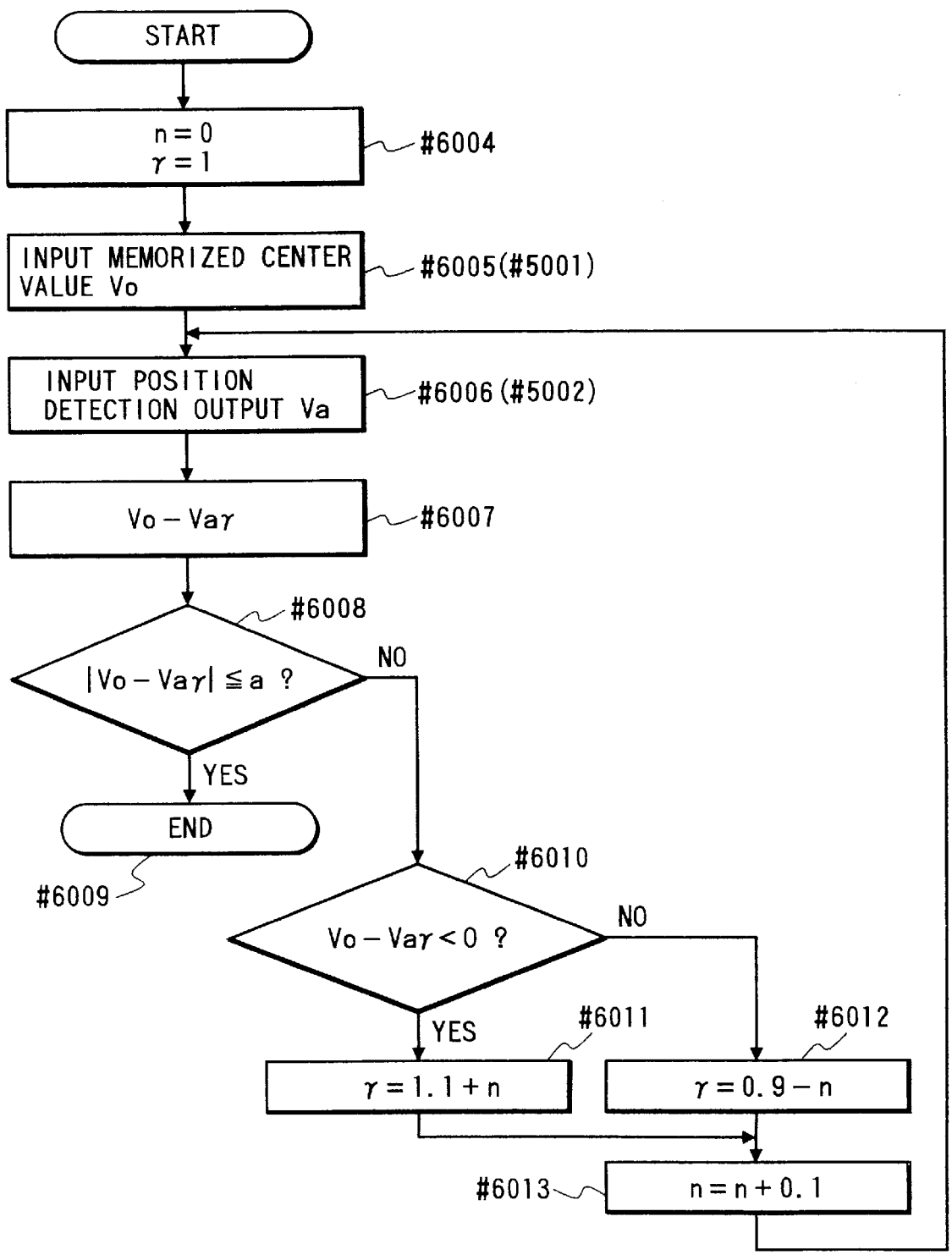
FIG. 50 is a flowchart to show the operation of the main part of the deviation correction device according to the fourteenth embodiment of the present invention.

FIG. 50 is a flowchart to show an example of the operation. At step #6004 "n" is initially set to "0" and γ to "1." At next step #6005, the memorized center value $V_O$ is retrieved from the memorized center value output circuit 4015. This memorized center value is a measured value of output of photoreflector at the engagement position of the correction means after adjustment (to remove the individual difference) of sensitivity of photoreflector upon production of deviation correction device, as described previously. At next step #6006, the signal 2062a from the A/D conversion circuit 2062, i.e., the current position detection output Va (the position detection output at the engagement position of the correction means) is read. When a temperature change or the like causes a change of sensitivity, $V_O$ and Va come to be different values as described previously.

At next step #6007, a difference is taken between $V_O$ and Vaγ. Then at next step #6008, it is determined whether this difference is within the specified tolerance a. If within the specified tolerance a, then the flow will go to step #6009 to end this flow. On the other hand, if the difference between $V_O$ and Vaγ is not within the specified tolerance a, then the flow will go to step #6010, where the polarity of "$V_O$−Vaγ" is determined. When Vaγ is larger than $V_O$, the flow goes to step #6011 under the determination that the sensitivity became high. When Vaγ is smaller than $V_O$, the flow goes to step #6012 under the determination that the sensitivity became low.

At step #6011 or #6012, γ is calculated. In the first case, because at step #6004 "n" is set at "0," the value of γ is "1.1" and "0.9" at the respective steps. At subsequent step #6013, the value of n is increased by "0.1." Then the flow returns to aforementioned step #6006.

As apparent from the above, it is seen that the sensitivity is updated by multiplying the output Va by the constant rate (γ) every loop of steps #6006→#6007→#6008→#6010→#6011 (or #6012) →#6013→#6006.

When the difference between Vaγ and $V_O$ is settled within the specified tolerance a as a consequence of repetition of the above loop, this flow is ended at step #6009. After that, the control of correction means is started using the value of the signal 2062a multiplied by the rate $γ_K(1+n_k)$. Therefore, the correction means is controlled by the sensitivity-corrected output of the position detection circuit 4021, thus accurately correcting the deviation.

Figure 51:
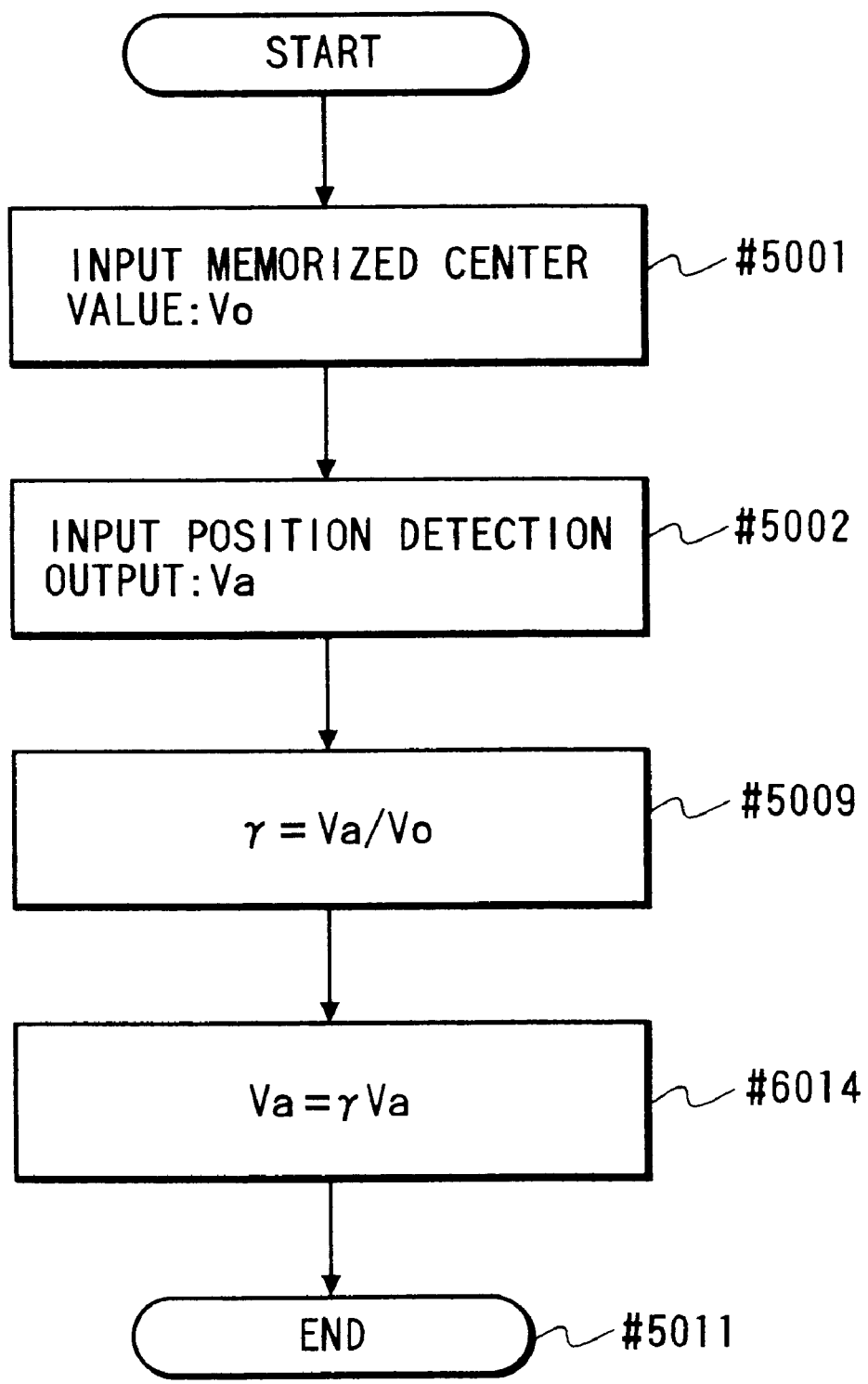
FIG. 51 is a flowchart to show another example of the operation of the main part of the deviation correction device according to the fourteenth embodiment of th present invention.

Further, the control of the correction means ay be carried out by another method as shown in the lowchart of FIG. 51, wherein the signal 2062a being A/D-converted output of the signal 4021a (Va) is always multiplied by the ratio (the same ratio as in FIG. 48) γ obtained at step #5009, at the subsequent step (step #6014), which can correct the sensitivity of the position detection circuit 4021 similarly, thus effecting accurate deviation correction.

As described in the above thirteenth and fourteenth embodiments, the sensitivity change of the position detection circuit 4021 can be corrected and degradation of deviation correction accuracy can be prevented by determining the amplification factor of the output of position detection circuit 4021 so that the position detection output at the engagement position before deviation correction of the correction means for correction of deviation becomes the preset value (the initial value upon production) (or by determining the amplification factor by the arithmetic value with the preset value) (FIG. 48 or FIG. 51), or by determining the amplification factor by the feedback control (to repeat the flowchart) (FIG. 47 or FIG. 50).

(Fifteenth Embodiment)

The above twelfth and thirteenth embodiments were arranged to correct the sensitivity change of the position detection circuit by changing the driving current of the position detection circuit (the twelfth embodiment) or by changing the amplification factor (the thirteenth embodiment).

Figure 52:
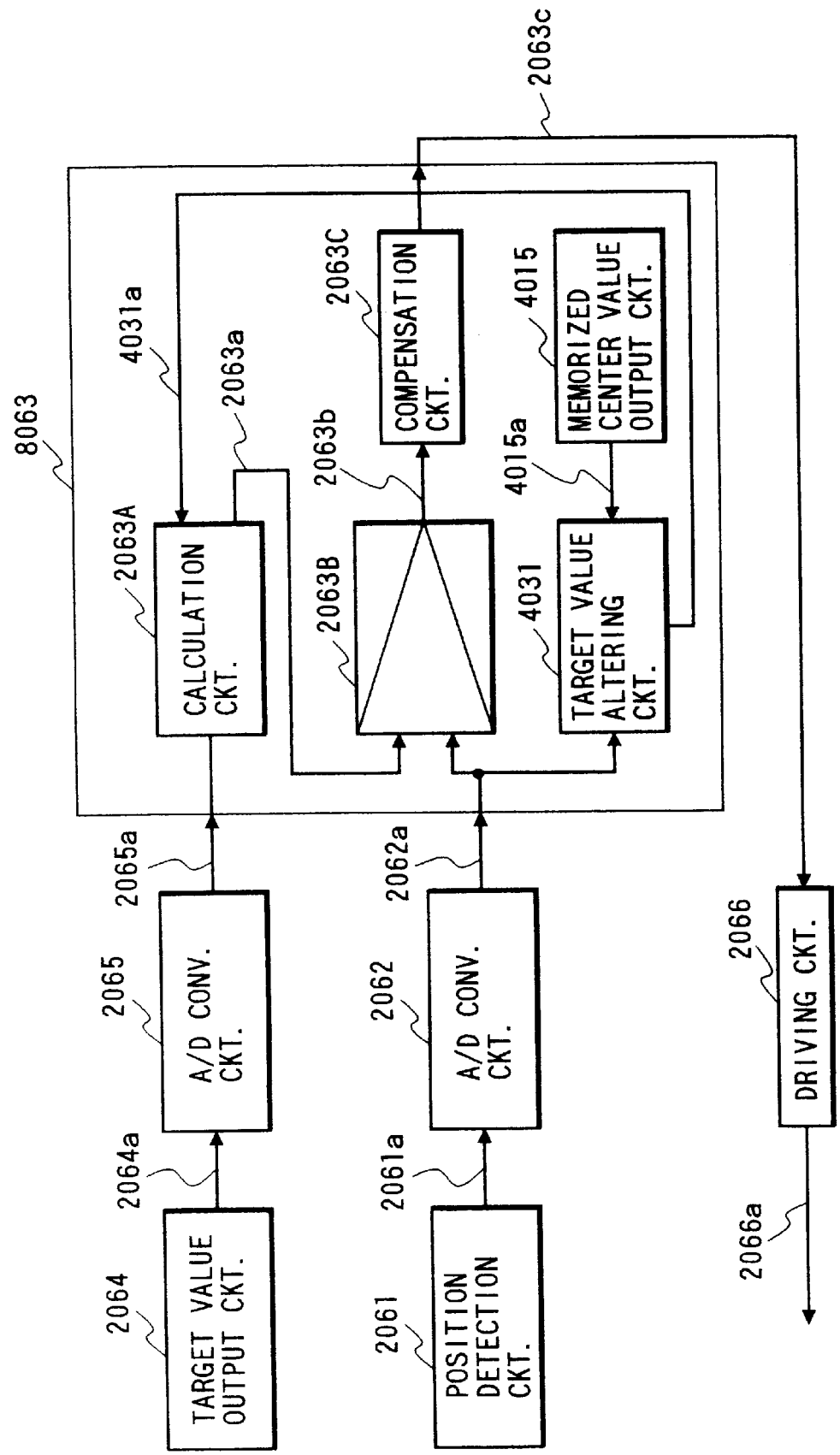
FIG. 52 is a block diagram to show the circuit configuration of a deviation correction device according to the fifteenth embodiment of the present invention.

In contrast, the fifteenth embodiment of the present invention is arranged based on such an idea as to change the drive target value of the correction means for correction of deviation, in accordance with deviation, thereby correcting the hand shake accurately and eliminating the need for sensitivity correction of the position detection circuit. FIG. 52 is a block diagram to show the circuit configuration of the deviation correction device according to the fifteenth embodiment. The same parts as those in the circuit configuration as shown in the above twelfth and thirteenth embodiments and in FIG. 25 of the sixth embodiment are denoted by the same reference symbols.

In FIG. 52, a target value altering circuit 4031 in the microcomputer 8063 receives the signal (position output Va upon engagement of the correction means) from the position detection circuit 2061 and the signal 4015a ($V_O$) from the memorized center value output circuit 4015.

Figure 53:
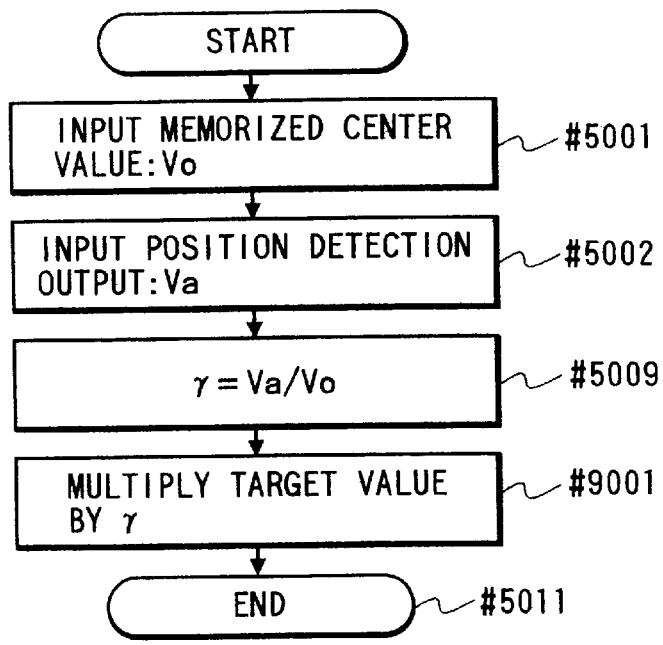
FIG. 53 is a flowchart to show the operation of the main part of a deviation correction device according to the fifteenth embodiment of the present invention.

The operation in the target value altering circuit 4031 is shown in the flowchart of FIG. 53. The same parts as those in FIG. 42 etc. are denoted by the same step numbers.

This flow starts immediately before start of deviation correction of the correction means. First at step #5001, the initial value $V_0$ preliminarily stored (the position detection output at the engagement position of the correction means at ordinary temperature, obtained upon production) is retrieved, and at next step #5002 the output Va of the position detection circuit 2061 at the engagement position of the correction means at that time (the correction means is engaged because the deviation correction is not started yet) is taken in.

At next step #5009 the ratio γ of the two values is obtained and at subsequent step #9001 the foregoing ratio γ is sent to the calculation circuit 2063A to multiply the target value by γ. Then this flow is ended.

The deviation signal of camera is supplied from the target value output circuit 2064 and the correction means is driven faithfully to this signal.

Figure 54A:
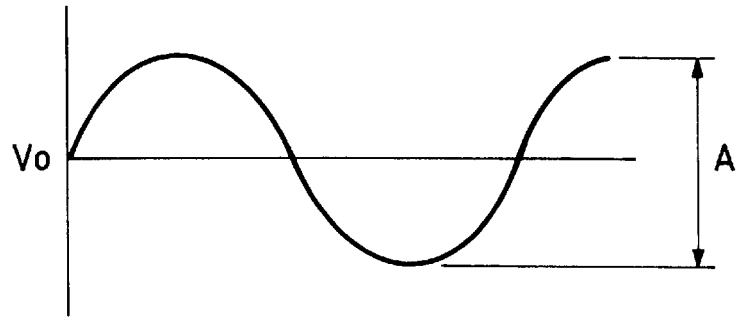
FIG. 54A and FIG. 54B are waveform diagrams for explaining the output from the target value output circuit of FIG. 52.

For example, this signal is a sinusoidal wave as shown in FIG. 54A (where sinusoidal vibration is applied). A reference value of the target value signal (which is a signal output without vibration or approximately a center value of the signal with vibration) is determined to $V_0$ (which is the same as the initial set value of the position detection output at the engagement position of the correction means).

Figure 54B:
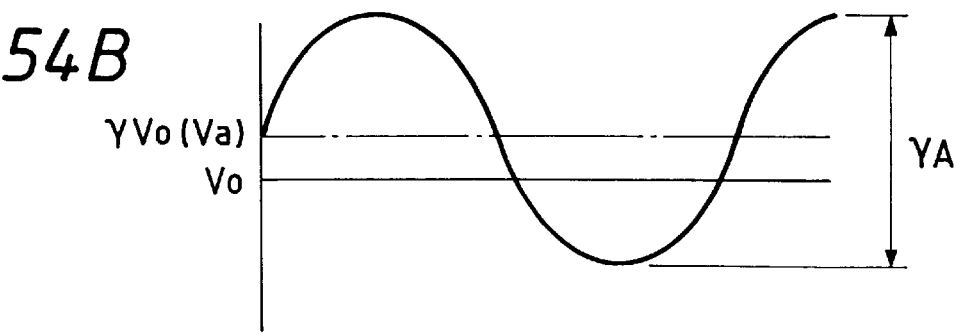

With the signal 4031a from the target value altering circuit 4031, the calculation circuit 2063A multiplies the signal of FIG. 54A by γ to obtain the signal having the waveform shown in FIG. 54B. Thus, the target value is multiplied by γ (the amplitude A is changed to γA) and the reference value is also changed from $V_0$ to $\gamma V_0$. As seen from step #5009 of FIG. 53, $\gamma V_0$ is equal to Va.

Specifically, the correction means is driven γ times greater with respect to the reference value of Va. Since the sensitivity of the position detection circuit 2061 also varies γ times, actual correction amounts are the same as before sensitivity change of the position detection circuit 2061. Thus, it can prevent degradation of deviation correction accuracy due to the sensitivity change of the position detection circuit 2016.

As described above, degradation of deviation correction accuracy can be prevented by changing the drive target value of the correction means and the reference value thereof, based on the ratio of the preset value and the position detection output at the near center position of deviation correction stroke before deviation correction of the correction means for correction of deviation.

(Modifications)

Figure 55A:
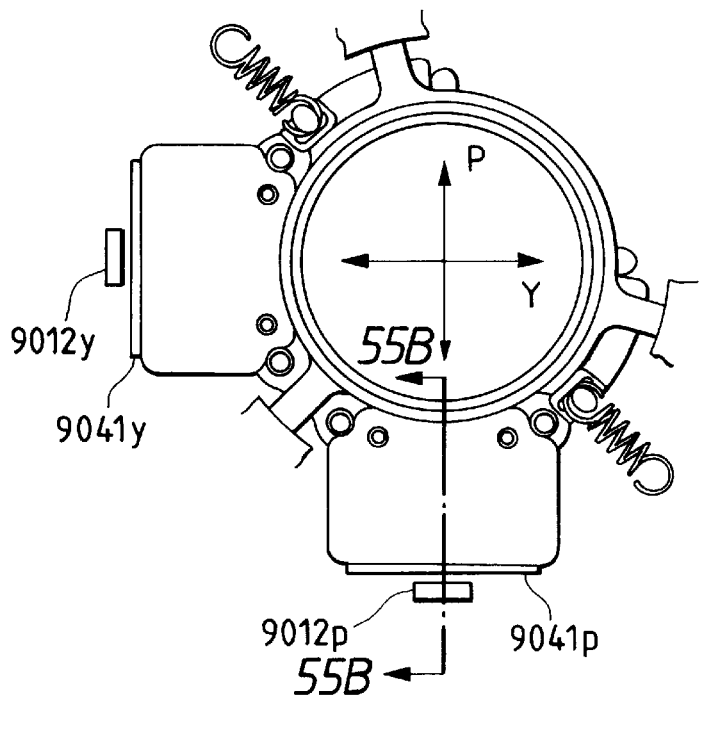
FIG. 55A and FIG. 55B are a plan view of the major part and a cross-sectional view of a part thereof, respectively, for explaining another example of position detection of the correction means according to the first to fifteenth embodiments of the present invention.
Figure 55B:
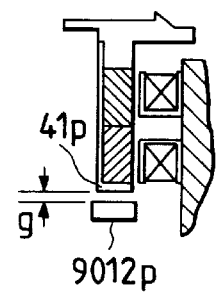

In the above first to fifteenth embodiments, the position detection of the correction means was carried out using the photoreflector 1062p (1062y) and reflecting plate 1711p (1711y), for example, as shown in FIGS. 23, 24A, 24B and so on. However, the present invention is not limited to this arrangement, but the invention may involve another arrangement, for example as shown in FIGS. 55A and 55B, wherein photoreflectors 9012p, 9012y are positioned so as to face respective reflecting plates 9041p, 9041y (having a uniform pattern of high reflectivity) and a change of gap g due to motion of the correction means in the directions of arrows P, Y is detected from a change of reflected light quantity. In this case the gap g may also be set so that the output of photoreflector 9012p (9012y) depending upon the engaged position of the correction means changes with change of sensitivity thereof.

Figure 56A:
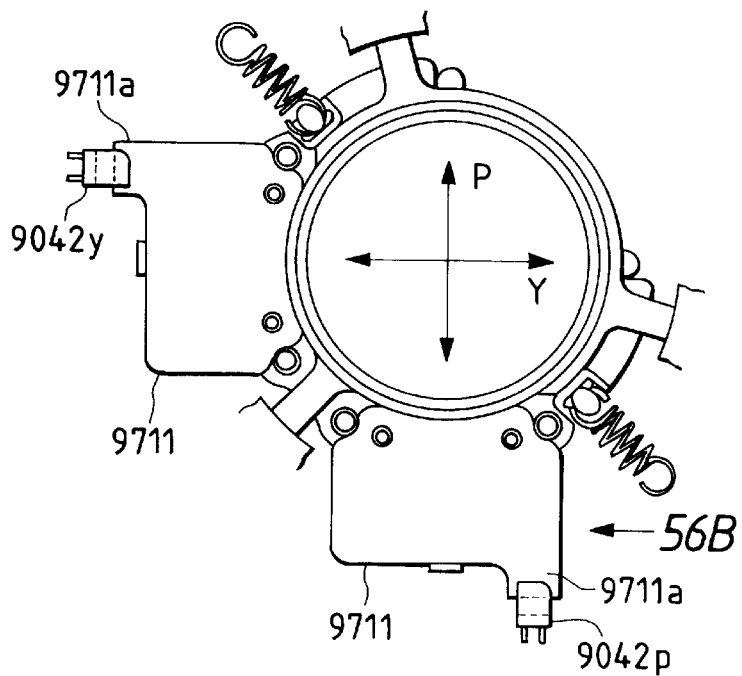
FIG. 56A and FIG. 56B are a plan view of the major part and a side view of a part thereof, respectively, similarly for explaining another example of position detection of the correction means according to the first to fifteenth embodiments of the present invention.
Figure 56B:
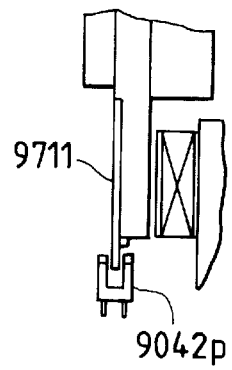

Another embodiment may be as shown in FIGS. 56A and 56B, wherein photointerrupters 9042p, 9042y are provided, a projecting part 9711a of yoke 9711 is inserted in the optical path of each photointerrupter, and the position is detected by a change of insertion amount in the optical path (due to motion of the correction means along the arrows P, Y). For example, if the projecting part 9711a is set to close a half of the optical path of photointerrupter while the correction means is engaged, the photointerrupter output at this position will change with change of sensitivity. Thus, the sensitivity correction is possible using this output.

It is needless to mention that, without having to be limited to the above photoreflectors and photointerrupters, other magnetic sensors or optical sensors may be used as means for detecting the position.

Further, the present invention is suitably applicable to cameras such as single-lens reflex cameras or video cameras, but, without having to be limited to these, the invention can also be applied to any optical devices that can demonstrate an effective function with the blur correction system of the invention.

It is also needless to mention that the present invention is by no means limited to the above embodiments and that the invention involves all arrangements capable of achieving the functions as set forth in the claims or the functions of the embodiments.

Further, the present invention also involves any combinations of the above embodiments or any combinations of the techniques thereof.

As described above, each of the twelfth to fifteenth embodiments can provide the deviation correction device that can improve the deviation correction accuracy as suppressing the sensitivity change of the position detection means due to the temperature change.

In addition, each embodiment can provide the deviation correction device that can perform the sensitivity correction of the position detection means due to the temperature change with accuracy.

What is claimed is:

1. A position detecting apparatus applied to an image blur correcting device having a movable member, said apparatus comprising:

a light emitting device;

a reflecting member for reflecting light from said light emitting device, said reflecting member having portions with different reflectivities, wherein a position upon which the light from said light emitting device impinges changes according to movement of the movable member; and a light receiving device for receiving light reflected by said reflecting member and for outputting a signal representing a position of the position-detected object in accordance with the light received, wherein said reflecting member comprises means for moving in a same direction as a direction of the movement of the position-detected object.

2. The apparatus according to claim 1, wherein said reflecting member comprises a pattern portion in which the portions with different reflectivities are arranged along a direction in which the position upon which the light impinges changes according to the movement of the position-detected object.

3. The apparatus according to claim 1, wherein said reflecting member has at least three portions with different reflectivities.

4. The apparatus according to claim 1, wherein said light receiving device comprises means for outputting a signal representing intensity of the light received.

5. The apparatus according to claim 1, wherein said reflecting member has a first reflecting portion and a second reflecting portion having a lower reflectivity that the first reflecting portion does, and wherein said first reflecting portion is located at a position closer to the position-detected object than the second reflecting portion is.

6. The apparatus according to claim 5, wherein said reflecting member comprises means for moving in a predetermined direction in synchronism with the movement of the position-detected object and wherein said light emitting device comprises means for emitting light in a direction different from the predetermined direction.

7. The apparatus according to claim 1, herein said light emitting device and said light receiving device are formed as a unit.

8. The apparatus according to claim 7, wherein said light emitting device and said light receiving device are formed as a photoreflector.

9. The apparatus according to claim 1, wherein said reflecting member comprises means for being interconnected with the position-detected object.

10. The apparatus according to claim 9, wherein said reflecting member comprises means for being provided as substantially integral with the position-detected object.

11. The apparatus according to claim 10, wherein said reflecting member comprises means for changing the position upon which the light from said light emitting device impinges, in accordance with movement of an optical member for correction of image blur.

12. The apparatus according to claim 1, wherein said reflecting member comprises means for changing the position upon which the light from said light emitting device impinges, in accordance with movement of a movable member for prevention of image blur.

13. The apparatus according to claim 12, further comprising:
a sensitivity calibration device for carrying out calibration of detection sensitivity of said light receiving device in such a state that the movable member is held at a predetermined position.

14. The apparatus according to claim 13, wherein said sensitivity calibration device comprises means for carrying out the calibration of detection sensitivity in such a state that the movable member is engaged by an engagement device for engaging the movable member.

15. The apparatus according to claim 13, wherein said sensitivity calibration device comprises means for letting an output signal from said light receiving device in the state wherein the movable member is held at the predetermined position, be a predetermined value.

16. The apparatus according to claim 15, wherein said sensitivity calibration device comprises means for setting an output amplification factor of said light receiving device so as to let the output signal from said light receiving device in the state wherein the movable member is held at the predetermined position, be the predetermined value.

17. The apparatus according to claim 15, wherein said sensitivity calibration device comprises means for letting the output signal from said light receiving device be the predetermined value by feedback control.

18. An image blur correction apparatus comprising:
(a) a movable member for moving in order to prevent an image blur;
(b) a detecting device for detecting a position of said movable member, said detecting device including:
(i) a light emitting portion;
(ii) a reflecting member for reflecting light from said light emitting portion, said reflecting member having portions with different reflectivities, wherein a position upon which the light from said light emitting portion impinges changes according to movement of said movable member; and
(iii) a light receiving portion for receiving light reflected by said reflecting member and for outputting a signal representing a position of said movable member in accordance with the light received; and
(c) a control device for controlling operation of said movable member in accordance with a detection output from said detecting device.

19. The apparatus according to claim 18, wherein said reflecting member comprises a pattern portion in which the portions with different reflectivities are arranged along a direction in which the position upon which the light impinges changes according to the movement of said movable member.

20. The apparatus according to claim 18, wherein said reflecting member has at least three portions with different reflectivities.

21. The apparatus according to claim 18, wherein said light receiving device comprises means for outputting a signal representing intensity of the light received.

22. The apparatus according to claim 18, wherein said reflecting member has a first reflecting portion and a second reflecting portion having a lower reflectivity than the first reflecting portion does, and wherein said first reflecting portion is located at a position closer to said movable member than the second reflecting portion is.

23. The apparatus according to claim 22, wherein said reflecting member comprises means for moving in a predetermined direction in synchronism with the movement of said movable member and wherein said light emitting device comprises means for emitting light in a direction different from the predetermined direction.

24. The apparatus according to claim 18, wherein said light emitting device and said light receiving device are formed as a unit.

25. The apparatus according to claim 24, wherein said light emitting device and said light receiving device are formed as a photoreflector.

26. The apparatus according to claim 18, wherein said reflecting member comprises means for moving in a same direction as a direction of the movement of said movable member.

27. The apparatus according to claim 26, wherein said reflecting member comprises means for being interconnected with said movable member.

28. The apparatus according to claim 27, wherein said reflecting member comprises means for being provided as substantially integral with said movable member.

29. The apparatus according to claim 28, wherein said reflecting member comprises means for changing the position upon which the light from said light emitting device impinges, in accordance with movement of an optical member for correction of image blur.

30. The apparatus according to claim 18, further comprising:
a sensitivity calibration device for carrying out calibration of detection sensitivity of said light receiving device in such a state that said movable member is held at a predetermined position.

31. The apparatus according to claim 30, wherein said sensitivity calibration device comprises means for carrying out the calibration of detection sensitivity in such a state that said movable member is engaged by an engagement device for engaging said movable member.

32. The apparatus according to claim 30, wherein said sensitivity calibration device comprises means for letting an output signal from said light receiving device in the state wherein said movable member is held at the predetermined position, be a predetermined value.

33. The apparatus according to claim 32, wherein said sensitivity calibration device comprises means for setting an output amplification factor of said light receiving device so as to let the output signal from said light receiving device in the state wherein said movable member is held at the predetermined position, be the predetermined value.

34. The apparatus according to claim 32, wherein said sensitivity calibration device comprises means for letting the output signal from said light receiving device be the predetermined value by feedback control.

35. An optical apparatus comprising:
   (a) a movable optical member;
   (b) a detecting device for detecting position of said movable optical member, said detecting device including:
      (i) a light emitting portion;
      (ii) a reflecting member for reflecting light from said light emitting portion, said reflecting member having portions with different reflectivities, wherein a position upon which the light from said light emitting portion impinges changes according to movement of said movable optical member; and
      (iii) a light receiving portion for receiving light reflected by said reflecting member and for outputting a signal representing a position of said movable optical member in accordance with intensity of the light received; and
   (c) a control device for controlling operation of said movable optical member in accordance with a detection output from said detecting device.

36. A position detecting apparatus applied to an image blur correcting device having a movable member, said apparatus comprising:
   a light emitting device;
   a reflecting member for reflecting light from said light emitting device, said reflecting member having portions with different reflectivities, wherein a position upon which the light from said light emitting device impinges changes according to movement of the movable member; and
   a light receiving device for receiving light reflected by said reflecting member and for outputting a signal representing a position of the position-detected object in accordance with the light received,
   wherein said reflecting member has a first reflecting portion and a second reflecting portion having a lower reflectivity than the first reflecting portion does, and wherein said first reflecting portion is located at a position closer to the position-detected object than the second reflecting portion is.

37. The apparatus according to claim 36, wherein said reflecting member comprises means for moving in a predetermined direction in synchronism with the movement of the position-detected object and wherein said light emitting device comprises means for emitting light in a direction different from the predetermined direction.

38. A position detecting apparatus applied to an image blur correcting device having a movable member, said apparatus comprising:
   a light emitting device;
   a reflecting member for reflecting light from said light emitting device, said reflecting member having portions with different reflectivities, wherein a position upon which the light from said light emitting device impinges changes according to movement of the movable member; and
   a light receiving device for receiving light reflected by said reflecting member and for outputting a signal representing a position of the position-detected object in accordance with the light received,
   wherein said light receiving device comprises means for outputting a signal representing intensity of the light received.

39. A position detecting apparatus applied to an image blur correcting device having a movable member, said apparatus comprising:
   a light emitting device;
   a reflecting member for reflecting light from said light emitting device, said reflecting member having portions with different reflectivities, wherein a position upon which the light from said light emitting device impinges changes according to movement of the movable member; and
   a light receiving device for receiving light reflected by said reflecting member and for outputting a signal representing a position of the position-detected object in accordance with the light received,
   wherein said light emitting device and said light receiving device are formed as a unit.

40. The apparatus according to claim 39, wherein said light emitting device and said light receiving device are formed as a photoreflector.

* * * * *

UNITED STATES PATENT AND TRADEMARK OFFICE
CERTIFICATE OF CORRECTION

PATENT NO.    : 5,973,319
DATED         : October 26, 1999
INVENTOR(S)   : Koichi Washisu Page 1 of 1

It is certified that error appears in the above-identified patent and that said Letters Patent is hereby corrected as shown below:

Column 1,
Line 19, "mistake" should read -- mistake in --.
Line 26, "blurpree" should read -- blurfree --.

Column 2,
Line 62, "out" should read -- slip out --.

Column 13,
Line 48, "plate" should read -- plates; --.

Column 14,
Line 8, "o" should read -- of --.

Column 15,
Line 60, "th" should read -- the --.

Column 16,
Line 40, "th" should read -- the --.

Column 37,
Line 39, "100 •" should read -- 100 Ω --.

Column 43,
Line 7, "herein" should read -- wherein --.

Signed and Sealed this

Sixteenth Day of October, 2001

Attest:

*Nicholas P. Godici*

NICHOLAS P. GODICI
*Attesting Officer*   *Acting Director of the United States Patent and Trademark Office*